United States Patent
Nuhfer et al.

(10) Patent No.: US 8,492,987 B2
(45) Date of Patent: Jul. 23, 2013

(54) LOAD CONTROL DEVICE FOR A LIGHT-EMITTING DIODE LIGHT SOURCE

(75) Inventors: Matthew W. Nuhfer, Bethlehem, PA (US); Thomas M. Shearer, Macungie, PA (US); Venkatesh Chitta, Center Valley, PA (US); Kartik Iyer, Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 237 days.

(21) Appl. No.: 12/813,908

(22) Filed: Jun. 11, 2010

(65) Prior Publication Data

US 2011/0080110 A1    Apr. 7, 2011

Related U.S. Application Data

(60) Provisional application No. 61/249,477, filed on Oct. 7, 2009, provisional application No. 61/319,530, filed on Mar. 31, 2010, provisional application No. 61/332,983, filed on May 10, 2010.

(51) Int. Cl.
*H05B 37/02*    (2006.01)
*H05B 37/00*    (2006.01)

(52) U.S. Cl.
USPC ............................ 315/246; 315/212; 315/308

(58) Field of Classification Search
USPC ............. 315/246, 209 R, 212, 219, 224, 254, 315/192, 185 R, 307, 308
See application file for complete search history.

(56) References Cited

U.S. PATENT DOCUMENTS

| 4,195,281 A | 3/1980 | Bell |
| 4,503,311 A | 3/1985 | Houchens et al. |
| 4,504,776 A | 3/1985 | Haville |
| 4,845,481 A | 7/1989 | Havel |

(Continued)

FOREIGN PATENT DOCUMENTS

| DE | 102006028670 | 12/2007 |
| EP | 2257130 | 12/2010 |

(Continued)

OTHER PUBLICATIONS

International Preliminary Report on Patentability dated Feb. 27, 2012 issued in corresponding PCT International Application No. PCT/US10/51315.

(Continued)

*Primary Examiner* — Daniel D Chang
(74) *Attorney, Agent, or Firm* — Ostrolenk Faber LLP

(57) ABSTRACT

A light-emitting diode (LED) driver is adapted to control either the magnitude of the current conducted through a LED light source or the magnitude of a voltage generated across the LED light source. The LED driver comprises a power converter circuit for generating a DC bus voltage, and an LED drive circuit for receiving the bus voltage and adjusting the magnitude of the current conducted through the LED light source. The LED driver is operable to dim the LED light source using either a pulse-width modulation technique or a constant current reduction technique. The LED drive circuit may comprise a controllable-impedance circuit, such as a linear regulator. The LED driver may be operable to control the magnitude of the bus voltage to optimize the efficiency and reduce the power dissipation in the LED drive circuit, as well ensuring that the load voltage and current do not have any ripple.

22 Claims, 24 Drawing Sheets

U.S. PATENT DOCUMENTS

| | | | |
|---|---|---|---|
| 4,964,135 | A | 10/1990 | Mitsui et al. |
| 5,017,837 | A | 5/1991 | Hanna et al. |
| 5,041,763 | A | 8/1991 | Sullivan et al. |
| 5,399,940 | A | 3/1995 | Hanna et al. |
| 5,661,645 | A | 8/1997 | Hochstein |
| 5,905,442 | A | 5/1999 | Mosebrook et al. |
| 6,016,038 | A | 1/2000 | Mueller et al. |
| 6,040,663 | A | 3/2000 | Bucks et al. |
| 6,091,604 | A | 7/2000 | Plougsgaard et al. |
| 6,111,368 | A | 8/2000 | Luchaco |
| 6,150,771 | A | 11/2000 | Perry |
| 6,304,464 | B1 | 10/2001 | Jacobs et al. |
| 6,577,512 | B2 | 6/2003 | Tripathi et al. |
| 6,580,309 | B2 | 6/2003 | Jacobs et al. |
| 6,586,890 | B2 | 7/2003 | Min et al. |
| 6,621,235 | B2 | 9/2003 | Chang |
| 6,734,639 | B2 | 5/2004 | Chang et al. |
| 6,747,420 | B2 | 6/2004 | Barth et al. |
| 6,853,150 | B2 | 2/2005 | Clauberg et al. |
| 6,870,325 | B2 | 3/2005 | Bushell et al. |
| 7,019,662 | B2 | 3/2006 | Shackle |
| 7,038,399 | B2 | 5/2006 | Lys et al. |
| 7,071,762 | B2 | 7/2006 | Xu et al. |
| 7,169,481 | B2 | 1/2007 | Ogawa et al. |
| 7,202,608 | B2 | 4/2007 | Robinson et al. |
| 7,233,115 | B2 * | 6/2007 | Lys .................. 315/291 |
| 7,242,152 | B2 | 7/2007 | Dowling et al. |
| 7,256,554 | B2 | 8/2007 | Lys |
| 7,262,559 | B2 | 8/2007 | Tripathi et al. |
| 7,309,965 | B2 | 12/2007 | Dowling et al. |
| 7,352,138 | B2 | 4/2008 | Lys et al. |
| 7,358,681 | B2 | 4/2008 | Robinson et al. |
| 7,358,706 | B2 | 4/2008 | Lys |
| 7,378,805 | B2 | 5/2008 | Oh et al. |
| 7,420,335 | B2 | 9/2008 | Robinson et al. |
| 7,459,864 | B2 | 12/2008 | Lys |
| 7,463,070 | B2 | 12/2008 | Wessels |
| 7,482,565 | B2 | 1/2009 | Morgan et al. |
| 7,482,760 | B2 | 1/2009 | Jungwirth et al. |
| 7,504,781 | B2 | 3/2009 | Wendt et al. |
| 7,511,436 | B2 | 3/2009 | Xu |
| 7,511,437 | B2 | 3/2009 | Lys et al. |
| 7,538,499 | B2 | 5/2009 | Ashdown |
| 7,541,785 | B2 | 6/2009 | Murakami |
| 7,542,257 | B2 | 6/2009 | McCormick et al. |
| 7,550,935 | B2 | 6/2009 | Lys et al. |
| 7,557,521 | B2 | 7/2009 | Lys |
| 7,573,729 | B2 | 8/2009 | Elferich et al. |
| 7,944,153 | B2 * | 5/2011 | Greenfeld .................. 315/291 |
| 2003/0025120 | A1 | 2/2003 | Chang |
| 2003/0025514 | A1 | 2/2003 | Benes |
| 2003/0214242 | A1 | 11/2003 | Berg-johansen |
| 2004/0252486 | A1 | 12/2004 | Krause |
| 2005/0093488 | A1 | 5/2005 | Hung et al. |
| 2005/0111231 | A1 | 5/2005 | Crodian et al. |
| 2005/0230600 | A1 | 10/2005 | Olson et al. |
| 2007/0019442 | A1 | 1/2007 | Li et al. |
| 2007/0108916 | A1 | 5/2007 | Wang et al. |
| 2007/0195527 | A1 | 8/2007 | Russell |
| 2008/0018261 | A1 | 1/2008 | Kastner |
| 2008/0122385 | A1 | 5/2008 | Dou et al. |
| 2008/0150877 | A1 | 6/2008 | Chao et al. |
| 2008/0174929 | A1 | 7/2008 | Shen et al. |
| 2008/0180075 | A1 | 7/2008 | Xie et al. |
| 2008/0219001 | A1 | 9/2008 | Russell |
| 2008/0224625 | A1 | 9/2008 | Greenfeld |
| 2008/0224629 | A1 | 9/2008 | Melanson |
| 2008/0224636 | A1 | 9/2008 | Melanson |
| 2008/0258641 | A1 | 10/2008 | Nakagawa et al. |
| 2008/0315795 | A1 | 12/2008 | Madineni et al. |
| 2009/0108776 | A1 | 4/2009 | Zhao |
| 2009/0134816 | A1 | 5/2009 | Sloan et al. |
| 2009/0140666 | A1 | 6/2009 | Liao et al. |
| 2009/0195168 | A1 | 8/2009 | Greenfeld |
| 2009/0230891 | A1 | 9/2009 | Zhao et al. |
| 2009/0295775 | A1 | 12/2009 | Kim et al. |
| 2010/0001657 | A1 | 1/2010 | Chen |
| 2011/0121744 | A1 * | 5/2011 | Salvestrini et al. .......... 315/246 |

FOREIGN PATENT DOCUMENTS

| | | |
|---|---|---|
| JP | 2001-093662 A | 4/2001 |
| WO | WO-2008-068705 | 6/2008 |
| WO | WO-2008-112820 | 9/2008 |
| WO | WO-2008/144961 | 12/2008 |
| WO | WO-2009/119617 | 10/2009 |

OTHER PUBLICATIONS

International Preliminary Report on Patentability dated Mar. 2, 2012 issued in corresponding PCT International Application No. PCT/US10/51402.

Cypress CY8CLEDAC02 Data Sheet, Cypress Semiconductor Corporation, revised Jul. 30, 2009, pp. 1-15.

Search Report issued by PCT on Jan. 21, 2011 in connection with corresponding PCT application No. PCT/US2010/051402.

International Preliminary Report on Patentability dated May 4, 2012 issued in corresponding PCT International Application No. PCT/US10/051405.

Search Report issued by PCT on Jan. 21, 2011 in connection with corresponding PCT application No. PCT/US2010/051405.

Search Report issued by PCT on Jan. 21, 2011 in connection with corresponding PCT application No. PCT/US2010/051315.

* cited by examiner

LOAD CONTROL DEVICE FOR A LIGHT-EMITTING DIODE LIGHT SOURCE

CROSS REFERENCE TO RELATED APPLICATIONS

This application claims priority from commonly-assigned U.S. Provisional Patent Application No. 61/249,477, filed Oct. 7, 2009, entitled LOAD CONTROL DEVICE FOR A LIGHT-EMITTING DIODE LIGHT SOURCE; U.S. Provisional Patent Application No. 61/319,530, filed Mar. 31, 2010; entitled LAMP DRIVER CONFIGURATION DEVELOPMENT TOOL; and U.S. Provisional Patent Application No. 61/332,983, filed May 10, 2010, entitled LOAD CONTROL DEVICE FOR A LIGHT-EMITTING DIODE LIGHT SOURCE, the entire disclosures of which are hereby incorporated by reference.

BACKGROUND OF THE INVENTION

1. Field of the Invention

The present invention relates to a load control device for a light-emitting diode (LED) light source, and more particularly, to an LED driver for controlling the intensity of an LED light source.

2. Description of the Related Art

Light-emitting diode (LED) light sources are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and provide longer operational lives as compared to incandescent, fluorescent, and halogen lamps. In order to illuminate properly, an LED driver control device (i.e., an LED driver) must be coupled between an alternating-current (AC) source and the LED light source for regulating the power supplied to the LED light source. The LED driver may regulate either the voltage provided to the LED light source to a particular value, the current supplied to the LED light source to a specific peak current value, or may regulate both the current and voltage.

The prior art dealing with LED drivers is extensive. See, for example, the listing of U.S. and foreign patent documents and other publications in U.S. Pat. No. 7,352,138, issued Apr. 1, 2008, assigned to Philips Solid-State Lighting Solutions, Inc., of Burlington, Mass., and U.S. Pat. No. 6,016,038, issued Jan. 18, 2000, assigned to Color Kinetics, Inc., of Boston, Mass. (hereinafter "CK").

LED drivers are well known. For example, U.S. Pat. No. 6,586,890, issued Jul. 1, 2003, assigned to Koninklijke Philips Electronics N.V., of Eindhoven, the Netherlands (hereinafter "Philips"), discloses a driver circuit for LEDs that provide power to the LEDs by using pulse-width modulation (PWM). Other examples of LED drives are U.S. Pat. No. 6,580,309, published Sep. 27, 2001, assigned to Philips, which describes switching an LED power supply unit on and off using a pulse duration modulator to control the mean light output of the LEDs. Moreover, the aforementioned U.S. Pat. No. 6,016,038 also describes using PWM signals to alter the brightness and color of LEDs. Further, U.S. Pat. No. 4,845,481, issued Jul. 4, 1989 to Karel Havel, discloses varying the duty cycles of supply currents to differently colored LEDs to vary the light intensities of the LEDs so as to achieve continuously variable color mixing.

U.S. Pat. No. 6,586,890 also discloses a closed-loop current power supply for LEDs. Closed-loop current power supplies for supplying power to other types of lamps are also well known. For example, U.S. Pat. No. 5,041,763, issued Aug. 20, 1991, assigned to Lutron Electronics Co., Inc. of Coopersburg, Pa. (hereinafter "Lutron"), describes closed-loop current power supplies for fluorescent lamps that can supply power to any type of lamp.

U.S. Pat. No. 6,577,512, issued Jun. 10, 2003, assigned to Philips, discloses a power supply for LEDs that uses closed-loop current feedback to control the current supplied to the LEDs and includes means for protecting the LEDs. Likewise, U.S. Pat. No. 6,150,771, issued Nov. 21, 2000, assigned to Precision Solar Controls Inc., of Garland, Tex., and Japanese patent publication 2001093662A, published 6 Apr. 2001, assigned to Nippon Seiki Co., Ltd., describe over-current and over-voltage protection for drivers for LEDs and other lamps.

LED drivers that may be dimmed by conventional A.C. dimmers are also known. Thus, aforementioned U.S. Pat. No. 7,352,138, and U.S. Pat. No. 7,038,399, issued May 2, 2006, assigned to CK, describe LED-based light sources that are controlled by conventional A.C. phase control dimmers. The aforementioned U.S. Pat. No. 6,016,038 discloses a PWM controlled LED-based light source used as a light bulb that may be placed in an Edison-mount (screw-type) light bulb housing. Control of lamps, such as LED lamps, by phase control signals are also described in U.S. Pat. No. 6,111,368, issued Aug. 29, 2000, U.S. Pat. No. 5,399,940, issued Mar. 21, 1995, U.S. Pat. No. 5,017,837, issued May 21, 1991, all of which are assigned to Lutron. U.S. Pat. No. 6,111,368, for example, discloses an electronic dimming fluorescent lamp ballast that is controlled by a conventional A.C. phase control dimmer. U.S. Pat. No. 5,399,940 discloses a microprocessor-controlled "smart" dimmer that controls the light intensities of an array of LEDs in response to a phase control dimming voltage waveform. U.S. Pat. No. 5,017,837 discloses an analog A.C. phase control dimmer having an indicator LED, the intensity of which is controlled in response to a phase control dimming voltage waveform. The well-known CREDENZA® in-line lamp cord dimmer, manufactured by Lutron since 1977, also includes an indicator LED, the light intensity of which is controlled in response to a phase control dimming voltage waveform.

Applications for LED illumination systems are also shown in U.S. Pat. No. 7,309,965, issued Dec. 18, 2007, and U.S. Pat. No. 7,242,152, issued Jul. 10, 2007, both assigned to CK. U.S. Pat. No. 7,309,965 discloses smart lighting devices having processors, and networks comprising such smart lighting devices, sensors, and signal emitters. U.S. Pat. No. 7,242,152 discloses systems and methods for controlling a plurality of networked lighting devices in response to lighting control signals. Such systems are also used in the RADIORA® product, which has been sold since 1996 by Lutron.

In addition, there are known techniques for controlling current delivered to an LED light source. LED light sources are often referred to as "LED light engines." These LED light engines typically comprise a plurality of individual LED semiconductor structures, such as, for example, Gallium-Indium-Nitride (GaInN) LEDs. The individual LEDs may each produce light photons by electron-hole combination in the blue visible spectrum, which is converted to white light by a yellow phosphor filter.

It is known that the light output of an LED is proportional to the current flowing through it. It is also known that LEDs suffer from a phenomena known as "droop" in which the efficiency is reduced as the power is increased. For LEDs of the GaInN type (used for providing illumination), a typical load current is approximately 350 milliamps (mA) at a forward operating voltage of between three and four volts (V) which corresponds to approximately a one watt (W) power rating. At this power rating, these LEDs provide approximately 100 lumens per watt. This is significantly more efficient than other conventional light sources. For example, incandescent lamps typically provide 10 to 20 lumens per watt and fluorescent lamps, 60 to 90 lumens per watt. As discussed, LED light sources can provide larger ratios of lumens per watt at lower currents, thus avoiding the droop phenomena. Further, it is expected that, as technology improves, the efficiency of LED light sources will improve even at higher current levels than presently employed to provide higher light outputs per diode in an LED light engine.

LED light sources typically comprise a plurality of individual LEDs that may be arranged in both a series and parallel relationship. In other words, a plurality of LEDs may be arranged in a series string and a number of series strings may be arranged in parallel to achieve the desired light output. For example, five LEDs in a first series string each with a forward bias of approximately 3 volts (V) and each consuming approximately one watt of power (at 350 mA through the string) consume about 5 W. A second string of a series of five LEDs connected in parallel across the first string will result in a power consumption of 10 W with each string drawing 350 mA. Thus, an LED driver would need to supply 700 mA to the two strings of LEDs, and since each string has five LEDs, the output voltage provided by the LED driver would be about 15 volts. Additional strings of LEDs can be placed in parallel for additional light output, however, the LED driver must be operable to provide the necessary current. Alternatively, more LEDs can be placed in series on each sting, and as a result, the LED driver must also be operable to provide the necessary voltage (e.g., 18 volts for a series of six LEDs).

LED light sources are typically rated to be driven via one of two different control techniques: a current load control technique or a voltage load control technique. An LED light source that is rated for the current load control technique is also characterized by a rated current (e.g., 350 milliamps) to which the peak magnitude of the current through the LED light source should be regulated to ensure that the LED light source is illuminated to the appropriate intensity and color. In contrast, an LED light source that is rated for the voltage load control technique is characterized by a rated voltage (e.g., 15 volts) to which the voltage across the LED light source should be regulated to ensure proper operation of the LED light source. Typically, each string of LEDs in an LED light source rated for the voltage load control technique includes a current balance regulation element to ensure that each of the parallel legs has the same impedance so that the same current is drawn in each parallel string.

In addition, it is known that the light output of an LED light source can be dimmed. Different methods of dimming LEDs include a pulse-width modulation (PWM) technique and a constant current reduction (CCR) technique. Pulse-width modulation dimming can be used for LED light sources that are controlled in either a current or voltage load control mode. In pulse-width modulation dimming, a pulsed signal with a varying duty cycle is supplied to the LED light source. If an LED light source is being controlled using the current load control technique, the peak current supplied to the LED light source is kept constant during an on time of the duty cycle of the pulsed signal. However, as the duty cycle of the pulsed signal varies, the average current supplied to the LED light source also varies, thereby varying the intensity of the light output of the LED light source. If the LED light source is being controlled using the voltage load control technique, the voltage supplied to the LED light source is kept constant during the on time of the duty cycle of the pulsed signal in order to achieve the desired target voltage level, and the duty cycle of the load voltage is varied in order to adjust the intensity of the light output. Constant current reduction dimming is typically only used when an LED light source is being controlled using the current load control technique. In constant current reduction dimming, current is continuously provided to the LED light source, however, the DC magnitude of the current provided to the LED light source is varied to thus adjust the intensity of the light output.

Therefore, there is a need to provide an LED driver that is flexible and configurable, such that it can be used with LED light sources that are rated to operate at different voltage and current magnitudes, and using the different load control and dimming techniques. In addition, there is a need to provide an LED driver that is more efficient and is relatively simple with a reduced component count. There is a need for a simpler driver regulator circuit that is also energy efficient. Furthermore, there is a need for an LED driver that maximizes efficiency of the driver by reducing losses in the driver itself.

SUMMARY OF THE INVENTION

According to an embodiment of the present invention, an LED driver for controlling the intensity of an LED light source comprises a power converter circuit operable to receive a rectified AC voltage and to generate a DC bus voltage, and a LED drive circuit including a controllable-impedance circuit (e.g., a linear regulator) adapted to be coupled in series with the LED light source for controlling the intensity of the LED light source. The LED drive circuit receives the bus voltage and controls the magnitude of a load current conducted through the LED light source, so as to control the intensity of the LED light source. The LED driver further comprises a control circuit operatively coupled to the power converter circuit for adjusting the magnitude of the bus voltage, and to the LED drive circuit for controlling the controllable-impedance circuit to thus adjust the magnitude of the load current through the LED light source. The control circuit adjusts the magnitude of the bus voltage in response to a voltage generated across the controllable-impedance circuit to reduce the total power dissipation in the power converter circuit and the LED drive circuit. According to another embodiment of the present invention, the control circuit adjusts the magnitude of the bus voltage in response to the magnitude of the voltage generated across the controllable-impedance circuit to control the magnitude of the voltage generated across the controllable-impedance circuit to a target voltage.

According to another embodiment of the present invention, an LED driver for driving an LED light source including at least one LED comprises: (1) a first circuit receiving a rectified AC voltage and providing a DC bus voltage; (2) a second circuit receiving the DC bus voltage and producing a load voltage for driving an LED light source; (3) a control circuit having a first control input from the first circuit and a second control input from the second circuit and further having a first control output provided to the first circuit and a second control output provided to the second circuit. The first control input comprises a signal related to the DC bus voltage, while the first control output comprises a control signal for controlling the first circuit to deliver a desired DC bus voltage. The second control input comprises a signal related to either or both a load current provided by the second circuit to the LED light source and the load voltage provided by the second circuit to the LED light source. The second control output comprises a control signal to regulate either or both the load current to the LED light source and the load voltage provided to the LED light source. The second circuit comprises a linear regulator circuit having a power semiconductor device in series with the LED light source to regulate the load current to a desired load current, such that a load voltage is generated across the LED light source. The control circuit controls the first circuit to adjust the magnitude of the DC bus voltage to a magnitude that is above that load voltage by at least a minimum regulator voltage to enable the linear regulator to regulate the load current to the desired load current.

In addition, a method for controlling the intensity of an LED light source is also described herein. The method comprises: (1) generating a DC bus voltage; (2) controlling the magnitude of a load current conducted through the LED light source by controlling a controllable-impedance circuit that is coupled to conduct the load current through the LED light source; (3) determining the magnitude of a voltage generated across the controllable-impedance circuit; and (4) adjusting the magnitude of the bus voltage in response to the magnitude of the voltage generated across the controllable-impedance circuit to reduce the total power dissipation in the power converter circuit and the LED drive circuit. According to another embodiment of the present invention, the method may comprise the step of adjusting the magnitude of the bus voltage in response to the magnitude of the voltage generated across the controllable-impedance circuit to control the magnitude of the voltage generated across the controllable-impedance circuit to a target voltage.

Other features and advantages of the present invention will become apparent from the following description of the invention that refers to the accompanying drawings.

DETAILED DESCRIPTION OF THE INVENTION

Figure 1:
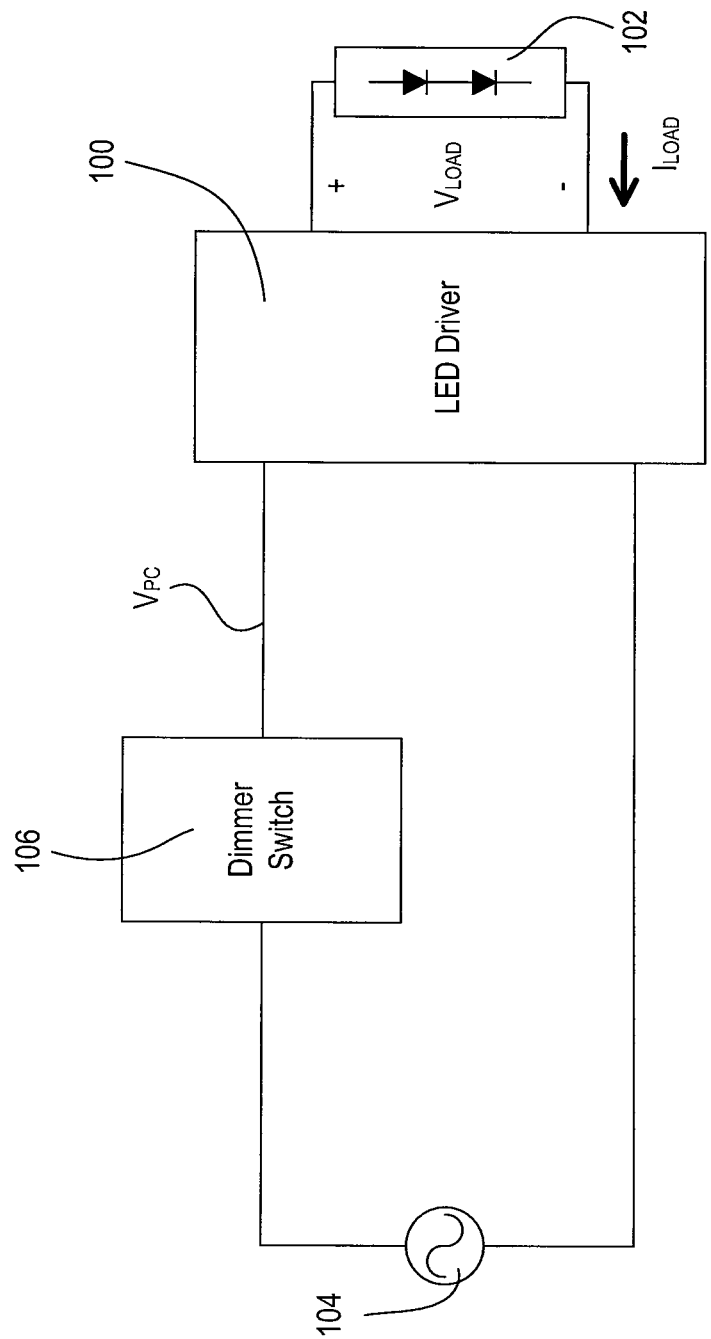
FIG. 1 is a simplified block diagram of a system including a light-emitting diode (LED) driver for controlling the intensity of an LED light source according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a system including a light-emitting diode (LED) driver 100 for controlling the intensity of an LED light source 102 (e.g., an LED light engine) according to a first embodiment of the present invention. The LED light source 102 is shown as a plurality of LEDs connected in series but may comprise a single LED or a plurality of LEDs connected in parallel or a suitable combination thereof, depending on the particular lighting system. In addition, the LED light source 102 may alternatively comprise one or more organic light-emitting diodes (OLEDs). The LED driver 100 is coupled to an alternating-current (AC) power source 104 via a dimmer switch 106. The dimmer switch 106 generates a phase-control signal $V_{PC}$ (e.g., a dimmed-hot voltage), which is provided to the LED driver 100. The dimmer switch 106 comprises a bidirectional semiconductor switch (not shown), such as, for example, a triac or two anti-series-connected field-effect transistors (FETs), coupled in series between the AC power source 104 and the LED driver 100. The dimmer switch 106 controls the bidirectional semiconductor switch to be conductive for a conduction period $T_{CON}$ each half-cycle of the AC power source 104 to generate the phase-control signal $V_{PC}$.

The LED driver 100 is operable to turn the LED light source 102 on and off in response to the conductive period $T_{CON}$ of the phase-control signal $V_{PC}$ received from the dimmer switch 106. In addition, the LED driver 100 is operable to adjust (i.e., dim) the intensity of the LED light source 102 to a target intensity $L_{TRGT}$, which may range across a dimming range of the LED light source, i.e., between a low-end intensity $L_{LE}$ (e.g., approximately 1%) and a high-end intensity $L_{HE}$ (e.g., approximately 100%) in response to the phase-control signal $V_{PC}$. The LED driver 100 is able to control both the magnitude of a load current $I_{LOAD}$ through the LED light source 102 and the magnitude of a load voltage $V_{LOAD}$ across the LED light source. Accordingly, the LED driver 100 controls at least one of the load voltage $V_{LOAD}$ across the LED light source 102 and the load current $I_{LOAD}$ through the LED light source to control the amount of power delivered to the LED light source depending upon a mode of operation of the LED driver (as will be described in greater detail below).

The LED driver 100 is adapted to work with a plurality of different LED light sources, which may be rated to operate using different load control techniques, different dimming techniques, and different magnitudes of load current and voltage. The LED driver 100 is operable to control the magnitude of the load current $I_{LOAD}$ through the LED light source 102 or the load voltage $V_{LOAD}$ across the LED light source using two different modes of operation: a current load control mode (i.e., for using the current load control technique) and a voltage load control mode (i.e., for using the voltage load control technique). The LED driver 100 may also be configured to adjust the magnitude to which the LED driver will control the load current $I_{LOAD}$ through the LED light source 102 in the current load control mode, or the magnitude to which the LED driver will control the load voltage $V_{LOAD}$ across the LED light source in the voltage load control mode. When operating in the current load control mode, the LED driver 100 is operable to control the intensity of the LED light source 102 using two different dimming modes: a PWM dimming mode (i.e., for using the PWM dimming technique) and a CCR dimming mode (i.e., for using the CCR dimming technique). When operating in the voltage load control mode, the LED driver 100 is only operable to adjust the amount of power delivered to the LED light source 102 using the PWM dimming technique.

Figure 2:
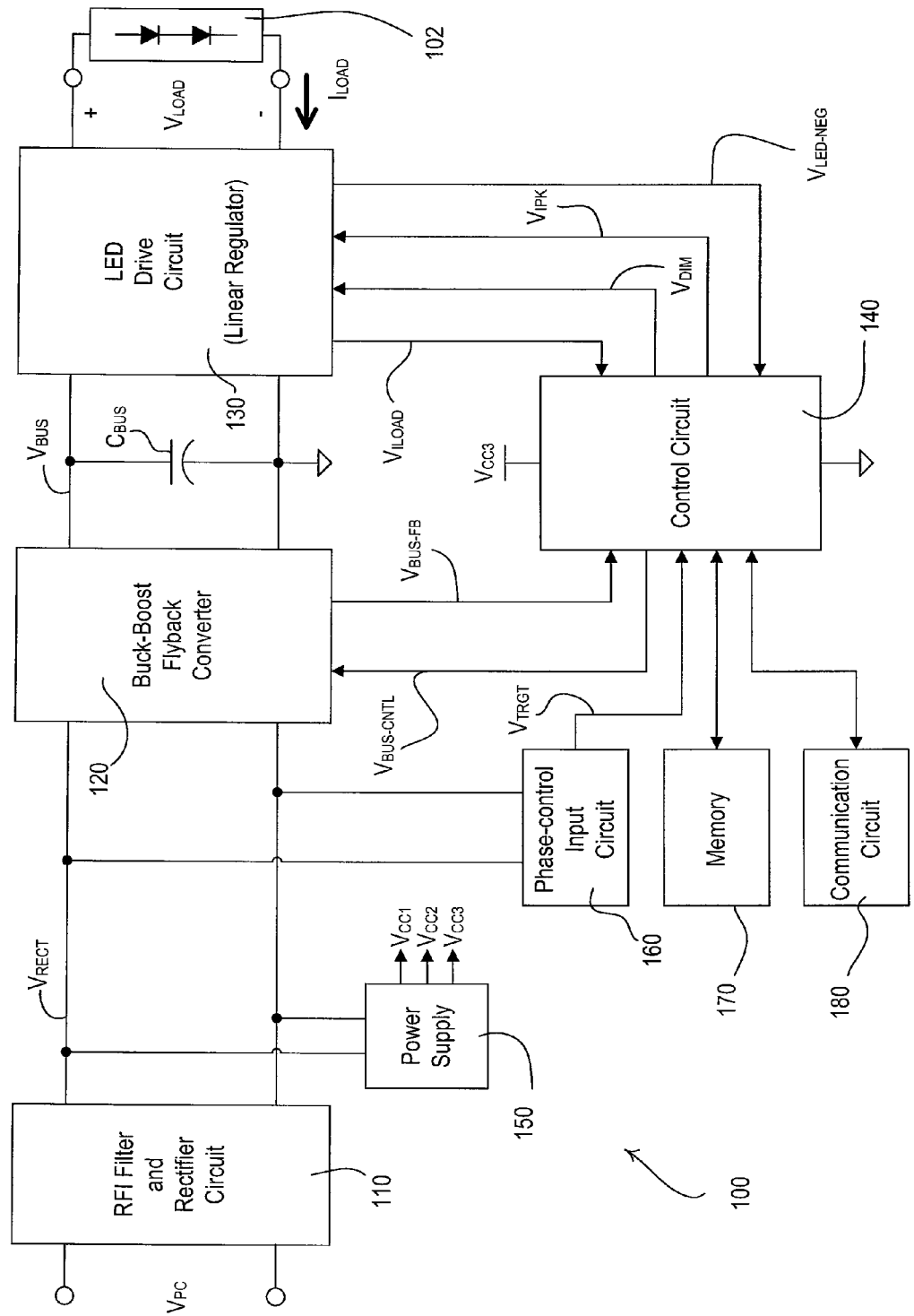
FIG. 2 is a simplified block diagram of the LED driver of FIG. 1.

FIG. 2 is a simplified block diagram of the LED driver 100 according to the first embodiment of the present invention. The LED driver 100 comprises a radio-frequency (RFI) filter and rectifier circuit 110, which receives the phase-control signal $V_{PC}$ from the dimmer switch 106. The RFI filter and rectifier circuit 110 operates to minimize the noise provided on the AC power source 104 and to generate a rectified voltage $V_{RECT}$. The LED driver 100 further comprises a power converter, e.g., a buck-boost flyback converter 120, which receives the rectified voltage $V_{RECT}$ and generates a variable direct-current (DC) bus voltage $V_{BUS}$ across a bus capacitor $C_{BUS}$. The flyback converter 120 may alternatively comprise any suitable power converter circuit for generating an appropriate bus voltage. The bus voltage $V_{BUS}$ may be characterized by some voltage ripple as the bus capacitor $C_{BUS}$ periodically charges and discharges. The flyback converter 120 may also provide electrical isolation between the AC power source 104 and the LED light source 102, and operate as a power factor correction (PFC) circuit to adjust the power factor of the LED driver 100 towards a power factor of one. Alternatively, the flyback converter 120 could comprise a boost converter, a buck converter, a single-ended primary-inductor converter (SEPIC), a Ćuk converter, or other suitable power converter circuit.

The LED driver 100 also comprises an LED drive circuit 130, which receives the bus voltage $V_{BUS}$ and controls the amount of power delivered to the LED light source 102 so as to control the intensity of the LED light source. The LED drive circuit 130 may comprise a controllable-impedance circuit, such as a linear regulator, as will be described in greater detail below. Alternatively, the LED drive circuit 130 could comprise a switching regulator, such as a buck converter.

The LED driver 100 further comprises a control circuit 140 for controlling the operation of the flyback converter 120 and the LED drive circuit 130. The control circuit 140 may comprise, for example, a microcontroller or any other suitable processing device, such as, for example, a programmable logic device (PLD), a microprocessor, or an application specific integrated circuit (ASIC). The LED driver 100 further comprises a power supply 150, which receives the rectified voltage $V_{RECT}$ and generates a plurality of direct-current (DC) supply voltages for powering the circuitry of the LED driver. Specifically, the power supply 150 generates a first non-isolated supply voltage $V_{CC1}$ (e.g., approximately 14 volts) for powering the control circuitry of the flyback converter 120, a second isolated supply voltage $V_{CC2}$ (e.g., approximately 9 volts) for powering the control circuitry of the LED drive circuit 130, and a third non-isolated supply voltage $V_{CC3}$ (e.g., approximately 5 volts) for powering the control circuit 140.

The control circuit 140 is coupled to a phase-control input circuit 160, which generates a target intensity control signal $V_{TRGT}$. The target intensity control signal $V_{TRGT}$ comprises, for example, a square-wave signal having a duty cycle $DC_{TRGT}$, which is dependent upon the conduction period $T_{CON}$ of the phase-control signal $V_{PC}$ received from the dimmer switch 106, and thus is representative of the target intensity $L_{TRGT}$ of the LED light source 102. Alternatively, the target intensity control signal $V_{TRGT}$ could comprise a DC voltage having a magnitude dependent upon the conduction period $T_{CON}$ of the phase-control signal $V_{PC}$, and thus representative of the target intensity $L_{TRGT}$ of the LED light source 102.

The control circuit 140 is also coupled to a memory 170 for storing the operational characteristics of the LED driver 100 (e.g., the load control mode, the dimming mode, and the magnitude of the rated load voltage or current). Finally, the LED driver 100 may also comprise a communication circuit 180, which may be coupled to, for example, a wired communication link or a wireless communication link, such as a radio-frequency (RF) communication link or an infrared (IR) communication link. The control circuit 140 may be operable to update the target intensity $L_{TRGT}$ of the LED light source 102 or the operational characteristics stored in the memory 170 in response to digital messages received via the communication circuit 180. For example, the LED driver 100 could alternatively be operable to receive a full conduction AC waveform directly from the AC power source 104 (i.e., not the phase-control signal $V_{PC}$ from the dimmer switch 106) and could simply determine the target intensity $L_{TRGT}$ for the LED light source 102 from the digital messages received via the communication circuit 180.

As previously mentioned, the control circuit 140 manages the operation of the flyback converter 120 and the LED drive circuit 130 to control the intensity of the LED light source 102. The control circuit 140 receives a bus voltage feedback signal $V_{BUS-FB}$, which is representative of the magnitude of the bus voltage $V_{BUS}$, from the flyback converter 120. The control circuit 140 provides a bus voltage control signal $V_{BUS-CNTL}$ to the flyback converter 120 for controlling the magnitude of the bus voltage $V_{BUS}$ (e.g., from approximately 8 volts to 60 volts). When operating in the current load control mode, the LED drive circuit 130 controls a peak magnitude $I_{PK}$ of the load current $I_{LOAD}$ conducted through the LED light source 102 between a minimum load current $I_{LOAD-MIN}$ and a maximum load current $I_{LOAD-MAX}$ in response to a peak current control signal $V_{IPK}$ provided by the control circuit 140. The control circuit 140 receives a load current feedback signal $V_{ILOAD}$, which is representative of the magnitude of the load current $I_{LOAD}$ flowing through the LED light source 102. The control circuit 140 also receives a LED voltage feedback signal $V_{LED-NEG}$, which is representative of the magnitude of the voltage at the negative terminal of the LED light source 102. The control circuit 140 is operable to calculate the magnitude of a load voltage $V_{LOAD}$ developed across the LED light source 102 in response to the bus voltage feedback signal $V_{BUS-FB}$ and the LED voltage feedback signal $V_{LED-NEG}$ as will be described in greater detail below.

The control circuit 140 is operable to control the LED drive circuit 130, so as to control the amount of power delivered to the LED light source 102 using the two different modes of operation (i.e., the current load control mode and the voltage load control mode). During the current load control mode, the LED drive circuit 130 regulates the peak magnitude $I_{PK}$ of the load current $I_{LOAD}$ through the LED light source 102 to a target load current $I_{TRGT}$ in response to the load current feedback signal $V_{ILOAD}$ (i.e., using closed loop control). The target load current $I_{TRGT}$ may be stored in the memory 170 and may be programmed to be any specific magnitude depending upon the LED light source 102 (as will be described in greater detail below with reference to FIGS. 18-23).

To control the intensity of the LED light source 102 during the current load control mode, the control circuit 140 is operable to control the LED drive circuit 130 to adjust the amount of power delivered to the LED light source 102 using both of the dimming techniques (i.e., the PWM dimming technique and the CCR dimming technique). Using the PWM dimming technique, the control circuit 140 controls the peak magnitude $I_{PK}$ of the load current $I_{LOAD}$ through the LED light source 102 to the target load current $I_{TRGT}$ and then pulse-width modulates the load current $I_{LOAD}$ to dim the LED light source 102 to achieve the target load current $I_{TRGT}$. Specifically, the LED drive circuit 130 controls a duty cycle $DC_{ILOAD}$ of the load current $I_{LOAD}$ in response to a duty cycle $DC_{DIM}$ of a dimming control signal $V_{DIM}$ provided by the control circuit 140. Accordingly, the intensity of the LED light source 102 is dependent upon the duty cycle $DC_{ILOAD}$ of the pulse-width modulated load current $I_{LOAD}$. Using the CCR technique, the control circuit 140 does not pulse-width modulate the load current $I_{LOAD}$, but instead adjusts the magnitude of the target load current $I_{TRGT}$ so as to adjust the DC magnitude of the load current $I_{LOAD}$ through the LED light source 102.

During the voltage load control mode, the LED drive circuit 130 regulates the DC voltage of the load voltage $V_{LOAD}$ across the LED light source 102 to a target load voltage $V_{TRGT}$. The target load voltage $V_{TRGT}$ may be stored in the memory 170 and may be programmed to be any specific magnitude depending upon the LED light source 102 (as will be described in greater detail below with reference to FIGS. 18-23). The control circuit 140 is operable to dim the LED light source 102 using only the PWM dimming technique during the voltage load control mode. Specifically, the control circuit 140 adjusts a duty cycle $DC_{VLOAD}$ of the load voltage $V_{LOAD}$ to dim the LED light source 102.

Figure 3:
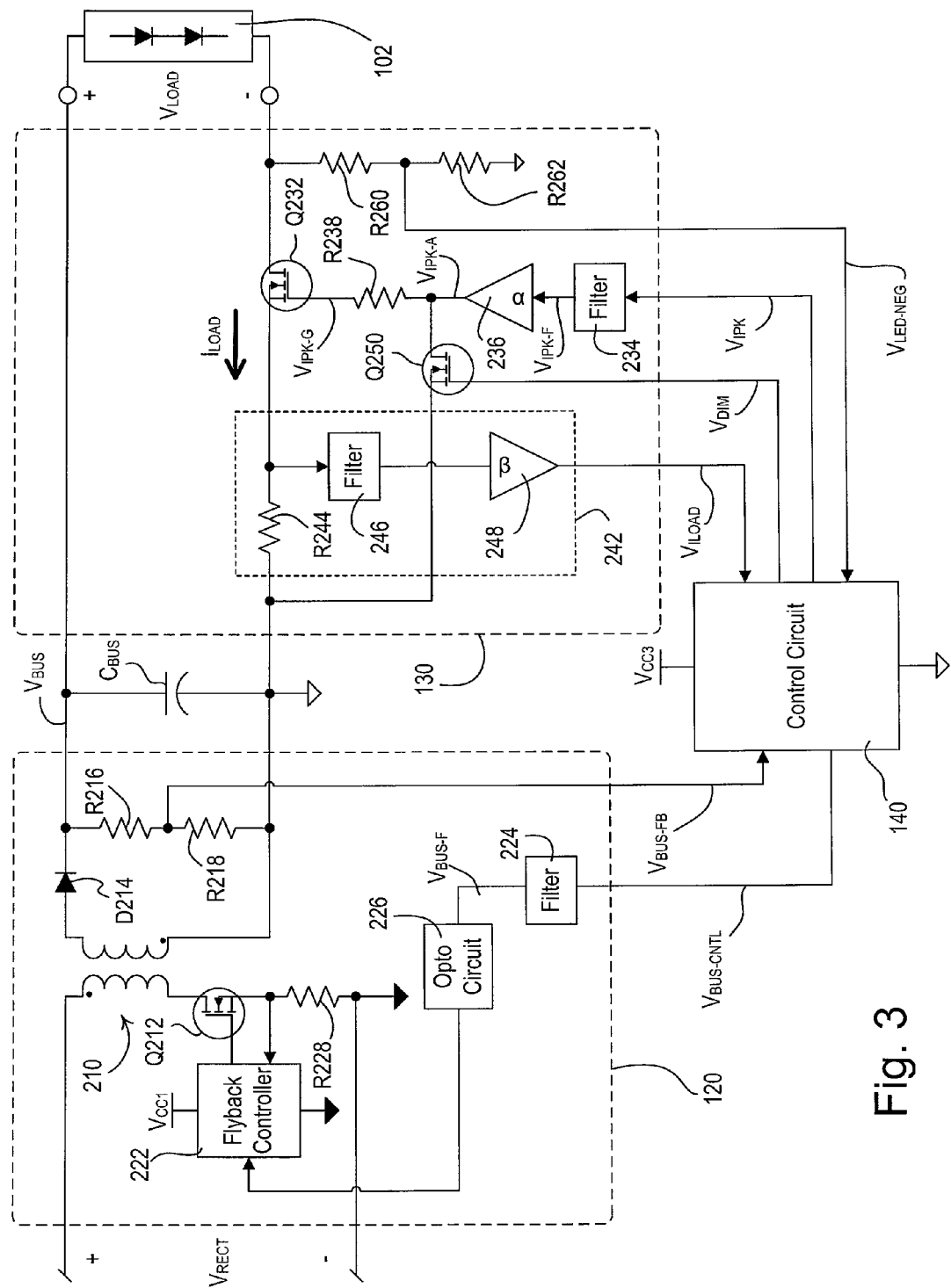
FIG. 3 is a simplified schematic diagram of a flyback converter and an LED drive circuit of the LED driver of FIG. 1.

FIG. 3 is a simplified schematic diagram of the flyback converter 120 and the LED drive circuit 130. The flyback converter 120 comprises a flyback transformer 210 having a primary winding coupled in series with a flyback switching transistor, e.g., a field-effect transistor (FET) Q212 or other suitable semiconductor switch. The secondary winding of the flyback transformer 210 is coupled to the bus capacitor $C_{BUS}$ via a diode D214. The bus voltage feedback signal $V_{BUS-FB}$ is generated by a voltage divider comprising two resistors R216, R218 coupled across the bus capacitor $C_{BUS}$. A flyback controller 222 receives the bus voltage control signal $V_{BUS-CNTL}$ from the control circuit 140 via a filter circuit 224 and an optocoupler circuit 226, which provides electrical isolation between the flyback converter 120 and the control circuit 140. The flyback controller 222 may comprise, for example, part number TDA4863, manufactured by Infineon Technologies. The filter circuit 224 may comprise, for example, a two-stage resistor-capacitor (RC) filter, for generating a filtered bus voltage control signal $V_{BUS-CNTL}$, which has a DC magnitude dependent upon a duty cycle $DC_{BUS}$ of the bus voltage control signal $V_{BUS-CNTL}$. The flyback controller 222 also receives a control signal representative of the current through the FET Q212 from a feedback resistor R228, which is coupled in series with the FET.

The flyback controller 222 controls the FET Q212 to selectively conduct current through the flyback transformer 210 to thus generate the bus voltage $V_{BUS}$. The flyback controller 222 is operable to render the FET Q212 conductive and non-conductive at a high frequency (e.g., approximately 150 kHz or less) to thus control the magnitude of the bus voltage $V_{BUS}$ in response to the DC magnitude of the filtered bus voltage control signal $V_{BUS-F}$ and the magnitude of the current through the FET Q212. Specifically, the control circuit 140 increases the duty cycle $DC_{BUS}$ of the bus voltage control signal $V_{BUS-CNTL}$, such that the DC magnitude of the filter bus voltage control signal $V_{BUS-F}$ increases in order to decrease the magnitude of the bus voltage $V_{BUS}$. The control circuit 140 decreases the duty cycle $DC_{BUS}$ of the bus voltage control signal $V_{BUS-CNTL}$ to increase the magnitude of the bus voltage $V_{BUS}$.

As previously mentioned, the LED drive circuit 130 comprises a linear regulator (i.e., a controllable-impedance circuit) including a power semiconductor switch, e.g., a regulation field-effect transistor (FET) Q232, coupled in series with the LED light source 102 for conducting the load current $I_{LOAD}$. The regulation FET Q232 could alternatively comprise a bipolar junction transistor (BJT), an insulated-gate bipolar transistor (IGBT), or any suitable transistor. The peak current control signal $V_{IPK}$ is coupled to the gate of the regulation FET Q232 through a filter circuit 234, an amplifier circuit 236, and a gate resistor R238. The control circuit 140 is operable to control a duty cycle $DC_{IPK}$ of the peak current control signal $V_{IPK}$ to control the magnitude of the load current $I_{LOAD}$ conducted through the LED light source 102 to the target load current $I_{TRGT}$. The filter circuit 234 (e.g., a two-stage RC filter) generates a filtered peak current control signal $V_{IPK-F}$, which has a DC magnitude dependent upon the duty cycle $DC_{IPK}$ of the peak current control signal $V_{IPK}$, and is thus representative of the magnitude of the target load current $I_{TRGT}$. The amplifier circuit 236 generates an amplified peak current control signal $V_{IPK-A}$, which is provided to the gate of the regulation transistor Q232 through the resistor R238, such that a gate voltage $V_{IPK-G}$ at the gate of the regulation transistor Q232 has a magnitude dependent upon the target load current $I_{TRGT}$. The amplifier circuit 236 may comprise a standard non-inverting operational amplifier circuit having, for example, a gain α of approximately three.

A feedback circuit 242 comprising a feedback resistor R244 is coupled in series with the regulation FET Q232, such that the voltage generated across the feedback resistor is representative of the magnitude of the load current $I_{LOAD}$. For example, the feedback resistor R244 may have a resistance of approximately 0.0375Ω. The feedback circuit 240 further comprises a filter circuit 246 (e.g., a two-stage RC filter) coupled between the feedback resistor R244 and an amplifier circuit 248 (e.g., a non-inverting operational amplifier circuit having a gain β of approximately 20). Alternatively, the amplifier circuit 248 could have a variable gain, which could be controlled by the control circuit 140 and could range between approximately 1 and 1000. The amplifier circuit 248 generates the load current feedback signal $V_{ILOAD}$, which is provided to the control circuit 140 and is representative of an average magnitude $I_{AVE}$ of the load current $I_{LOAD}$, e.g., $$I_{AVE}=V_{ILOAD}/(\beta \cdot R_{FB}), \quad \text{(Equation 1)}$$

wherein $R_{FB}$ is the resistance of the feedback resistor R244. When operating in the current load control mode, the control circuit 140 controls the regulation FET Q232 to operate in the linear region, such that the magnitude of the load current $I_{LOAD}$ is dependent upon the DC magnitude of the filtered peak current control signal $V_{IPK-F}$. In other words, the regulation FET Q232 provides a controllable-impedance in series with the LED light source 102. When operating in the voltage load control mode, the control circuit 140 is operable to drive the regulation FET Q232 into the saturation region, such that the magnitude of the load voltage $V_{LOAD}$ is approximately equal to the magnitude of the bus voltage $V_{BUS}$ (minus the small voltage drops due to the on-state drain-source resistance $R_{DS-ON}$ of the FET regulation Q232 and the resistance of the feedback resistor R244).

The LED drive circuit 130 also comprises a dimming FET Q250, which is coupled between the gate of the regulation FET Q232 and circuit common. The dimming control signal $V_{DIM}$ from the control circuit 140 is provided to the gate of the dimming FET Q250. When the dimming FET Q250 is rendered conductive, the regulation FET Q232 is rendered non-conductive, and when the dimming FET Q250 is rendered non-conductive, the regulation FET Q232 is rendered conductive. While using the PWM dimming technique during the current mode of operation, the control circuit 140 adjusts the duty cycle $DC_{DIM}$ of the dimming control signal $V_{DIM}$ to thus control the intensity of the LED light source 102. As the duty cycle $DC_{DIM}$ of the dimming control signal $V_{DIM}$ increases, the duty cycle $DC_{ITRGT}$, $DC_{VTRGT}$ of the corresponding load current $I_{LOAD}$ or load voltage $V_{LOAD}$ decreases, and vice versa. When using the PWM dimming technique in both the current and voltage load control modes, the control circuit 140 is operable to calculate the peak magnitude $I_{PK}$ of the load current $I_{LOAD}$ from the load current feedback signal $V_{ILOAD}$ (which is representative of the average magnitude $I_{AVE}$ of the load current $I_{LOAD}$) and the duty cycle $DC_{DIM}$ of the dimming control signal $V_{DIM}$, i.e., $$I_{PK}=I_{AVE}/(1-DC_{DIM}). \quad \text{(Equation 2)}$$

When using the CCR dimming technique during the current mode of operation, the control circuit 140 maintains the duty cycle $DC_{DIM}$ of the dimming control signal $V_{DIM}$ at a high-end dimming duty cycle $DC_{HE}$ (e.g., approximately 0%, such that the FET Q232 is always conductive) and adjusts the target load current $I_{TRGT}$ (via the duty cycle $DC_{IPK}$ of the peak current control signal $V_{IPK}$) to control the intensity of the LED light source 102.

The LED voltage feedback signal $V_{LED-NEG}$ is generated by a voltage divider comprising two resistors R260, R262 coupled to the negative terminal of the LED light source 102, such that the magnitude of the LED voltage feedback signal $V_{LED-NEG}$ is representative of a regulator voltage $V_{REG}$ generated across the series combination of the regulation FET Q232 and the feedback resistor R242. The control circuit 140 is operable to calculate the magnitude of a load voltage $V_{LOAD}$ developed across the LED light source 102 in response to the bus voltage feedback signal $V_{BUS-FB}$ and the LED voltage feedback signal $V_{LED-NEG}$.

When operating in the current load control mode, the control circuit 140 is operable to adjust the magnitude of the bus voltage $V_{BUS}$ to control the magnitude of the regulator voltage $V_{REG}$ to a target regulator voltage $V_{REG-TRGT}$ (i.e., a minimum or "drop-out" voltage, such as, for example, approximately two volts). By controlling the regulator voltage $V_{REG}$ to the target regulator voltage $V_{REG-TRGT}$, the control circuit 140 is able to minimize the magnitude of the regulator voltage (and thus the power dissipated in the regulation FET Q232) as well as ensuring that the regulator voltage does not drop too low and the load voltage $V_{LOAD}$ does not have any voltage ripple. Accordingly, the control circuit 140 is operable to optimize the efficiency and reduce the total power dissipation of the LED driver 100 by controlling the magnitude of the bus voltage $V_{BUS}$, such that the power dissipation is optimally balanced between the flyback converter 120 and the LED drive circuit 130. In other words, the control circuit 140 is operable to adjust the magnitude of the bus voltage $V_{BUS}$ in order to reduce the total power dissipation in the flyback converter 120 and the LED drive circuit 130. In addition, since the load voltage $V_{LOAD}$ does not have any voltage ripple, the peak magnitude $I_{PK}$ of the load current $I_{LOAD}$ and thus the intensity of the LED light source 102 is maintained constant.

Figure 4A:
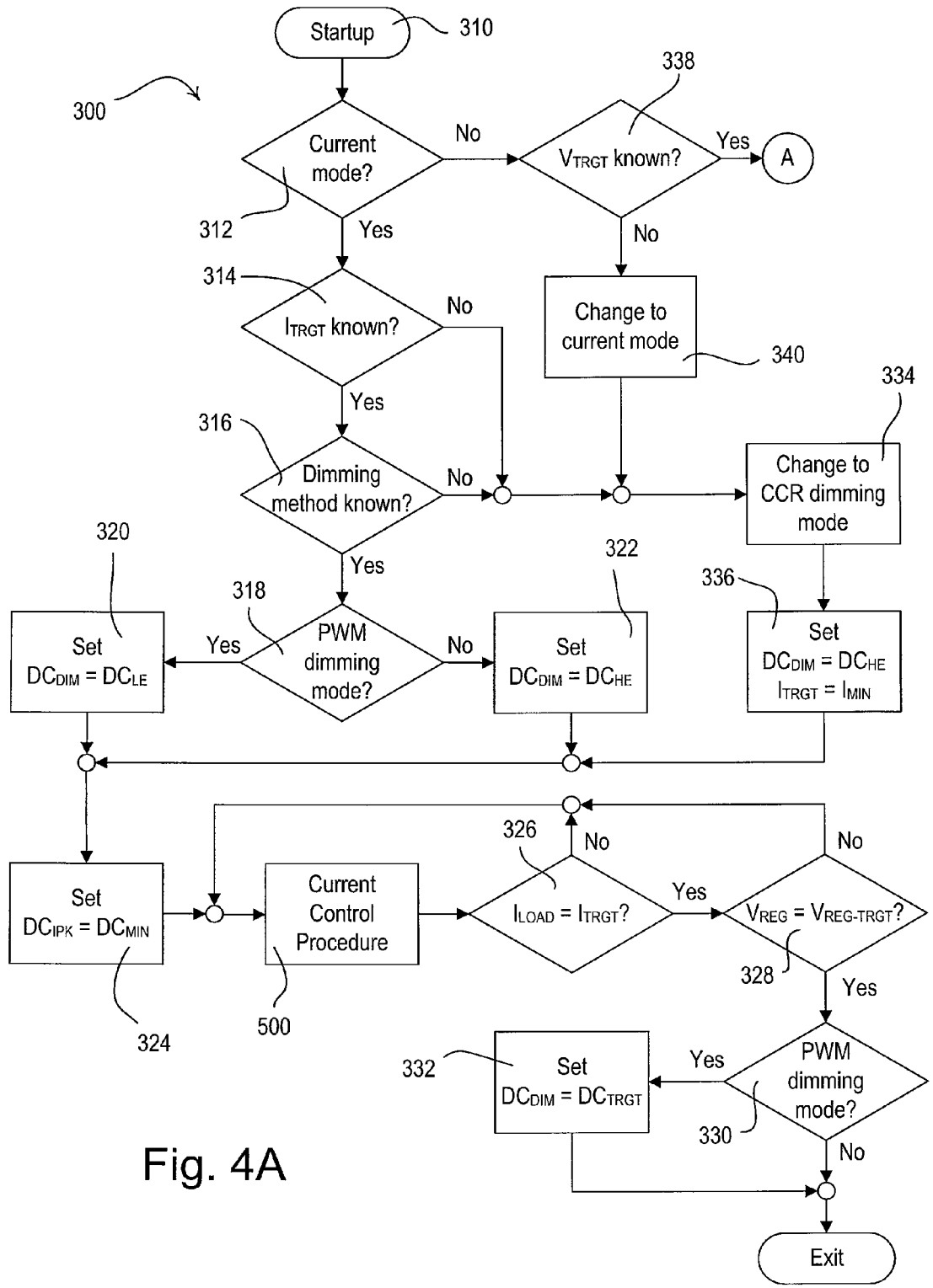
FIGS. 4A and 4B are simplified flowcharts of a startup procedure executed by a control circuit of the LED driver of FIG. 1.
Figure 4B:
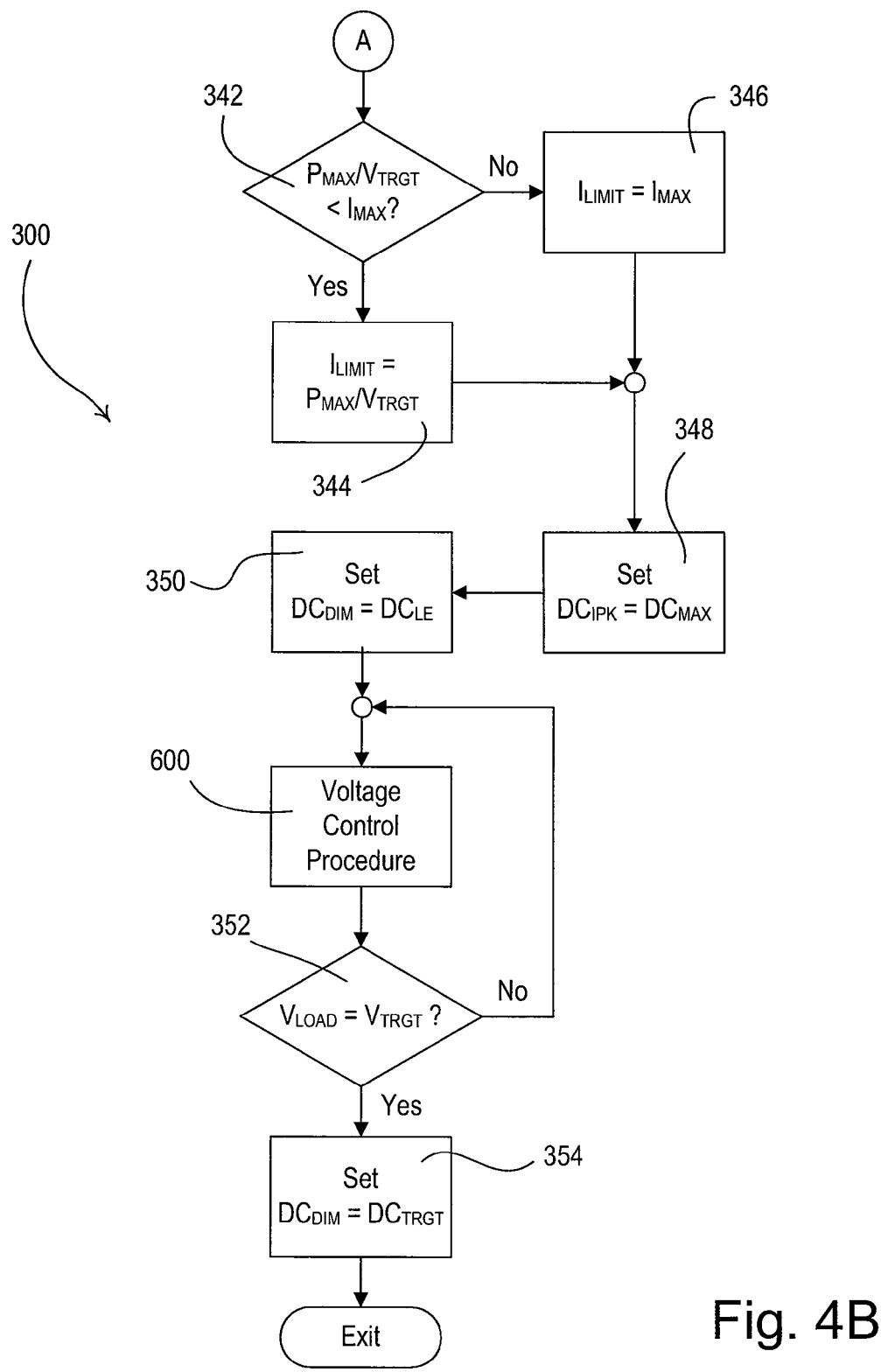

FIGS. 4A and 4B are simplified flowcharts of a startup procedure 300 executed by the control circuit 140 of the LED driver 100 when the control circuit first starts up at step 310 (e.g., when the LED driver 100 is first powered up). If the LED driver 100 is operating in the current load control mode (as stored in the memory 170) at step 312, the control circuit 140 determines if the target load current $I_{TRGT}$ and the dimming method are known (i.e., are stored in the memory 170) at steps 314, 316. If the target load current $I_{TRGT}$ and the dimming method are known at steps 314, 316, and the dimming method is the PWM dimming technique at step 318, the control circuit 140 sets the duty cycle $DC_{DIM}$ of the dimming control signal $V_{DIM}$ equal to a low-end dimming duty cycle $DC_{LE}$ at step 320. For example, the low-end duty cycle $DC_{LE}$ may be approximately 99%, such that the dimming FET Q250 is rendered conductive 99% of the time, thus causing the regulation FET Q232 to be rendered conductive approximately 1% of the time (i.e., to control the intensity of the LED light source 102 to the low-end intensity $L_{LE}$). If the dimming method is the CCR dimming technique at step 318, the control circuit 140 sets the duty cycle $DC_{DIM}$ of the dimming control signal $V_{DIM}$ equal to the high-end dimming duty cycle $DC_{HE}$ (i.e., approximately 0%) at step 322. The control circuit 140 then sets the duty cycle $DC_{IPK}$ of the peak current control signal $V_{IPK}$ to a minimum peak current duty cycle $DC_{MIN}$ at step 324.

Next, the control circuit 140 executes a current load control procedure 500 (which will be described in greater detail below with reference to FIG. 6) in order to regulate the peak magnitude $I_{PK}$ of the load current $I_{LOAD}$ flowing through the feedback resistor R242 to the target load current $I_{TRGT}$ and to regulate the regulator voltage $V_{REG}$ across the series combination of the regulation FET Q232 and the feedback resistor R242 to the target regulator voltage $V_{REG\text{-}TRGT}$. The control circuit 140 may calculate the peak magnitude $I_{PK}$ of the load current $I_{LOAD}$ from the magnitude of the load current feedback signal $V_{ILOAD}$ using equations 1 and 2 shown above. If the peak magnitude $I_{PK}$ of the load current $I_{LOAD}$ is not equal to the target load current $I_{TRGT}$ at step 326, or if the regulator voltage $V_{REG}$ (as determined from the LED voltage feedback signal $V_{LED\text{-}NEG}$) is not equal to the target regulator voltage $V_{REG\text{-}TRGT}$ at step 328, the control circuit 140 executes the current load control procedure 500 once again. The control circuit 140 continues to execute the current load control procedure 500 until the load current $I_{LOAD}$ is equal to the target load current $I_{TRGT}$ at step 326 and the regulator voltage $V_{REG}$ is equal to the target regulator voltage $V_{REG\text{-}TRGT}$ at step 328.

When the peak magnitude $I_{PK}$ of the load current $I_{LOAD}$ is equal to the target load current $I_{TRGT}$ at step 326 and the regulator voltage $V_{REG}$ is equal to the target regulator voltage $V_{REG\text{-}TRGT}$ at step 328, the control circuit 140 determines if the dimming method is the PWM dimming technique at step 330. If not, the startup procedure 300 simply exits. However, if the dimming method is the PWM dimming technique at step 330, the control circuit 140 sets the duty cycle $DC_{DIM}$ of the dimming control signal $V_{DIM}$ equal to a target dimming duty cycle $DC_{TRGT}$ at step 332 to control the intensity of the LED light source 102 to the target intensity $L_{TRGT}$ and the startup procedure 300 exits.

If the target load current $I_{TRGT}$ or the dimming method is not known (i.e., is not stored in the memory 170) at steps 314, 316, the control circuit 140 changes to the CCR dimming mode at step 334 and sets the duty cycle $DC_{DIM}$ of the dimming control signal $V_{DIM}$ equal to the high-end dimming duty cycle $DC_{HE}$ and the target load current $I_{TRG}$ equal to the minimum load current $I_{LOAD\text{-}MIN}$ (e.g., approximately two milliamps) at step 336. The control circuit 140 then regulates the load current $I_{LOAD}$ to be equal to the minimum load current $I_{LOAD\text{-}MIN}$ using the current load control procedure 500, before the startup procedure 300 exits. If the LED driver 100 is operating in the voltage load control mode at step 312 and the target load voltage $V_{TRGT}$ is not known (i.e., not stored in the memory 170) at step 338, the control circuit 140 changes to the current load control mode at step 340. The control circuit 140 then changes to the CCR dimming mode at step 334 and sets the duty cycle $DC_{DIM}$ of the dimming control signal $V_{IDIM}$ to the high-end dimming duty cycle $DC_{HE}$ and the target load current $I_{TRGT}$ to the minimum load current $I_{LOAD\text{-}MIN}$ at step 336, before the control circuit 140 regulates the load current $I_{LOAD}$ to the minimum load current $I_{LOAD\text{-}MIN}$ using the current load control procedure 500 and the startup procedure 300 exits. Because at least one of the target load current $I_{TRGT}$ and the dimming method is not known, the control circuit 140 controls the flyback converter 120 and the LED drive circuit 130 to provide the minimum amount of current to the LED light source 102 such that the LED light source is not damaged by being exposed to excessive voltage or current.

Referring to FIG. 4B, if the LED driver 100 is operating in the voltage load control mode at step 312 and the target load voltage $V_{TRGT}$ is known (i.e., stored in the memory 170) at step 338, the control circuit 140 determines a current limit $I_{DIM}$ to which the load current $I_{LOAD}$ will be limited during the voltage load control mode. Specifically, if a maximum power dissipation $P_{MAX}$ divided by the target load voltage $V_{TRGT}$ is less than a maximum load current $I_{MAX}$ at step 342, the control circuit 140 sets the current limit $I_{LIMIT}$ to be equal to the maximum power dissipation $P_{MAX}$ divided by the target load voltage $V_{TRGT}$ at step 344. Otherwise, the control circuit 140 sets the current limit $I_{LIMIT}$ to be equal to the maximum load current $I_{MAX}$ at step 346. At step 348, the control circuit 140 sets the duty cycle $DC_{IPK}$ of the peak current control signal $V_{IPK}$ to a maximum peak current duty cycle $DC_{MAX}$ (i.e., 100%). At step 350, the control circuit 140 sets the duty cycle $DC_{DIM}$ of the dimming control signal $V_{DIM}$ equal to the low-end dimming duty cycle $DC_{LE}$, such that the dimming FET Q250 is rendered conductive 99% of the time, and the regulation FET Q232 is rendered conductive approximately 1% of the time.

Next, the control circuit 140 regulates the load voltage $V_{LOAD}$ across the LED light source 102 to the target load voltage $V_{TRGT}$ using a voltage load control procedure 600 (which will be described in greater detail below with reference to FIG. 7). If the load voltage $V_{LOAD}$ is not equal to the target load voltage $V_{TRGT}$ at step 352, the control circuit 140 executes the voltage load control procedure 600 once again. When the load voltage $V_{LOAD}$ is equal to the target load voltage $V_{TRGT}$ at step 352, the control circuit 140 sets the duty cycle $DC_{DIM}$ of the dimming control signal $V_{DIM}$ equal to the target dimming duty cycle $DC_{TRGT}$ at step 354 to control the intensity of the LED light source 102 to the target intensity $L_{TRGT}$ and the startup procedure 300 exits.

Figure 5:
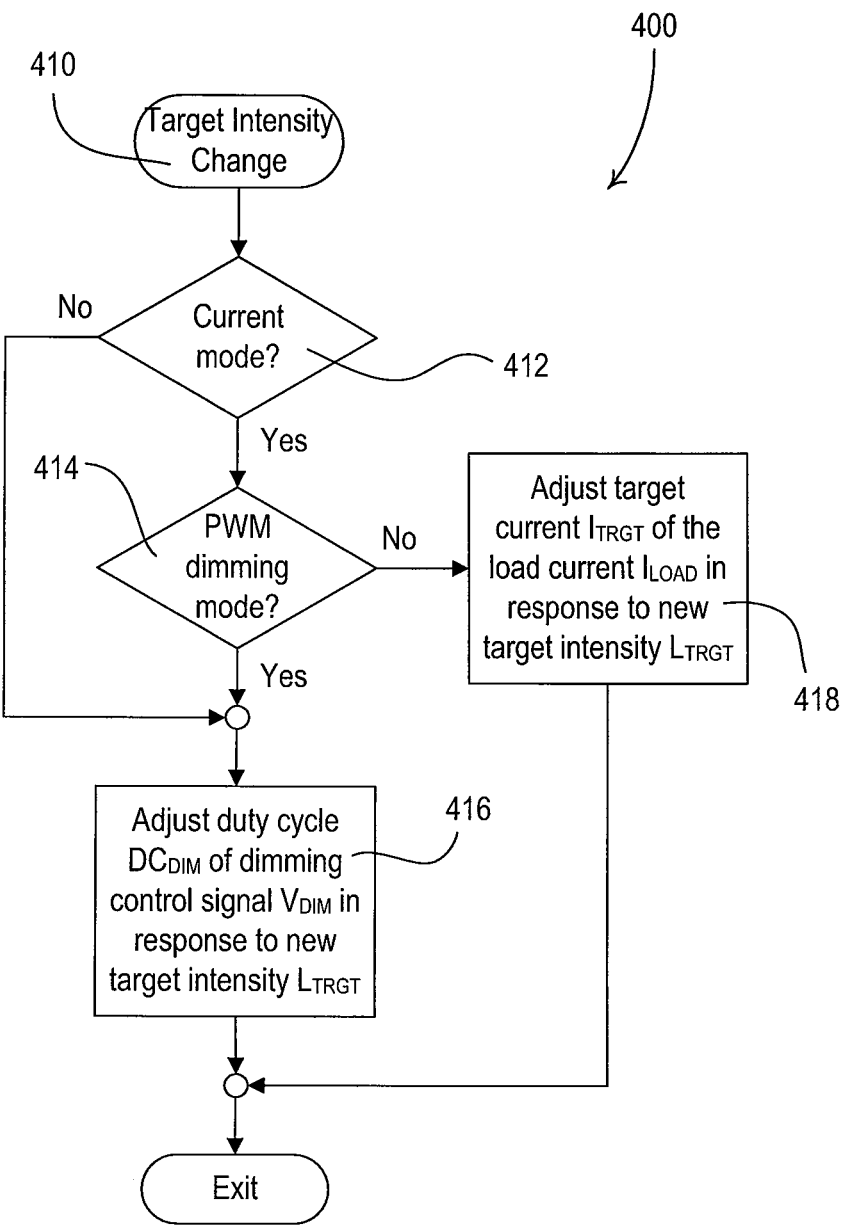
FIG. 5 is a simplified flowchart of a target intensity procedure executed by the control circuit of the LED driver of FIG. 1.

FIG. 5 is a simplified flowchart of a target intensity procedure 400 executed by the control circuit 140 of the LED driver 100 (when both the target load current $I_{TRGT}$ or the dimming method are known). The control circuit 140 executes the target intensity procedure 400 when the target intensity $L_{TRGT}$ changes at step 410, for example, in response to a change in the DC magnitude of the target intensity control signal $V_{TRGT}$ generated by the phase-control input circuit 160. If the LED driver 100 is operating in the current load control mode (as stored in the memory 170) at step 412, the control circuit 140 determines at step 414 if the LED driver is using the PWM dimming technique (as stored in the memory 170). If so, the control circuit 140 adjusts the duty cycle $DC_{DIM}$ of the dimming control signal $V_{DIM}$ at step 416 in response to the new target intensity $L_{TRGT}$, so as to control the intensity of the LED light source 102 to the new target intensity $L_{TRGT}$. If the LED driver 100 is operating in the current load control mode at step 412 and with the CCR dimming technique at step 414, the control circuit 140 adjusts the target load current $I_{TRGT}$ of the load current $I_{LOAD}$ in response to the new target intensity $L_{TRGT}$ at step 418 before the target intensity procedure 400 exits. Specifically, the control circuit 140 adjusts the duty cycle $DC_{IPK}$ of the peak current control signal $V_{IPK}$ at step 418, so as to control the magnitude of the load current $I_{LOAD}$ towards the target load current $I_{TRGT}$. If the LED driver 100 is operating in the voltage load control mode at step 412, the control circuit 140 adjusts the duty cycle $DC_{DIM}$ of the dimming control signal $V_{DIM}$ in response to the new target intensity $L_{TRGT}$ at step 416 and the target intensity procedure 400 exits.

Figure 6:
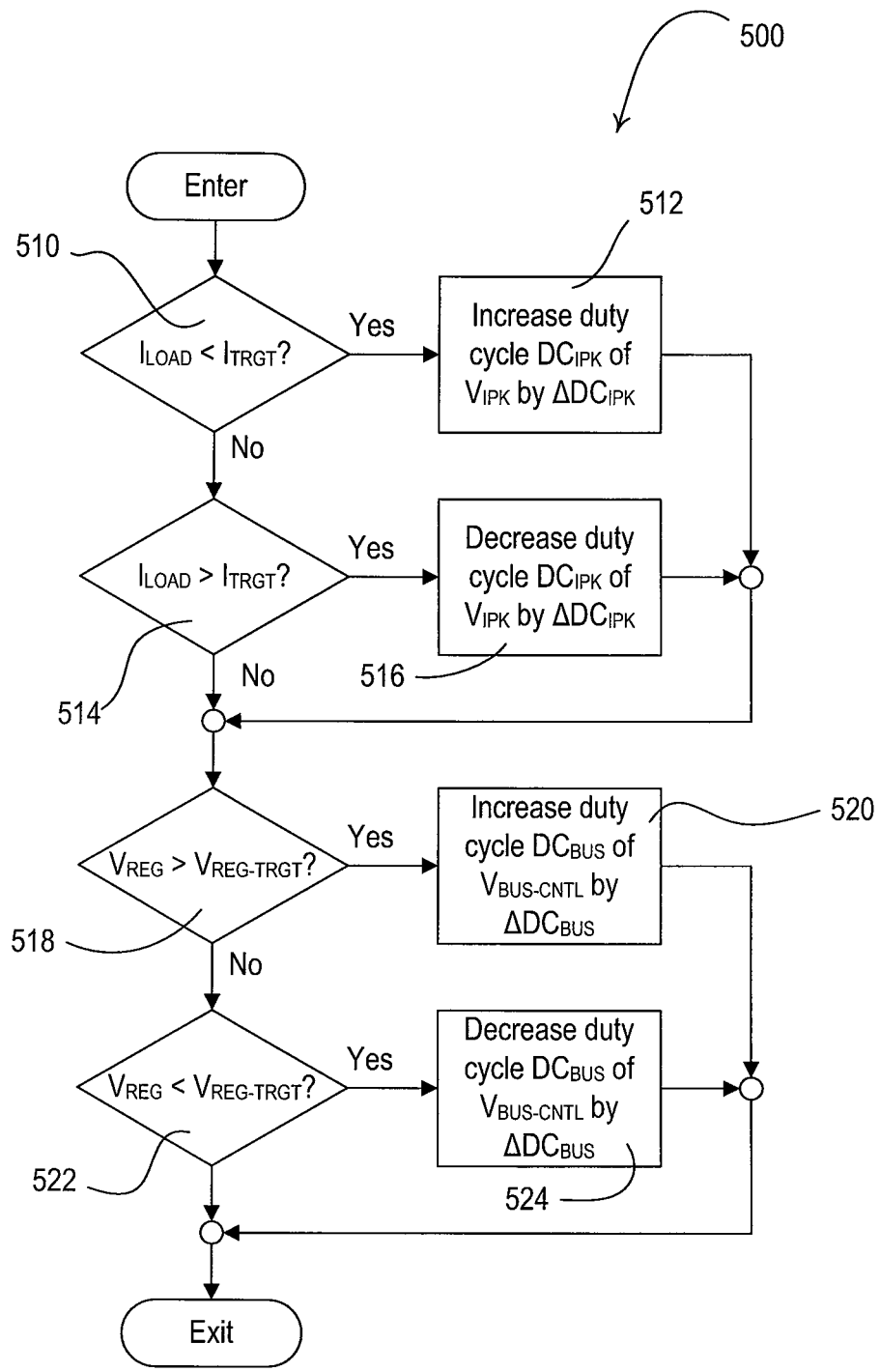
FIG. 6 is a simplified flowchart of a current load control mode procedure executed by the control circuit of the LED driver of FIG. 1 in a current load control mode.

FIG. 6 is a simplified flowchart of the current load control mode procedure 500, which is executed periodically by the control circuit 140 when the LED driver 100 is operating in the current load control mode. The current load control mode procedure 500 allows the control circuit 140 to regulate the peak magnitude $I_{PK}$ of the load current $I_{LOAD}$ flowing through the feedback resistor R242 to the target load current $I_{TRGT}$ and to control the magnitude of the regulator voltage $V_{REG}$ across the series combination of the regulation FET Q232 and the feedback resistor R242 by controlling the magnitude of the bus voltage $V_{BUS}$. For example, the control circuit 140 may determine the peak magnitude of the load current $I_{LOAD}$ from the average magnitude $I_{AVE}$ of the load current $I_{LOAD}$ and the duty cycle $DC_{DIM}$ of the dimming control signal $V_{DIM}$, i.e., $I_{PK}=I_{AVE}/(1-DC_{DIM})$, as shown in Equation 2 above. If the peak magnitude $I_{PK}$ of the load current $I_{LOAD}$ is less than the target load current $I_{TRGT}$ at step 510, the control circuit 140 increases the duty cycle $DC_{IPK}$ of the peak current control signal $V_{IPK}$ by a predetermined percentage $\Delta DC_{IPK}$ at step 512. Accordingly, the magnitude of the gate voltage $V_{IPK-G}$ at the gate of the regulation FET Q232 will increase, thus causing the peak magnitude $I_{PK}$ of the load current $I_{LOAD}$ to increase. If the load current $I_{LOAD}$ is not less than the target load current $I_{TRGT}$ at step 510, but is greater than the target load current $I_{TRGT}$ at step 514, the control circuit 140 decreases the duty cycle $DC_{IPK}$ of the peak current control signal $V_{IPK}$ by the predetermined percentage $\Delta DC_{IPK}$ at step 516 to decrease the peak magnitude $I_{PK}$ of the load current $I_{LOAD}$.

Next, the control circuit 140 adjusts the magnitude of the bus voltage $V_{BUS}$ in order to minimize the regulator voltage $V_{REG}$ to minimize the power dissipation in the FET Q232, while ensuring that the regulator voltage does not drop too low and the load voltage $V_{LOAD}$ does not have any voltage ripple. Specifically, if the regulator voltage $V_{REG}$ (as determined from the LED voltage feedback signal $V_{LED-NEG}$) is greater than the target regulator voltage $V_{REG-TRGT}$ at step 518, the control circuit 140 increases the duty cycle $DC_{BUS}$ of the bus voltage control signal $V_{BUS-CNTL}$ by the predetermined percentage $\Delta DC_{BUS}$ at step 520 to decrease the magnitude of the bus voltage $V_{BUS}$ and thus decrease the magnitude of the regulator voltage $V_{REG}$. If the regulator voltage $V_{REG}$ is not greater than the target regulator voltage $V_{REG-TRGT}$ at step 518, but is less than the target regulator voltage $V_{REG-TRGT}$ at step 522, the control circuit 140 decreases the duty cycle $DC_{BUS}$ of the bus voltage control signal $V_{BUS-CNTL}$ by the predetermined percentage $\Delta DC_{BUS}$ at step 524 to increase the magnitude of the bus voltage $V_{BUS}$ to ensure that the regulator voltage $V_{REG}$ does not drop too low. If the load current $I_{LOAD}$ is equal to the target load current $I_{TRGT}$ at steps 510, 514, and the regulator voltage $V_{REG}$ is equal to the target regulator voltage $V_{REG-TRGT}$ at steps 518, 522, the current load control mode procedure 500 simply exits without adjusting the duty cycle $DC_{IPK}$ of the peak current control signal $V_{IPK}$ or the duty cycle $DC_{BUS}$ of the bus voltage control signal $V_{BUS-CNTL}$.

Figure 7:
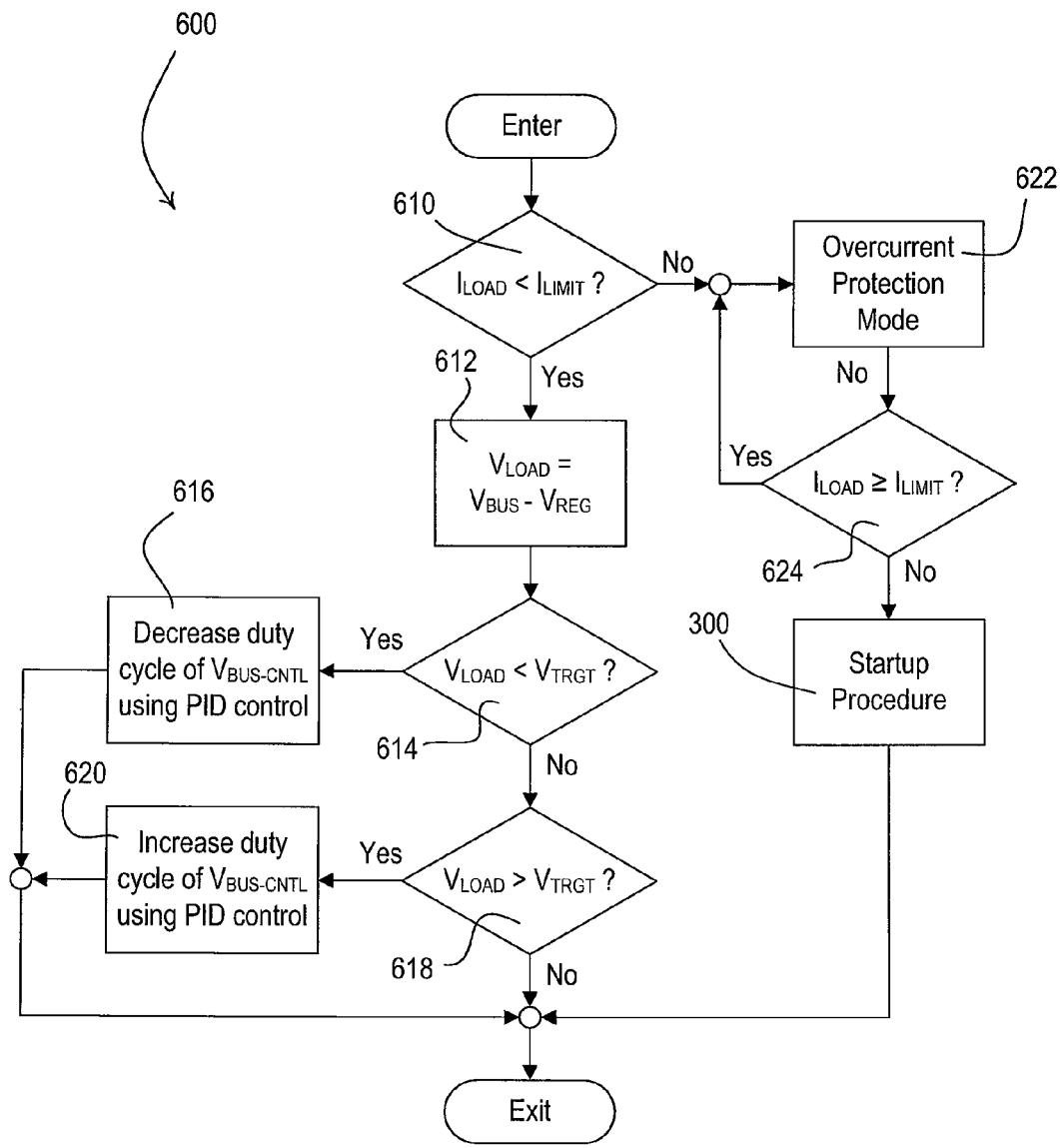
FIG. 7 is a simplified flowchart of a voltage load control mode procedure executed by the control circuit of the LED driver of FIG. 1 in a voltage load control mode.

FIG. 7 is a simplified flowchart of a voltage load control mode procedure 600, which is executed periodically by the control circuit 140 when the LED driver 100 is operating in the voltage load control mode. The voltage load control mode procedure 600 allows the control circuit 140 to regulate the load voltage $V_{LOAD}$ to the target load voltage $V_{TRGT}$ by controlling the magnitude of the bus voltage $V_{BUS}$. If the magnitude of the load current $I_{LOAD}$ is less than the current limit $I_{LIMIT}$ at step 610, the control circuit 140 subtracts the magnitude of the regulator voltage $V_{REG}$ (as represented by the LED voltage feedback signal $V_{LED-NEG}$) from the magnitude of the bus voltage $V_{BUS}$ (as represented by the bus voltage feedback signal $V_{BUS-FB}$) at step 612 to calculate the magnitude of the load voltage $V_{LOAD}$. If the load voltage $V_{LOAD}$ is less than the target load voltage $V_{TRGT}$ at step 614, the control circuit 140 decreases the duty cycle $DC_{BUS}$ of the bus voltage control signal $V_{BUS-CNTL}$ using a proportional-integral-derivative (PID) control technique at step 616 to thus increase the magnitude of the bus voltage $V_{BUS}$, before the voltage load control mode procedure 600 exits. If the load voltage $V_{LOAD}$ is not less than the target load voltage $V_{TRGT}$ at step 614, but is greater than the target load voltage $V_{TRGT}$ at step 618, the control circuit 140 increases the duty cycle $DC_{BUS}$ of the bus voltage control signal $V_{BUS-CNTL}$ using the PID control technique at step 620 to thus decrease the magnitude of the bus voltage $V_{BUS}$, before the voltage load control mode procedure 600 exits. If the load voltage $V_{LOAD}$ is not less than the target load voltage $V_{TRGT}$ at step 614 and is not greater than the target load voltage $V_{TRGT}$ at step 618 (i.e., the load voltage $V_{LOAD}$ is equal to the target load voltage $V_{TRGT}$), the voltage load control mode procedure 600 exits without adjusting the duty cycle $DC_{BUS}$ of the bus voltage control signal $V_{BUS-CNTL}$.

If the magnitude of the load current $I_{LOAD}$ is greater than or equal to the current limit $I_{LIMIT}$ at step 610, the control circuit 140 begins to operate in an overcurrent protection mode at step 622 in order to limit the load current $I_{LOAD}$ to be less than the current limit $I_{LIMIT}$. For example, the control circuit 140 may decrease the duty cycle $DC_{IPK}$ of the peak current control signal $V_{IPK}$ until the load current $I_{LOAD}$ becomes less than the current limit $I_{LIMIT}$ at step 624. During the overcurrent protection mode, the load voltage $V_{LOAD}$ may drop lower than the target load voltage $V_{TRGT}$. The control circuit continues to operate in the overcurrent protection mode at step 622 while the magnitude of the load current $I_{LOAD}$ remains greater than or equal to the current limit $I_{LIMIT}$ at step 624. When the magnitude of the load current $I_{LOAD}$ decreases below the current limit $I_{LIMIT}$ at step 624, the control circuit 140 executes the startup procedure 300 (as shown in FIGS. 4A and 4B) and the voltage load control mode procedure 600 exits.

Figure 8:
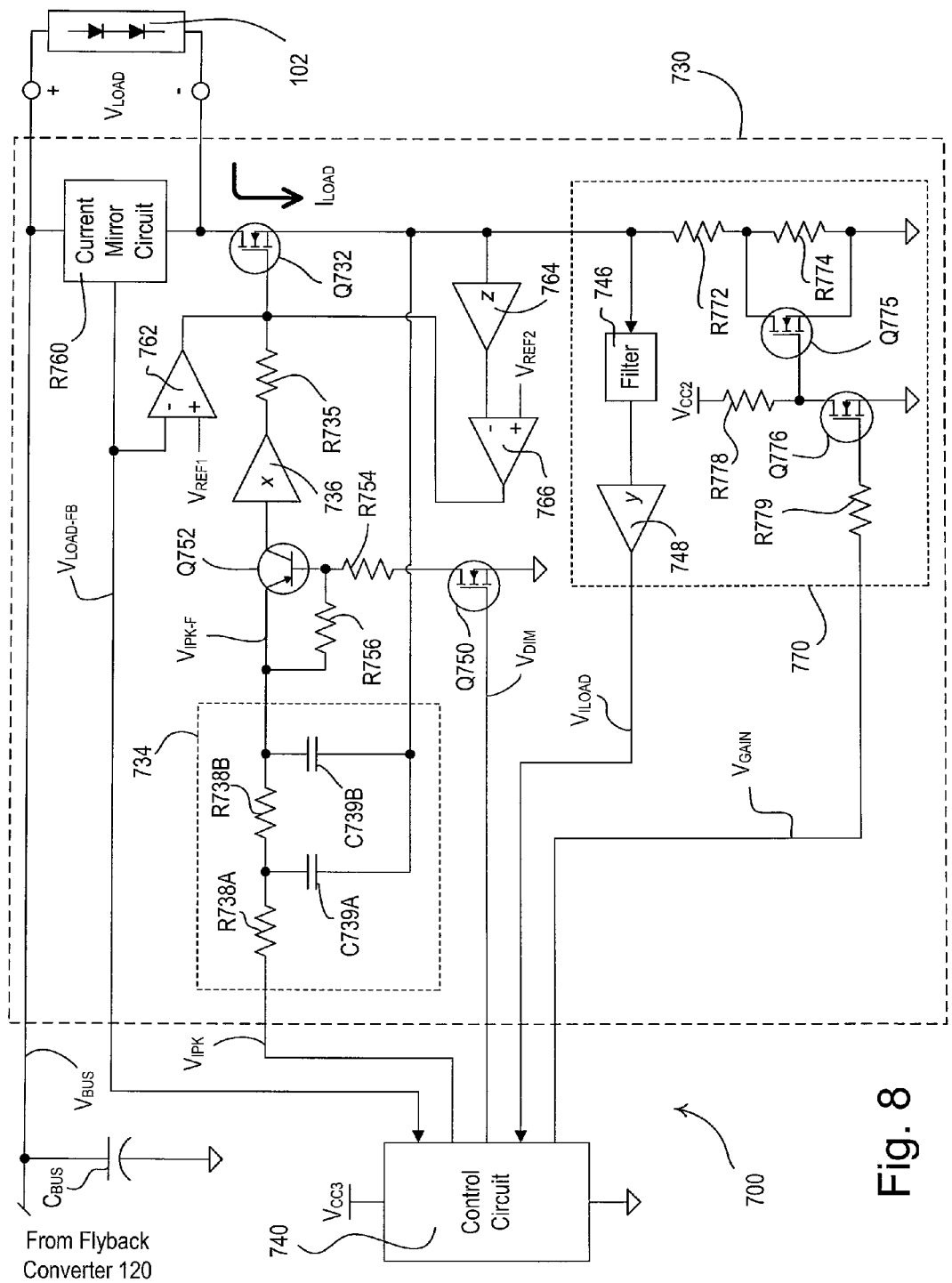
FIG. 8 is a simplified schematic diagram of an LED drive circuit of an LED driver according to a second embodiment of the present invention.

FIG. 8 is a simplified schematic diagram of an LED drive circuit 730 of an LED driver 700 according to a second embodiment of the present invention. The LED drive circuit 730 is controlled by a control circuit 740 in response to the peak current control signal $V_{IPK}$ in a similar manner as the control circuit 130 controls the LED drive circuit 130 of the first embodiment. In the current load control mode, the control circuit 740 is operable to control the peak magnitude $I_{PK}$ of the load current $I_{LOAD}$ to range from approximately the minimum load current $I_{LOAD-MIN}$ to the maximum load current $I_{LOAD-MAX}$ to dim the LED light source 102 across the dimming range. According to the second embodiment of the present invention, the maximum load current $I_{LOAD-MAX}$ is at least one hundred times greater than the minimum load current $I_{LOAD-MIN}$. For example, the minimum load current $I_{LOAD-MIN}$ may be approximately two milliamps, and the maximum load current $I_{LOAD-MAX}$ may be approximately two amps, such that the maximum load current $I_{LOAD-MAX}$ is one thousand times greater than the minimum load current $I_{LOAD-MIN}$.

The LED drive circuit 730 comprises a regulation FET Q732 coupled in series with the LED light source 102 for controlling the magnitude of the load current $I_{LOAD}$ conducted through the LED light source 102. The LED drive circuit 730 comprises a filter circuit 734 that receives the peak current control signal $V_{IPK}$ from the control circuit 740 and generates the filtered peak current control signal $V_{IPK-F}$. Specifically, the filter circuit 734 comprises a two-stage RC filter having two resistors R738A, R739A (e.g., both having resistances of approximately 10 kΩ) and two capacitors C738B, C739B (e.g., both having capacitances of approximately 1 µF). As shown in FIG. 8, the filter circuit 734 is referenced to the source of the regulation FET Q732. The filtered peak current control signal $V_{IPK-F}$ is coupled to the gate of the regulation FET Q732 via an amplifier circuit 736 and a resistor R735 (e.g., having a resistance of approximately 150Ω). The amplifier circuit 736 may have, for example, a gain x of approximately one, such that the amplifier circuit simply operates as a buffer.

The LED drive circuit 730 also comprises a dimming FET Q750, which is controlled in response to the dimming control signal $V_{DIM}$ from the control circuit 140 to dim the LED light source 102 using the PWM dimming technique (in a similar manner as the dimming FET Q250 of the first embodiment is controlled). An NPN bipolar junction transistor Q752 is coupled between the filter circuit 732 and the amplifier circuit 734 for selectively coupling the filtered peak current control signal $V_{IPK-F}$ to the amplifier circuit. The dimming FET Q750 is coupled to the base of the transistor Q752 via a resistor R754 (e.g., having a resistance of approximately 100 kΩ). A resistor R756 is coupled between the emitter and the base of the transistor Q752 and has, for example, a resistance of approximately 100 kΩ. When the dimming FET Q750 is controlled to be conductive, the transistor Q752 is also rendered conductive, thus coupling the filtered peak current control signal $V_{IPK-F}$ to the amplifier circuit 734, such that the regulation FET Q732 is controlled to be conductive. When the dimming FET Q750 is controlled to be non-conductive, the transistor Q752 is also rendered non-conductive and the filtered peak current control signal $V_{IPK-F}$ is not provided to the amplifier circuit 734, such that the regulation FET Q732 is rendered non-conductive.

The LED drive circuit 730 comprises a current mirror circuit R760, which is coupled across the LED light source 102 and generates a load voltage feedback signal $V_{LOAD-FB}$ representative of the magnitude of the load voltage $V_{LOAD}$. The control circuit 740 receives the load voltage feedback signal $V_{LOAD-FB}$, such that the control circuit does not need to calculate the magnitude of the load voltage by subtracting the magnitude of the regulator voltage $V_{REG}$ from the magnitude of the bus voltage $V_{BUS}$ (as in the first embodiment). The load voltage feedback signal $V_{LOAD-FB}$ is also provided to an inverting input of a comparator 762 for providing over-voltage protection for the LED drive circuit 730. When the magnitude of the load voltage feedback signal $V_{LOAD-FB}$ exceeds the magnitude of a first reference voltage $V_{REF1}$, the comparator 762 is operable to pull the gate of the regulation FET Q732 down towards circuit common, thus rendering the regulation FET Q732 non-conductive and controlling the load voltage $V_{LOAD}$ to approximately zero volts. The magnitude of the first reference voltage $V_{REF1}$ corresponds to a magnitude of the load voltage $V_{LOAD}$ that represents an over-voltage condition for the LED light source 102. For example, the magnitude of the first reference voltage $V_{REF1}$ may be chosen such that the regulation FET Q732 is rendered non-conductive when the magnitude of the load voltage $V_{LOAD}$ exceeds approximately 40 volts for a Class 2 LED light source.

The LED drive circuit 730 comprises an adjustable gain feedback circuit 770 that allows the control circuit 740 to properly measure the peak magnitude $I_{PK}$ of the load current $I_{LOAD}$ from the minimum load current $I_{LOAD-MIN}$ to the maximum load current $I_{LOAD-MAX}$, which may be approximately one thousand times greater than the minimum load current $I_{LOAD-MIN}$. The adjustable gain feedback circuit 770 comprises a filter circuit 746 and an amplifier circuit 748 for generating the load current feedback signal $V_{ILOAD}$ (in a similar manner as the filter circuit 246 and the amplifier circuit 248 of the feedback circuit 242 of the first embodiment). The amplifier circuit 748 may comprise a non-inverting operational amplifier circuit having a gain y (e.g., approximately 20). The adjustable gain feedback circuit 770 is controlled to adjust the magnitude of the load current feedback signal $V_{ILOAD}$ in response to a gain control signal $V_{GAIN}$ generated by the control circuit 740 when operating in the current load control mode. The adjustable gain feedback circuit 770 comprises two feedback resistors R772, R774, which are coupled in series with the regulation FET Q732 (i.e., to replace the feedback resistor R244 of the feedback circuit 242 of the first embodiment). For example, the resistors R772, R774 may have resistances of approximately 0.0375Ω and 1.96Ω, respectively. A FET Q775 is coupled across the second feedback resistor R774 and is controlled to be conductive and non-conductive to control the gain (i.e., the magnitude) of the load current feedback signal $V_{ILOAD}$. The gain control signal $V_{GAIN}$ is coupled to the gate of the FET Q775 via a drive circuit comprising a FET Q776 and two resistors R778, R779 (e.g., having resistances of approximately 5 kΩ and 1 kΩ, respectively).

According to the second embodiment of the present invention, the gain control signal $V_{GAIN}$ is controlled so as to adjust the equivalent resistance RFB of the adjustable gain feedback circuit 770 (to thus increase the gain of the adjustable gain feedback circuit) when the magnitude of the load current $I_{LOAD}$ is less than or equal to a threshold current $I_{TH}$ (e.g., approximately 100 mA). The magnitude of the load current $I_{LOAD}$ crosses the threshold current $I_{TH}$ in the middle of the dimming range of the LED driver 700. When the magnitude of the load current $I_{LOAD}$ is less than or equal to the threshold current $I_{TH}$, the gain control signal $V_{GAIN}$ is controlled to be high (i.e., at approximately the third supply voltage $V_{CC3}$), such that the FET Q776 is rendered conductive and the gate of the FET Q775 is pulled down towards circuit common. Accordingly, the FET Q775 is rendered non-conductive, and both the first and second feedback resistors R772, R774 (i.e., approximately 2Ω total resistance) is coupled in series with the regulation FET Q732. When the magnitude of the load current $I_{LOAD}$ is greater than the threshold current $I_{TH}$, the gain control signal $V_{GAIN}$ is controlled to be low (i.e., at approximately circuit common) rendering the FET Q776 non-conductive, such that the gate of the FET Q775 is pulled up towards the second supply voltage $V_{CC2}$, and the FET Q775 is rendered conductive. Thus, only the first feedback resistor R772 (i.e., approximately 0.0375Ω) is coupled in series with the regulation FET Q732. For example, the control circuit 740 may control the gain control signal $V_{GAIN}$ using some hysteresis, such that the FET Q775 is not quickly and unstably rendered conductive and non-conductive.

When the FET Q775 of the adjustable gain feedback circuit 770 is rendered conductive and non-conductive, there is a step change in the resistance coupled in series with the regulation FET Q732 (and thus a step change in the magnitude of the voltage at the source of the regulation FET). As a result, there may also be a sharp change in the load current $I_{LOAD}$, which could cause a slight and temporary increase or decrease (e.g., a "blip") in the intensity of the LED light source 102. Because the threshold current $I_{TH}$ is in the middle of the dimming range of the LED driver 100, it is very desirable to have no fluctuations of the intensity of the LED light source 102 as the intensity of the LED light source is being dimmed up or dimmed down. Since the filter circuit 732 is referenced to the source of the regulation FET Q732, changes in the magnitude of the voltage at the source do not greatly affect the magnitude of the peak current control signal $V_{IPK}$ and thus the gate-source voltage of the regulation FET Q732. Accordingly, the large fluctuations of the load current $I_{LOAD}$ (and thus the intensity of the LED light source 102) are minimized when the FET Q775 is rendered conductive and non-conductive at the threshold current $I_{TH}$.

In addition, the control circuit 740 "pre-loads" the peak current control signal $V_{IPK}$ whenever the magnitude of the load current $I_{LOAD}$ transitions above or below the threshold current $I_{TH}$ to avoid large fluctuations of the load current $I_{LOAD}$ and thus the intensity of the LED light source 102.

Specifically, when the magnitude of the load current $I_{LOAD}$ transitions across the threshold current $I_{TH}$, the control circuit 740 enters a transition mode in which the closed loop control of the regulation FET Q732 (i.e., the current load control procedure 500) is paused. After entering the transition mode, the control circuit 740 adjusts the peak current control signal $V_{IPK}$ by a predetermined correction factor $\Delta V_{IPK}$, and then waits for a first delay time $T_{DELAY1}$ (e.g., approximately one to two milliseconds) before controlling the gain control signal $V_{GAIN}$ to render the FET Q775 either conductive or non-conductive. After controlling the FET Q775, the control circuit 740 waits for a second delay time $T_{DELAY2}$ after which the control circuit exits the transition mode and resumes the close loop control of the regulation FET Q732. For example, the second delay time $T_{DELAY2}$ may be approximately ten milliseconds when the magnitude of the load current $I_{LOAD}$ has transitioned above the threshold current $I_{TH}$ and approximately four milliseconds when the magnitude of the load current $I_{LOAD}$ has transitioned below the threshold current $I_{TH}$.

Referring back to FIG. 8, the LED drive circuit 730 further comprises an over-current protection circuit having an amplifier circuit 764 (e.g., having a gain z of approximately two) and a comparator 766. When the magnitude of load current $I_{LOAD}$ increases such that the magnitude of the voltage at the non-inverting input of the comparator 766 exceeds the magnitude of a second reference voltage $V_{REF2}$, the comparator 766 is operable to pull the gate of the regulation FET Q732 down towards circuit common, thus rendering the regulation FET Q732 non-conductive and controlling the load current $I_{LOAD}$ to approximately zero amps. The magnitude of the second reference voltage $V_{REF2}$ corresponds to a magnitude of the load current $I_{LOAD}$ that represents an over-current condition through the LED light source 102. For example, the magnitude of the second reference voltage $V_{REF2}$ may be chosen such that the regulation FET Q732 is rendered non-conductive when the magnitude of the load current $I_{LOAD}$ exceeds approximately four amps.

Figure 9:
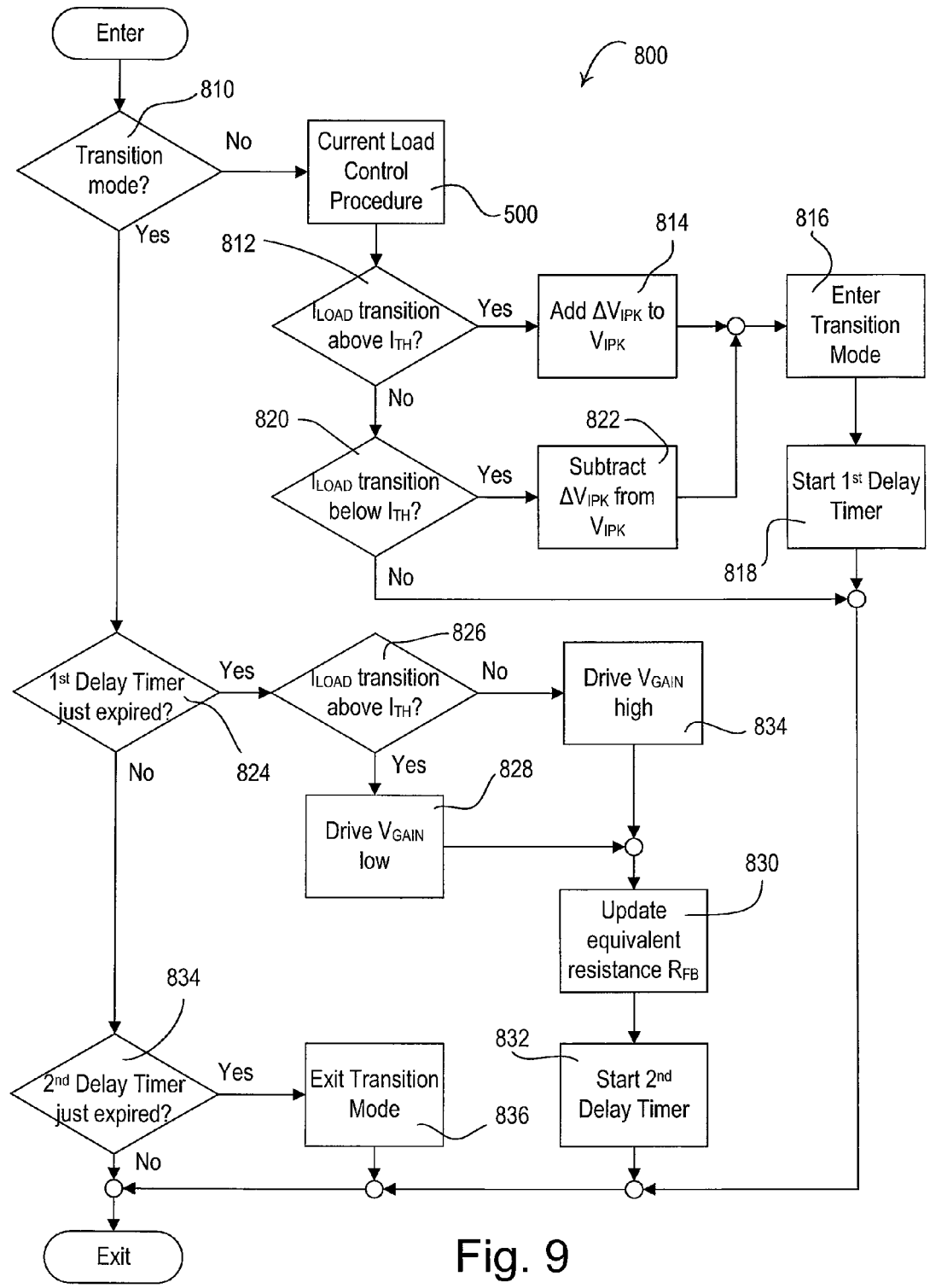
FIG. 9 is a simplified flowchart of a transition mode procedure executed periodically by a control circuit of the LED driver of FIG. 8 according to the second embodiment of the present invention.

FIG. 9 is a simplified flowchart of a transition mode procedure 800 executed periodically by the control circuit 740 when the LED driver 700 is operating in the current load control mode. During the transition mode procedure 800, the control circuit 740 begins operating in a transition mode if the magnitude of the load current $I_{LOAD}$ has just transitioned across the threshold current $I_{TH}$. If the control circuit 740 is not in the transition mode at step 810 when the transition mode procedure 800 begins, the control circuit first executes the current load control procedure 500 (as shown in FIG. 6). For example, the control circuit 740 may calculate the peak magnitude $I_{PK}$ of the load current $I_{LOAD}$ using Equations 1 and 2 shown above, where the equivalent resistance $R_{FB}$ of the adjustable-gain feedback circuit 770 is dependent upon the state of the FET Q775. For example, the equivalent resistance $R_{FB}$ may be equal to approximately the resistance of the resistor R772 when the FET Q775 is conductive, and may be equal to approximately the resistance of the series combination of the first and second feedback resistors R772, R774 when the FET Q775 is non-conductive.

After executing the current load control mode procedure 500, the control circuit 740 then checks to determine if the magnitude of the load current $I_{LOAD}$ just transitioned across the threshold current $I_{TH}$. Specifically, if the magnitude of the load current $I_{LOAD}$ has risen above the threshold current $I_{TH}$ at step 812, the control circuit 740 adds the correction factor $\Delta V_{IPK}$ to the peak current control signal $V_{IPK}$ at step 814 and enters the transition mode at step 816 (i.e., execution of the current load control procedure 500 is paused). The control circuit 740 then initializes a first delay timer to the first delay time $T_{DELAY1}$ and starts the first delay timer decreasing in value with respect to time at step 818, before the transition mode procedure 800 exits. If the magnitude of the load current $I_{LOAD}$ has just dropped below the threshold current $I_{TH}$ at step 820, the control circuit 740 subtracts the correction factor $\Delta V_{IPK}$ from the peak current control signal $V_{IPK}$ at step 822, enters the transition mode at step 816, and starts the first delay timer with the first delay time $T_{DELAY1}$ at step 818, before the transition mode procedure 800 exits.

When the control circuit 740 is in the transition mode at step 810, the control circuit 740 does not executed the current load control procedure 500, and rather operates to control the FET Q775 to adjust the gain of the adjustable-gain feedback circuit 770. Specifically, when the first delay timer expires at step 824 and the magnitude of the load current $I_{LOAD}$ has risen above the threshold current $I_{TH}$ at step 826, the control circuit 740 drives the gain control signal $V_{GAIN}$ low at step 828 to render the FET Q775 conductive, such that only the first feedback resistor R772 is coupled in series with the regulation FET Q732. The control circuit 740 then updates the equivalent resistance $R_{FB}$ of the adjustable gain feedback circuit 770 to be equal to the resistance of only the resistor R772 at step 830. At step 832, the control circuit 740 initializes a second delay timer to the second delay time $T_{DELAY2}$ and starts the second delay timer decreasing in value with respect to time, before the transition mode procedure 800 exits.

When the first delay timer expires at step 824 and the magnitude of the load current $I_{LOAD}$ has dropped below the threshold current $I_{TH}$ at step 826, the control circuit 740 drives the gain control signal $V_{GAIN}$ high at step 834 to render the FET Q775 non-conductive, such that both the first and second feedback resistors R772, R774 are coupled in series with the regulation FET Q732. The control circuit 740 then adjusts resistance $R_{FB}$ of the adjustable gain feedback circuit 770 to be equal to the resistance of the series combination of the resistors R772, R774 at step 830, and starts the second delay timer with the second delay time $T_{DELAY2}$ at step 832, before the transition mode procedure 800 exits. When the second delay timer expires at step 836, the control circuit 740 exits the transition mode at step 838, such that when the transition mode procedure 800 is executed again, the current load control procedure 500 will be executed.

Figure 10:
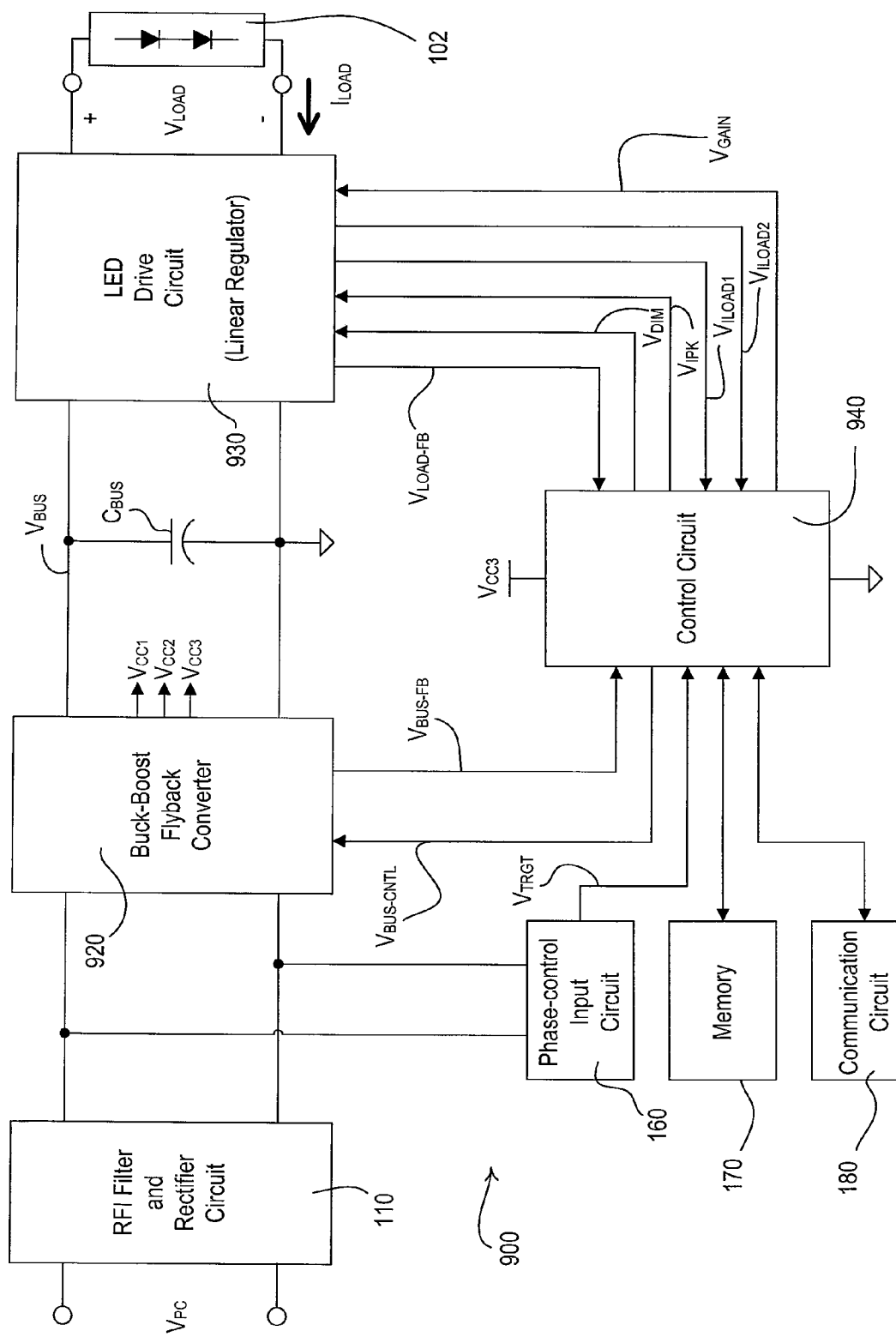
FIG. 10 is a simplified block diagram of an LED driver according to a third embodiment of the present invention.

FIG. 10 is a simplified block diagram of an LED driver 900 according to a third embodiment of the present invention. The LED driver 900 of the third embodiment includes many similar functional blocks as the LED driver 100 of the first embodiment as shown in FIG. 2. However, the LED driver 900 of the third embodiment does not include the power supply 150. Rather, the LED driver 900 comprises a buck-boost flyback converter 920, which generates the variable DC bus voltage $V_{BUS}$ across the bus capacitor $C_{BUS}$, as well as generating the various DC supply voltages $V_{CC1}$, $V_{CC2}$, $V_{CC3}$ for powering the circuitry of the LED driver.

In addition, the LED drive circuit 930 includes a multiple-output feedback circuit 970 (FIG. 12) that provides first and second load current feedback signals $V_{ILOAD1}$, $V_{ILOAD2}$ to a control circuit 940. The first load current feedback signal $V_{ILOAD1}$ is characterized by a first gain $\gamma_1$ applied to the average magnitude $I_{AVE}$ of the load current $I_{LOAD}$, while the second load current feedback signal $V_{ILOAD2}$ is characterized by a second gain $\gamma_2$. The second gain $\gamma_2$ (e.g., approximately 101) is greater than the first gain $\gamma_1$ (e.g., approximately one), such that the first and second load current feedback signals $V_{ILOAD1}$, $V_{ILOAD2}$ provide two differently scaled representations of the average magnitude $I_{AVE}$ of the load current $I_{LOAD}$. The control circuit 940 uses both of the first and second load current feedback signals $V_{ILOAD1}$, $V_{ILOAD2}$ to determine the peak magnitude $I_{IPK}$ of the load current $I_{LOAD}$, which may range from the minimum load current $I_{LOAD-MIN}$ to the maximum load current $I_{LOAD-MAX}$ (as will be described in greater detail below). Accordingly, the maximum load current $I_{LOAD-MAX}$ may be at least one hundred times greater than the minimum load current $I_{LOAD-MIN}$, for example, approximately one thousand times greater than the minimum load current $I_{LOAD-MIN}$, as in the second embodiment.

Figure 11:
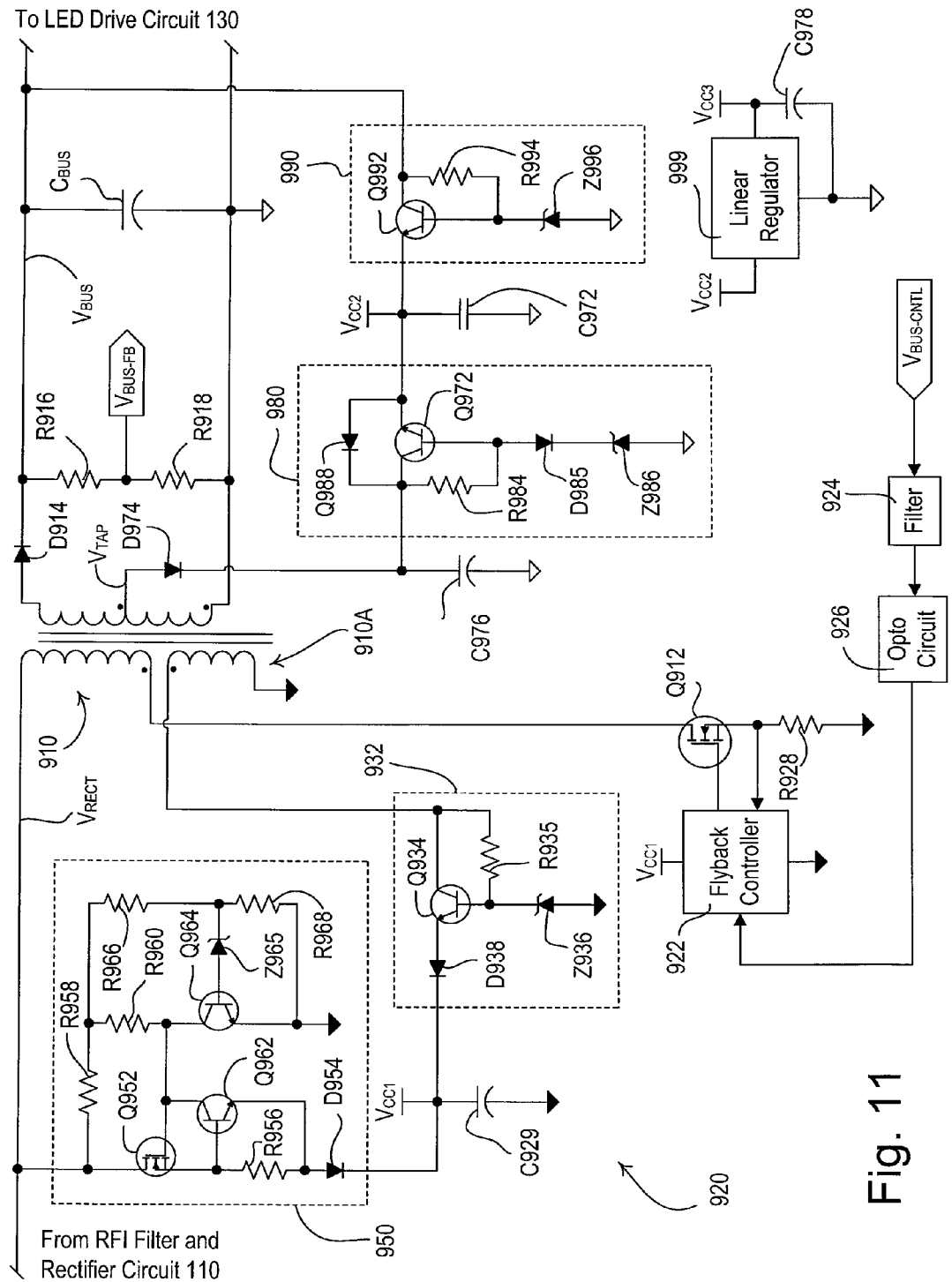
FIG. 11 is a simplified circuit diagram of a flyback converter of the LED driver of FIG. 10 according to the third embodiment of the present invention.

FIG. 11 is a simplified circuit diagram of the flyback converter 920 of the LED driver 900 of the third embodiment of the present invention. The flyback converter 920 comprises a flyback transformer 910 having a primary winding coupled in series with a BET Q912 and a feedback resistor R926. The secondary winding of the flyback transformer 910 is coupled to the bus capacitor $C_{BUS}$ via a diode D914. The secondary winding of the flyback transformer 910 comprises a center tap that generates a center tap voltage $V_{TAP}$ having a magnitude proportional to the magnitude of the bus voltage $V_{BUS}$. The bus voltage feedback signal $V_{BUS-FB}$ is generated by a voltage divider comprising two resistors R916, R918 coupled across the bus capacitor $C_{BUS}$ and is provided to the control circuit 140. The center tap voltage $V_{TAP}$ is used to generate the second supply voltage $V_{CC2}$ and the third supply voltage $V_{CC3}$ as will be described in greater detail below.

The flyback converter 920 comprises a flyback controller 922, which operates in a similar manner as the flyback controller 222 of the flyback converter 120 of the first embodiment to generate the bus voltage $V_{BUS}$ across the bus capacitor $C_{BUS}$. The flyback controller 922 controls the FET Q912 in response to the bus voltage control signal $V_{BUS-CNTL}$ received from the control circuit 140 (via a filter circuit 924 and an optocoupler circuit 926) and a control signal received from the feedback resistor R928 and representative of the current through the BET Q912.

The flyback converter 920 comprises a flyback controller power supply 932 for generating the first DC supply voltage $V_{CC1}$ (e.g., approximately 14 volts for powering the flyback controller 922) across a capacitor C929 (e.g., having a capacitance of approximately 220 µF). The flyback controller power supply 932 is coupled to a supply winding 910A of the flyback transformer 910, such that the flyback controller power supply is only able to generate the first DC supply voltage $V_{CC1}$ while the flyback converter 920 is actively generating the DC bus voltage $V_{BUS}$ (i.e., after the flyback controller 922 has started up). The flyback controller power supply 932 comprises a pass-transistor supply that includes an NPN bipolar junction transistor Q934, a resistor R935 (e.g., having a resistance of approximately 10 kΩ), a zener diode Z936 (e.g., having a breakover voltage of approximately 14 volts), and a diode D938. The emitter of the transistor Q934 is coupled to the capacitor C929 through the diode D938 and the zener diode Z936 is coupled to the base of the transistor Q934. Accordingly, the capacitor C929 is able to charge through the transistor Q934 to a voltage equal to approximately the break-over voltage of the zener diode Z936 minus the base-emitter drop of the transistor and the diode drop of the diode D938.

Since the flyback controller power supply 932 is only able to generate the first DC supply voltage $V_{CC1}$ while the flyback converter 920 is actively generating the DC bus voltage $V_{BUS}$, the flyback converter further comprises a startup power supply 950 for allowing the capacitor C929 to charge before the flyback controller 922 has started up. The startup power supply 950 comprises a cat-ear power supply including a BET Q952 for allowing the capacitor C929 to charge from the rectified voltage $V_{RECT}$ through a diode D954 and a resistor R956 (e.g., having a resistance of approximately 1Ω). The gate of the FET Q952 is coupled to the rectified voltage $V_{RECT}$ through two resistors R958, R960 (e.g., having resistances of approximately 250 kΩ and 200 kΩ, respectively), such that shortly after the beginning of a half-cycle of the AC power source 104, the FET 952 is rendered conductive allowing the capacitor C929 to charge. An NPN bipolar junction transistor Q962 is coupled to the gate of the FET Q952 for providing over-current protection in the startup power supply 950. Specifically, if the current through the FET Q952 increases such that the voltage across the resistor R956 exceeds the rated base-emitter voltage of the transistor Q962, the transistor Q962 becomes conductive, thus rendering the BET 952 non-conductive.

The gate of the FET Q952 is coupled to circuit common via an NPN bipolar junction transistor Q964. The base of the transistor Q964 is coupled to the rectified voltage $V_{RECT}$ via the resistor R958, a zener diode Z965 (e.g., having a breakover voltage of approximately 5.6 volts), and another resistor R966 (e.g., having a resistance of approximately 1 MΩ). A resistor R968 is coupled between the base and the emitter of the transistor Q964 and has, for example, a resistance of approximately 392 kΩ. When the magnitude of the rectified voltage $V_{RECT}$ increases to a magnitude such that the voltage across the resistor R968 exceeds the breakover voltage of the zener diode Z965 and the base-emitter voltage of the transistor Q964, the transistor Q964 is rendered conductive, thus pulling the gate of the PET 952 down towards circuit common. Accordingly, the PET 952 is rendered non-conductive preventing the capacitor C929 from charging from the rectified voltage $V_{RECT}$. As a result, the startup power supply 950 only allows the capacitor C929 to charge around the zero-crossings of the AC power source 104, and thus provide more efficient operation during startup of the flyback controller 922 than, for example, simply having a single resistor coupled between the rectified voltage $V_{RECT}$ and the capacitor C929. After the capacitor C929 has appropriately charged (i.e., the magnitude of the first DC supply voltage $V_{CC1}$ has exceeded the rated operating voltage of the flyback controller 922), the flyback controller power supply 932 is able to generate the first DC supply voltage $V_{CC1}$ and the startup power supply 950 ceases operating. However, the startup power supply 950 may once again begin operating during normal operation if the voltage across the supply winding 910A drops below approximately the first DC supply voltage $V_{CC1}$.

The flyback converter 920 further comprises first and second power supplies 980, 990 that have outputs that are coupled together. The first and second power supplies 980, 990 operate separately (e.g., in a complementary fashion) to generate the second DC supply voltage $V_{CC2}$ across a capacitor C972 (e.g., having a capacitance of approximately 0.1 µF) during different modes of operation of the LED driver 900. The first power supply 980 is coupled to the center tap of the flyback transformer 910 through a diode D974, and draws current from a capacitor C976, which is coupled to the input of the first power supply and has a capacitance of, for example, approximately 220 µF. The second power supply 990 is coupled to the bus voltage $V_{BUS}$ and thus draws current from the bus capacitor $C_{BUS}$. A linear regulator 999 receives the second DC supply voltage $V_{CC2}$ and generates the third DC supply voltage $V_{CC3}$ across an output capacitor C978 (e.g., having a capacitance of approximately 2.2 µf).

The magnitude of the bus voltage $V_{BUS}$ is controlled by the control circuit 940 to optimize the efficiency and reduce the total power dissipation of the LED driver 100 during the current load control mode procedure 500, and to regulate the load voltage $V_{LOAD}$ to the target load voltage $V_{TRGT}$ in a similar manner as the control circuit 140 of the first embodiment (i.e., during the voltage load control mode procedure 600). When the magnitude of the center tap voltage $V_{TAP}$ is above a cutover voltage $V_{CUT}$ (e.g., approximately 10 volts), the first power supply 980 operates charge the capacitor C972 (rather than the second power supply 990). When the magnitude of the center tap voltage $V_{TAP}$ is below the cutover voltage $V_{CUT}$, the first power supply 980 stops charging the capacitor C972, and the second power supply 990 operates to charge the capacitor C972. Accordingly, the flyback converter 920 provides a wide output range and only a single high-frequency switching transistor (i.e., FET Q912) in addition to generating the three DC supply voltages $V_{CC1}$, $V_{CC2}$, $V_{CC3}$.

Both of the power supplies 980, 990 comprise pass-transistor supplies. The first power supply 980 comprises a NPN bipolar junction transistor Q982 coupled between the diode D974 and the capacitor C972 for conducting current to the capacitor C972. The first power supply 980 further comprises a resistor R984, which is coupled between the collector and the emitter of the transistor Q982 and has, for example, a resistance of approximately 10 kΩ. A diode D985 and a zener diode Z986 (e.g., having a breakover voltage of approximately 10 volts) are coupled in series between the base of the transistor Q982 and circuit common, such that the capacitor C972 is able to charge to a voltage equal to approximately the breakover voltage of the zener diode. A diode D988 is coupled from the emitter to the collector of the transistor Q982, such that when the transistor Q982 is non-conductive, the voltage across the capacitor C972 is maintained at approximately a diode drop below the second DC supply voltage $V_{CC2}$.

The second power supply 990 comprises an NPN bipolar junction transistor Q992 coupled between the bus voltage $V_{BUS}$ and the capacitor C972 and a resistor R994, which is coupled between the collector and the base of the transistor Q992 and has a resistance of, for example, approximately 10 kΩ. The second power supply 990 further comprises a zener diode Z996 coupled between the base of the transistor Q992 and circuit common, such that the capacitor C972 is operable to charge through the transistor Q992 to a voltage equal to approximately the breakover voltage of the zener diode minus the base-emitter voltage of the transistor Q992. When the magnitude of the center tap voltage $V_{TAP}$ drops below the cutover voltage $V_{CUT}$ and the diode D988 of the first power supply 980 becomes forward biased, the second power supply 990 begins to generate the second DC supply voltage $V_{CC2}$. Since the zener diode Z986 of the first power supply 980 and the zener diode Z996 of the second power supply 990 have the same breakover voltage (i.e., approximately 10 volts), the second power supply could alternatively not comprise the zener diode Z996 and the first and second power supplies could "share" the zener diode Z986. Specifically, the base of the transistor Q992 of the second power supply 990 would be coupled to the junction of the diode D985 and the zener diode Z986 of the first power supply 980.

Figure 12:
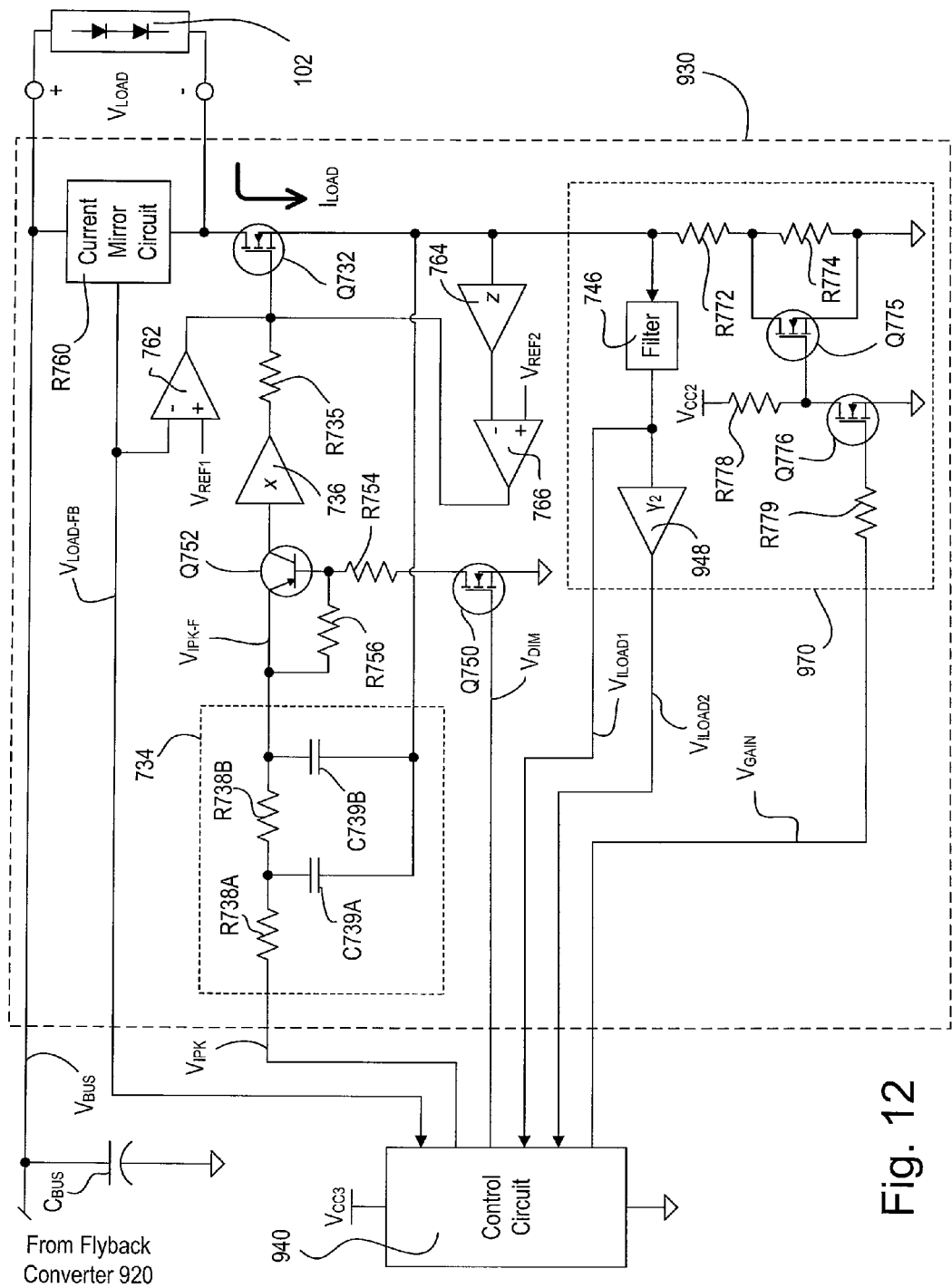
FIG. 12 is a simplified schematic diagram of an LED drive circuit of the LED driver of FIG. 10 according to the third embodiment of the present invention.

FIG. 12 is a simplified schematic diagram of the LED drive circuit 930 of the LED driver 900 according to the third embodiment of the present invention. As previously mentioned, the LED driver circuit 930 comprises the multiple-output feedback circuit 970 that generates the two load current feedback signals $V_{ILOAD1}$, $V_{ILOAD2}$. The control circuit 940 is able to control the FET Q775 to either couple only the resistor R772 or the series combination of the resistors R772, R774 in series with the regulation FET Q732. The first load current feedback signal $V_{ILOAD1}$ is produced by the filter circuit 746, and is thus simply a filtered version of the voltage generated across the feedback circuit 970 (i.e., the voltage across either the resistor R772 or the series combination of the resistors R772, R774 depending upon the state of the FET Q775). In other words, the first gain $\gamma_1$ of the first load current feedback signal $V_{ILOAD1}$ is approximately one. The second load current feedback signal $V_{ILOAD2}$ is an amplified version of the voltage generated across the feedback circuit 970, i.e., as generated by an amplifier circuit 948, such that the second gain $\gamma_2$ of the second load current feedback signal $V_{ILOAD2}$ is approximately 101. In other words, the magnitude of the second load current feedback signal $V_{ILOAD2}$ is approximately equal to the magnitude of the first load current feedback signal $V_{ILOAD1}$ multiplied by the second gain $\gamma_2$.

The control circuit 940 is operable to appropriately control the regulation FET Q732 in response to both of the load current feedback signals $V_{ILOAD1}$, $V_{ILOAD2}$. Specifically, the control circuit 940 uses the first load current feedback signal $V_{ILOAD1}$ to determine the peak magnitude $I_{PK}$ of the load current $I_{LOAD}$ when the magnitude of the second load current feedback signal $V_{ILOAD2}$ is above a maximum voltage threshold $V_{TH-MAX}$. The control circuit 940 uses the second load current feedback signal $V_{ILOAD2}$ to determine the peak magnitude $I_{PK}$ of the load current $I_{LOAD}$ when the magnitude of the second load current feedback signal $V_{ILOAD2}$ is below a minimum voltage threshold $V_{TH-MIN}$. For example, the maximum and minimum voltage thresholds $V_{TH-MAX}$, $V_{TH-MIN}$ may be approximately 3 volts and 2.95 volts respectively. In other words, the control circuit 940 only uses the second load current feedback signal $V_{ILOAD2}$ to determine the peak magnitude $I_{PK}$ of the load current $I_{LOAD}$ when the magnitude of the second load current feedback signal $V_{ILOAD2}$ is less than 2.95 volts, which is less than a rated maximum voltage (e.g., approximately 3.3 volts) of the microprocessor of the control circuit 940. When the magnitude of the second load current feedback signal $V_{ILOAD2}$ exceeds 3 volts (and also may exceed the rated maximum voltage of the microprocessor), the control circuit 940 then uses the first load current feedback signal $V_{ILOAD1}$ (which has a magnitude less than the rated maximum voltage of the microprocessor) to determine the peak magnitude $I_{PK}$ of the load current $I_{LOAD}$.

When the magnitude of the second load current feedback signal $V_{ILOAD2}$ is between the maximum voltage threshold $V_{TH-MAX}$ and the minimum voltage threshold $V_{TH-MIN}$, the control circuit 940 "slushes" (i.e., combines) the first and second load current feedback signals $V_{ILOAD1}$, $V_{ILOAD2}$ together to determine a value to use for the magnitude of the load current $I_{LOAD}$. Specifically, the control circuit 940 calculates the magnitude of the load current $I_{LOAD}$ using a weighted sum of the first and second current feedback signals $V_{ILOAD1}$, $V_{ILOAD2}$, where the values of weight factors m and n are each a function of the magnitude of the second load current feedback signal $V_{ILOAD2}$. Alternatively, the values of the weight factors could each be a function of the magnitude of the first load current feedback signal $V_{ILOAD1}$. In addition, the values of the weight factors could each alternatively be recalled from a look-up table, or could be calculated as a function of the elapsed time since the magnitude of either of the first and second load current feedback signals $V_{ILOAD1}$, $V_{ILOAD2}$ dropped below the maximum voltage threshold $V_{TH-MAX}$ or rose above the minimum voltage threshold $V_{TH-MIN}$.

According to the third embodiment of the present invention, the control circuit 940 does not control the gain control signal $V_{GAIN}$ to control the FET Q775 during normal operation of the LED driver 900. In other words, the control circuit 940 does not render the FET Q775 conductive and non-conductive depending upon the magnitude of the load current $I_{LOAD}$ at some point in the middle of the dimming range. The memory 170 of the LED driver 900 of the third embodiment is programmed at the time of manufacture to either render the FET Q775 conductive or non-conductive at all times during operation. Even though the gain control signal $V_{GAIN}$ is not adjusted during normal operation of the LED driver 900 (and is only adjusted at the time of manufacture), the FET Q775 still allows a single piece of electrical hardware to be used to control LED light sources having a plurality of different rated voltages and/or rated currents.

Figure 13:
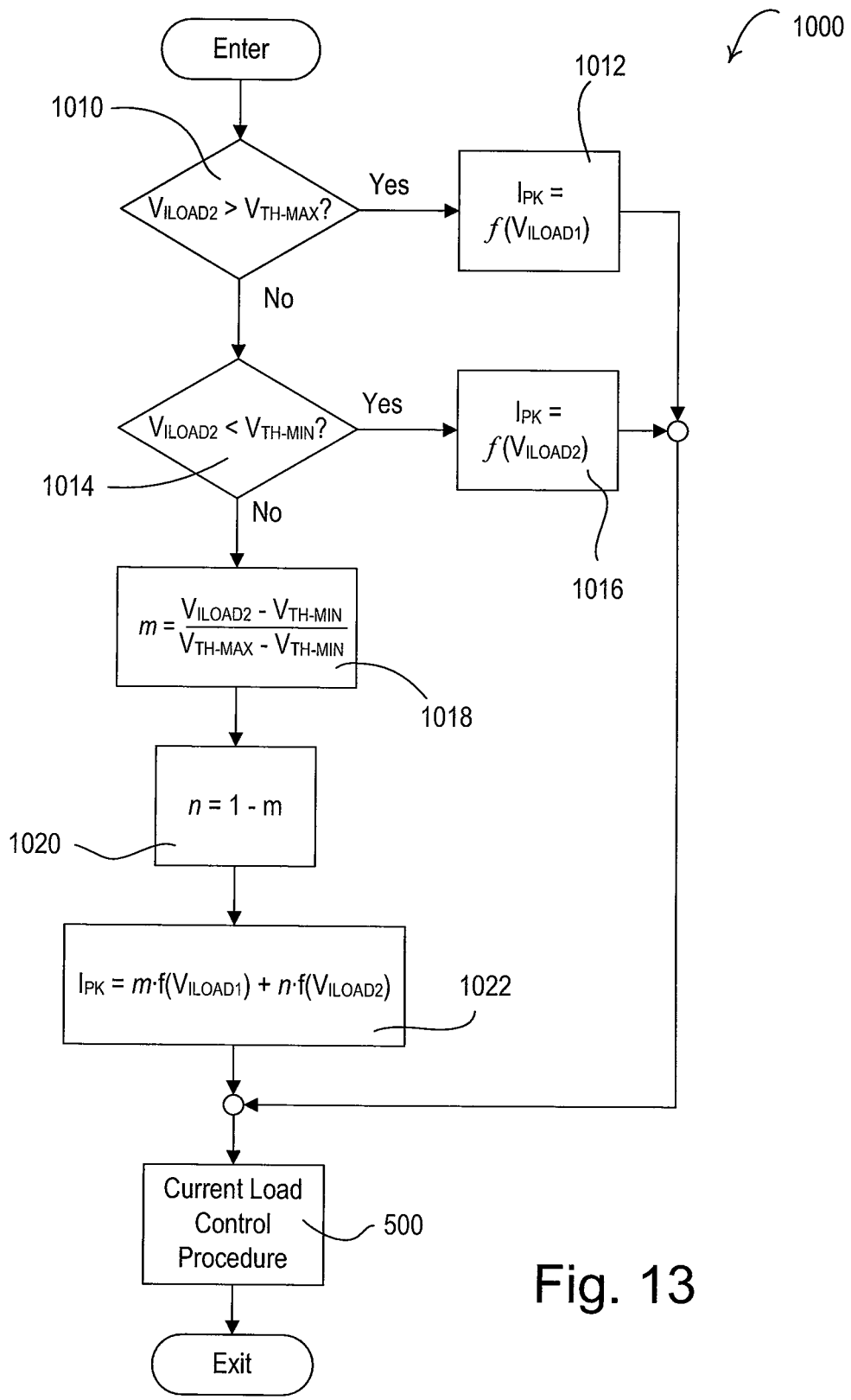
FIG. 13 is a simplified flowchart of a load current feedback procedure executed by a control circuit of the LED driver of FIG. 10 when the LED driver is operating in the current load control mode.

FIG. 13 is a simplified flowchart of a load current feedback procedure 1000, which is executed periodically by the control circuit 940 when the LED driver 900 is operating in the current load control mode. If the magnitude of the second load current feedback signal $V_{ILOAD2}$ is greater than the maximum voltage threshold $V_{TH\text{-}MAX}$ at step 1010, the control circuit 940 calculates the peak magnitude $I_{PK}$ of the load current $I_{LOAD}$ as a function of the magnitude of the first load current feedback signal $V_{ILOAD1}$ at step 1012, e.g., $$I_{PK}=f(V_{ILOAD1})=V_{ILOAD1}/[(1-DC_{DIM})\cdot\gamma_1\cdot R_{FB})] \quad \text{(Equation 3)}$$

The control circuit 940 then executes the current load control procedure 500 using the peak magnitude $I_{PK}$ of the load current $I_{LOAD}$ as determined at step 1012, before the load current feedback procedure 1000 exits. If the magnitude of the second load current feedback signal $V_{ILOAD2}$ is less than the minimum voltage threshold $V_{TH\text{-}MIN}$ at step 1014, the control circuit 940 calculates the peak magnitude $I_{PK}$ of the load current $I_{LOAD}$ as a function of the magnitude of the second load current feedback signal $V_{ILOAD2}$ at step 1016, e.g., $$I_{PK}=f(V_{ILOAD2})=V_{ILOAD2}/[(1-DC_{DIM})\cdot\gamma_2\cdot R_{FB})], \quad \text{(Equation 4)}$$

and then executes the current load control procedure 500, before the load current feedback procedure 1000 exits.

If the magnitude of the second load current feedback signal $V_{ILOAD2}$ is not greater than the maximum voltage threshold $V_{TH\text{-}MAX}$ at step 1010 and is not less than the minimum voltage threshold $V_{TH\text{-}MIN}$ at step 1014, the control circuit 940 calculates the first weight factor m as a function of the magnitude of the second load current feedback signal $V_{ILOAD2}$ at step 1018, e.g., $$m = \frac{V_{ILOAD2} - V_{TH\text{-}MIN}}{V_{TH\text{-}MAX} - V_{TH\text{-}MIN}}. \quad \text{(Equation 5)}$$

The control circuit 940 then calculates the second weight factor n from the first weight factor m (i.e., also as a function of the magnitude of the second load current feedback signal $V_{ILOAD2}$) at step 1020, e.g., $$n=1-m. \quad \text{(Equation 6)}$$

The control circuit 940 then uses the weighting factors in, n to calculate the peak magnitude $I_{PK}$ of the load current $I_{LOAD}$ as a function of the weighted sum of the first and second load current feedback signals $V_{ILOAD1}$, $V_{ILOAD2}$ at step 1022, e.g., $$I_{PK}=[m\cdot V_{ILOAD1}+n\cdot V_{ILOAD2}/\gamma]/[(1-DC_{DIM})\cdot R_{FB}]. \quad \text{(Equation 7)}$$

The control circuit 940 then executes the current load control procedure 500 using the peak magnitude $I_{PK}$ of the load current $I_{LOAD}$ as determined at step 1022, before the load current feedback procedure 1000 exits.

According to an alternative embodiment of the present invention, the control circuit 940 of the LED driver 900 could control the gain control signal $V_{GAIN}$ to control the FET Q775 during normal operation (as in the second embodiment) in addition to receiving both of the first and second load current feedback signals $V_{ILOAD1}$, $V_{ILOAD2}$ (as in the third embodiment) in order to achieve an even greater dimming range.

Figure 14:
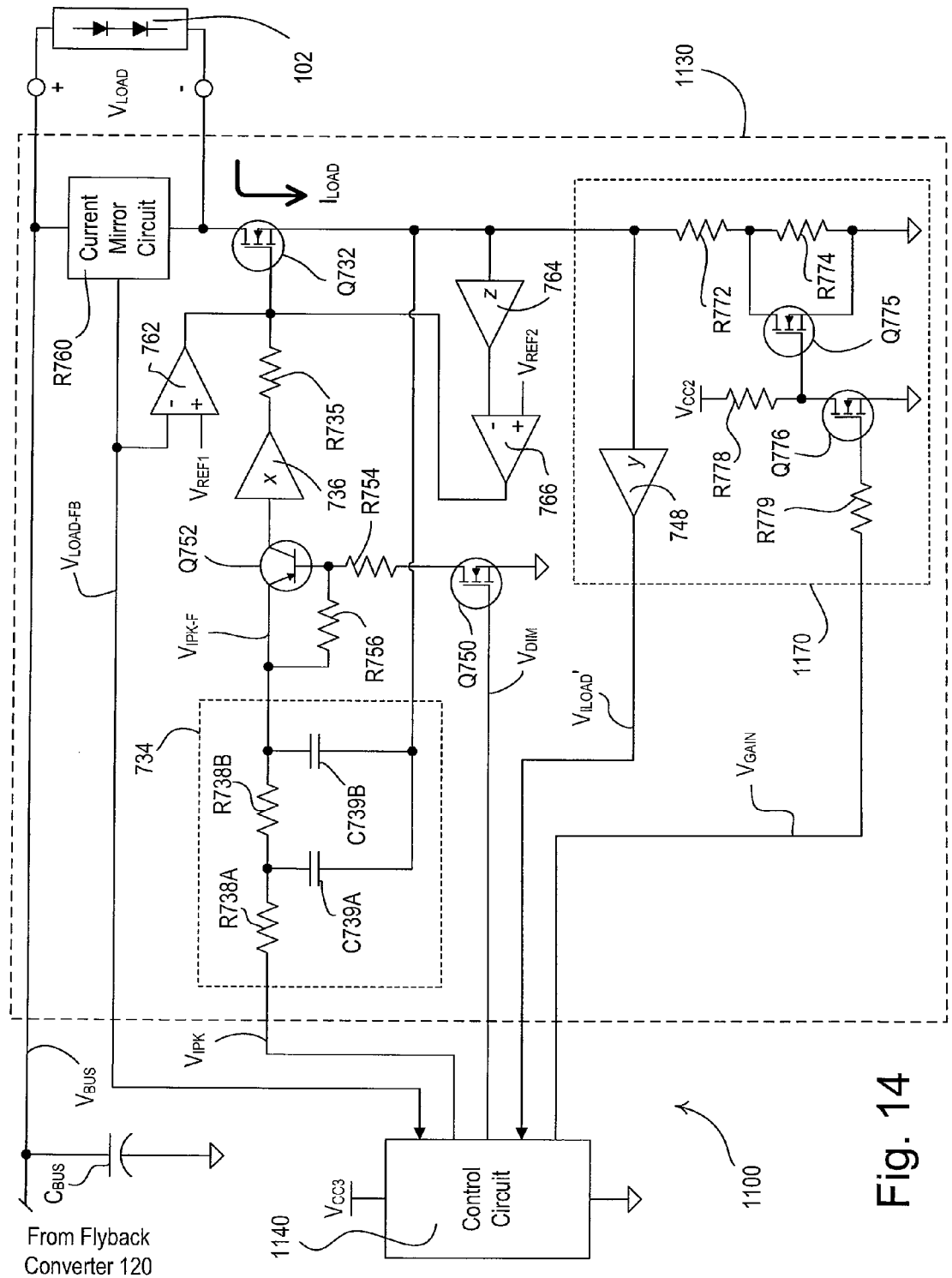
FIG. 14 is a simplified schematic diagram of an LED drive circuit of a LED driver according to a fourth embodiment of the present invention.
Figure 15A:
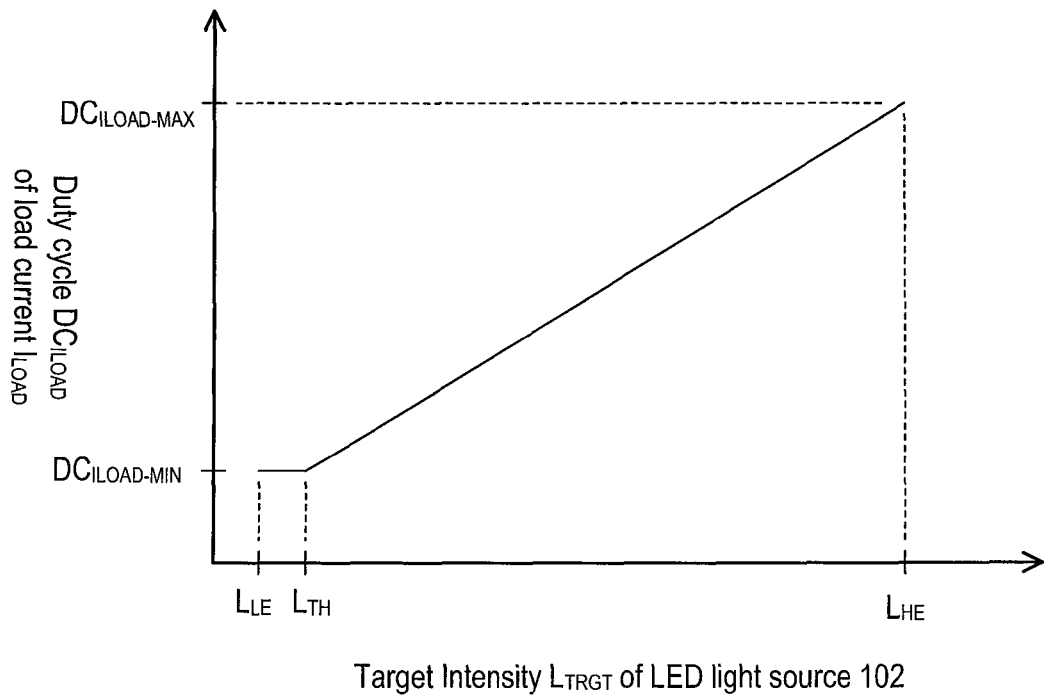
FIG. 15A is a plot of a duty cycle of a load current with respect to the target intensity of the LED driver of FIG. 14 according to the fourth embodiment of the present invention.
Figure 15B:
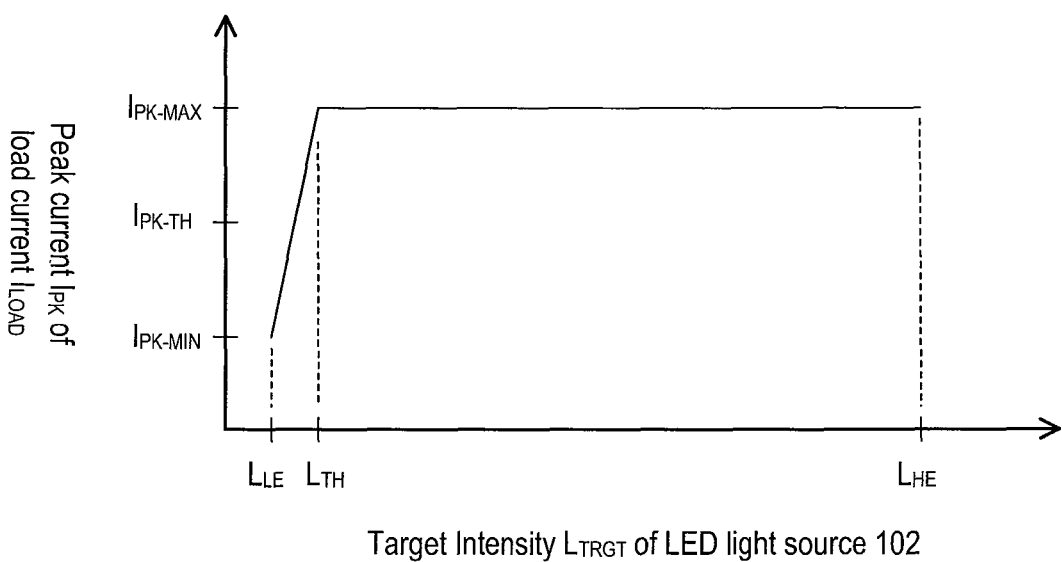
FIG. 15B is a plot of a peak magnitude of the load current with respect to the target intensity of the LED driver of FIG. 14 according to the fourth embodiment of the present invention.

FIG. 14 is a simplified schematic diagram of an LED drive circuit 1130 of a LED driver 1100 according to a fourth embodiment of the present invention. The LED driver 1100 of the fourth embodiment comprises a control circuit 1140 that is operable to control the intensity of the LED light source 102 using a combined PWM-CCR dimming technique when operating in the current load control mode. FIG. 15A is a plot of the duty cycle $DC_{ILOAD}$ of the load current $I_{LOAD}$ with respect to the target intensity $L_{TRGT}$ of the LED light source 102 according to the fourth embodiment of the present invention. FIG. 15B is a plot of the peak magnitude $I_{PK}$ of the load current $I_{LOAD}$ conducted through the LED light source 102 with respect to the target intensity $L_{TRGT}$ of the LED light source 102 according to the fourth embodiment of the present invention.

When the target intensity $L_{TRGT}$ of the LED light source 102 is above a threshold intensity $L_{TH}$, the LED driver 1100 regulates the peak magnitude $I_{PK}$ of the load current $I_{LOAD}$ to a maximum peak magnitude $I_{PK\text{-}MAX}$, and operates using the PWM dimming technique to only adjust the duty cycle $DC_{ILOAD}$ of the load current $I_{LOAD}$. For example, the threshold intensity $L_{TH}$ may be dependent upon the smallest value of the duty cycle $DC_{DIM}$ of the dimming control signal $V_{DIM}$ that the control circuit 1140 can generate. The control circuit 940 is operable to adjust the intensity of the LED light source 102 below the threshold intensity $L_{TH}$ by decreasing the peak magnitude $I_{PK}$ of the load current $I_{LOAD}$. Specifically, the LED driver 1100 maintains the duty cycle $DC_{ILOAD}$ of the load current $I_{LOAD}$ constant at a minimum duty cycle $DC_{ILOAD\text{-}MIN}$ (e.g., approximately 1-5%), and reduces the peak magnitude $I_{PK}$ of the load current $I_{LOAD}$ (towards a minimum peak magnitude $I_{PK\text{-}MIN}$) as the target intensity $L_{TRGT}$ of the LED light source 102 decreases below the threshold intensity $L_{TH}$.

The LED drive circuit 1130 comprises an adjustable gain feedback circuit 1170 that does not include a filter circuit (i.e., the filter circuit 746 of the LED drive circuit 730 of the second embodiment). Therefore, the adjustable gain feedback circuit 1170 generates a load current feedback signal $V_{ILOAD}'$ that is provided to a control circuit 1140 and is representative of the instantaneous magnitude $I_{INST}$ of the load current $I_{LOAD}$ (rather than the average magnitude $I_{AVE}$). Above the threshold intensity $L_{TH}$, the control circuit 1140 is operable to control the dimming control signal $V_{DIM}$ to adjust the duty cycle $DC_{ILOAD}$ of the pulse-width modulated load current $I_{LOAD}$ and thus the intensity of the LED light source 102. Below the threshold intensity $L_{TH}$, the control circuit 1140 is operable to control the peak current control signal $V_{IPK}$ to adjust the peak magnitude $I_{PK}$ of the pulse-width modulated load current $I_{LOAD}$ and thus the intensity of the LED light source 102.

The control circuit 1140 is also operable to control the FET Q775 to adjust the gain of the adjustable gain feedback circuit 1170 when the peak magnitude $I_{PK}$ of the load current $I_{LOAD}$ crosses a peak current threshold $I_{PK\text{-}TH}$ (for example, using some hysteresis). After the peak magnitude $I_{PK}$ of the load current $I_{LOAD}$ transitions across the peak current threshold $I_{PK\text{-}TH}$, the control circuit 1140 is operable to render the FET Q775 of the adjustable gain feedback circuit 1170 conductive and non-conductive during one of the "valleys" of the pulse-width modulated load current $I_{LOAD}$, i.e., when the dimming control signal $V_{DIM}$ is low and the regulation FET Q732 is non-conductive, such that the instantaneous magnitude $I_{INST}$ of the load current $I_{LOAD}$ is approximately zero amps. By controlling the FET Q775 during the valleys of the pulse-width modulated load current $I_{LOAD}$, the control circuit 1140 is operable to avoid large fluctuations of the load current $I_{LOAD}$ and thus the intensity of the LED light source 102 while dimming the LED light source.

Figure 16:
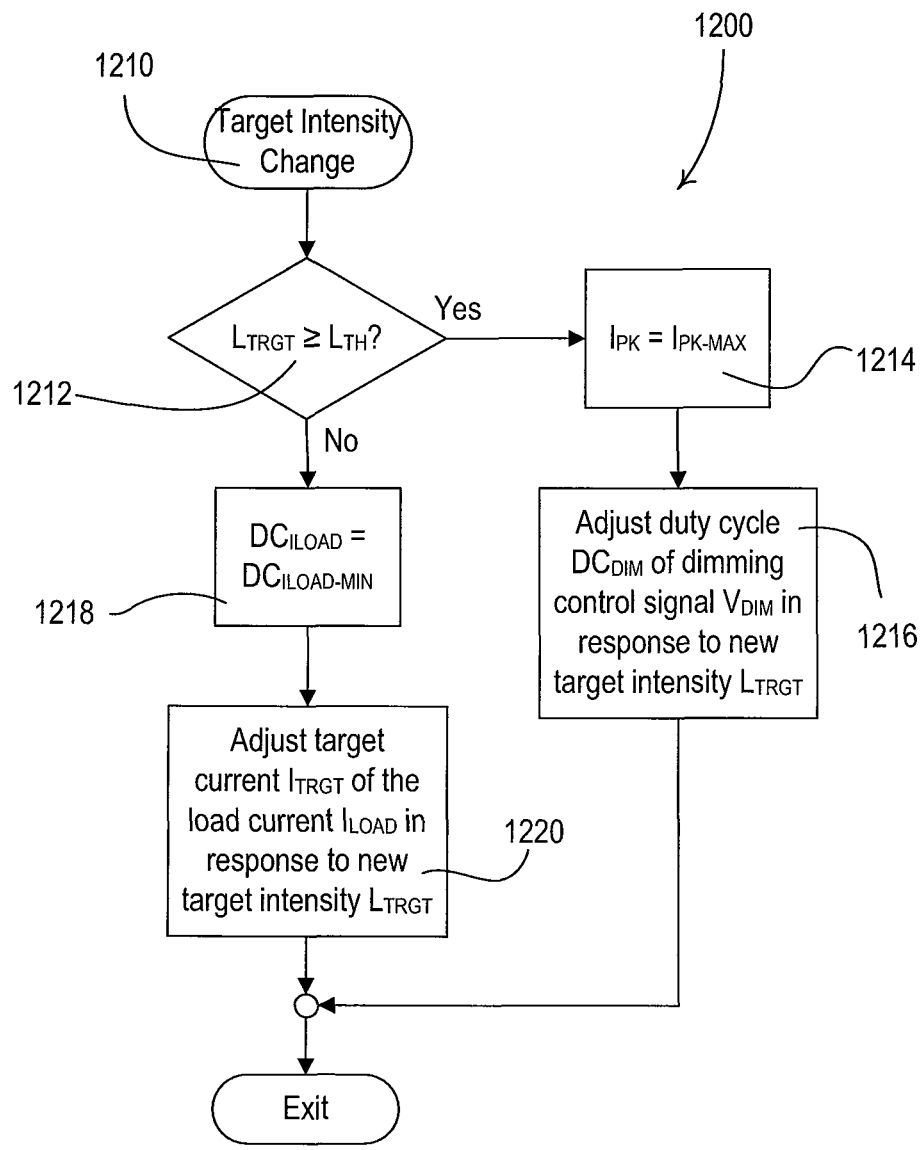
FIG. 16 is a simplified flowchart of a target intensity procedure executed by a control circuit of the LED driver of FIG. 14 according to the fourth embodiment of the present invention.

FIG. 16 is a simplified flowchart of a target intensity procedure 1200 executed by the control circuit 1140 of the LED driver 1100 when the target intensity $L_{TRGT}$ changes at step 1210 according to the fourth embodiment of the present invention. If the new target intensity $L_{TRGT}$ is greater than or equal to the threshold intensity $L_{TH}$ at step 1212, the control circuit 1140 controls the duty cycle $DC_{IPK}$ of the peak current control signal $V_{IPK}$ to control the peak magnitude $I_{PK}$ of the load current $I_{LOAD}$ to the maximum peak magnitude $I_{PK-MAX}$ at step 1214. At step 1216, the control circuit 1140 adjusts the duty cycle $DC_{DIM}$ of the dimming control signal $V_{DIM}$ in response to the new target intensity $L_{TRGT}$, so as to control the intensity of the LED light source 102 to the new target intensity $L_{TRGT}$, and the target intensity procedure 1200 exits. If the new target intensity $L_{TRGT}$ is less than the threshold intensity $L_{TH}$ at step 1212, the control circuit 1140 controls the duty cycle $DC_{DIM}$ of the dimming control signal $V_{DIM}$ at step 1218, so as to maintain the duty cycle $DC_{ILOAD}$ of the load current $I_{LOAD}$ at the minimum duty cycle $DC_{ILOAD-MIN}$. At step 1220, the control circuit 1140 adjusts the target load current $I_{TRGT}$ of the load current $I_{LOAD}$ in response to the new target intensity $L_{TRGT}$, and the target intensity procedure 1200 exits.

Figure 17:
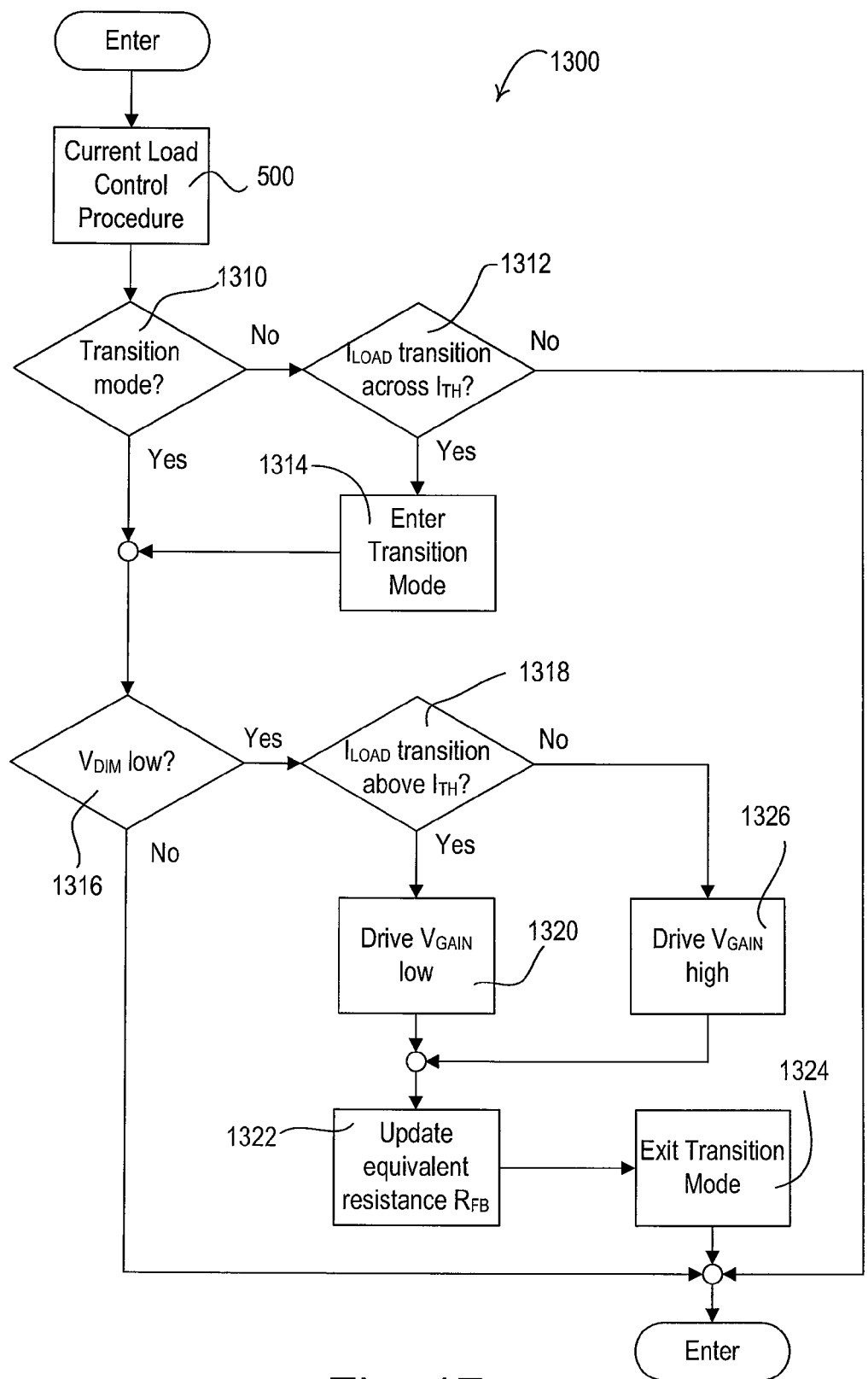
FIG. 17 is a simplified flowchart of a transition mode procedure executed periodically by the control circuit of the LED driver of FIG. 14 according to the fourth embodiment of the present invention.

FIG. 17 is a simplified flowchart of a transition mode procedure 1300 executed periodically by the control circuit 1140 according to the fourth embodiment of the present invention. The control circuit 1140 first executes the current load control procedure 500 (as shown in FIG. 6). According to the fourth embodiment, the control circuit 1140 is operable to calculate the peak magnitude $I_{PK}$ of the load current $I_{LOAD}$ from the load current feedback signal $V_{ILOAD}$' when the dimming control signal $V_{DIM}$ is high (and the instantaneous magnitude $I_{INST}$ of the load current $I_{LOAD}$ is greater than approximately zero amps), i.e., $$I_{PK}=I_{INST}=V_{ILOAD}'/(\beta \cdot R_{FB}) \qquad \text{(Equation 8)}$$

During the transition mode procedure 1300, the control circuit 1140 begins operating in a transition mode if the peak magnitude $I_{PK}$ of the load current $I_{LOAD}$ has just transitioned across the peak current threshold $I_{PK-TH}$. Specifically, if the control circuit 1140 is not in the transition mode at step 1310, but the peak magnitude $I_{PK}$ of the load current $I_{LOAD}$ has just transitioned across the peak current threshold $I_{PK-TH}$ at step 1312, the control circuit 1140 begins operating in a transition mode at step 1314.

Next the control circuit 1140 waits until the dimming control signal $V_{DIM}$ is low (i.e., at approximately circuit common), such that the instantaneous magnitude $I_{INST}$ of the load current $I_{LOAD}$ is approximately zero amps, before controlling the FET Q775 to adjust the gain of the adjustable-gain feedback circuit 1170. Specifically, when the control circuit 1140 is operating in the transition mode at step 1310 or at step 1314, but the dimming control signal $V_{DIM}$ is not low at step 1316, the transition mode procedure 1300 simply exits. However, when the dimming control signal $V_{DIM}$ is low at step 1316 and the peak magnitude $I_{PK}$ of the load current $I_{LOAD}$ has risen above the threshold current $I_{TH}$ at step 1318, the control circuit 1140 drives the gain control signal $V_{GAIN}$ low at step 1320 to render the FET Q775 conductive, such that only the first feedback resistor R772 is coupled in series with the regulation FET Q732. The control circuit 1140 then updates the equivalent resistance $R_{FB}$ of the adjustable gain feedback circuit 1170 to be equal to the resistance of only the resistor R772 at step 1322 and exits the transition mode at step 1324, before the transition mode procedure 1300 exits. When the magnitude of the load current $I_{LOAD}$ has dropped below the threshold current $I_{TH}$ at step 1318, the control circuit 1140 drives the gain control signal $V_{GAIN}$ high at step 1326 to render the FET Q775 non-conductive, such that both the first and second feedback resistors R772, R774 are coupled in series with the regulation FET Q732.

Figure 18:
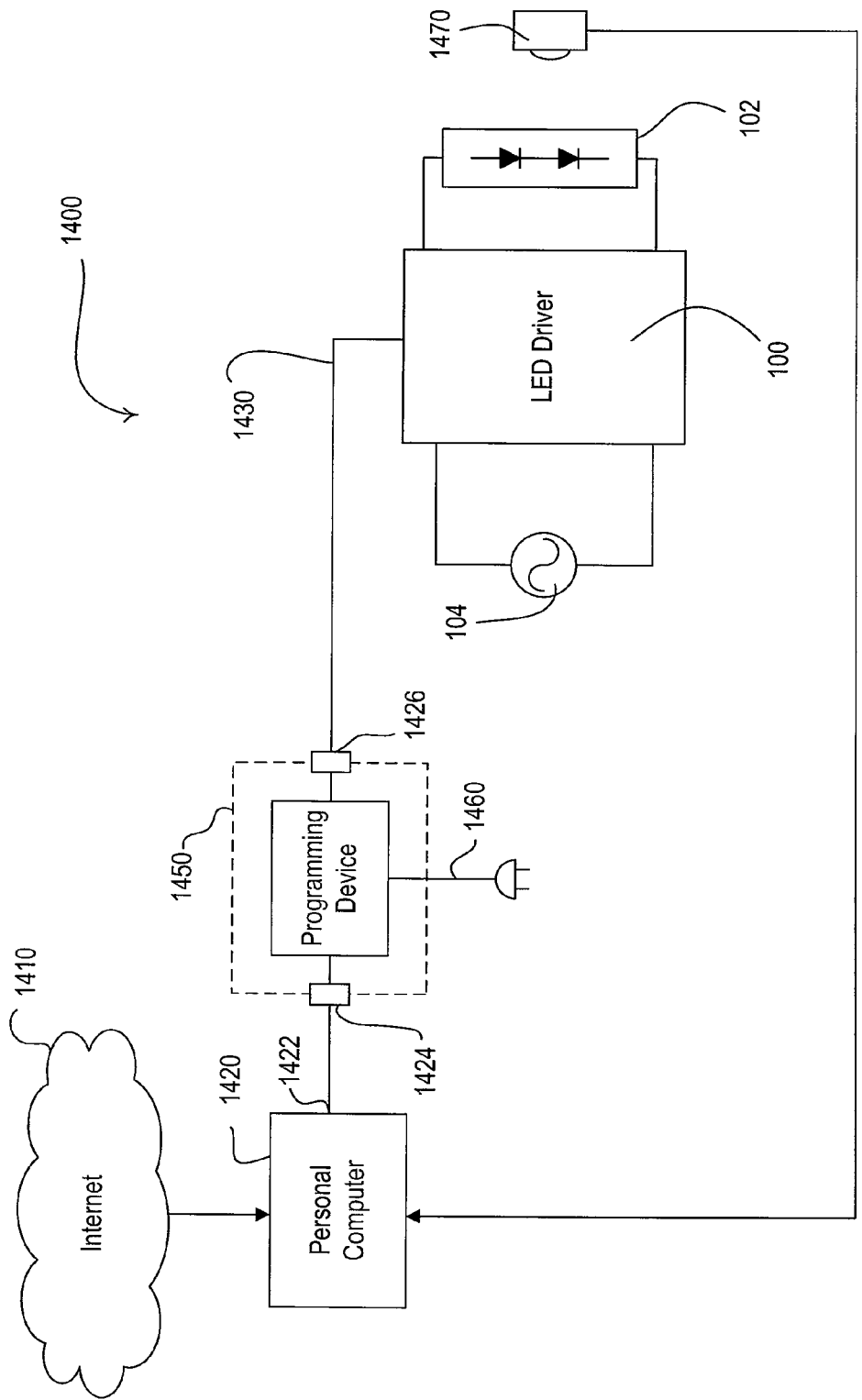
FIG. 18 is a simplified block diagram of an LED driver development system.

FIG. 18 shows an exemplary LED driver configuration system 1400 for configuring the LED drivers 100, 700, 900, 1100 according to an embodiment of the present invention. The configuration system 1400 can be used in multiple locations including a lamp/LED driver manufacturing facility (i.e., a factory); an original equipment manufacturing (OEM) site where a lighting fixture may be preassembled with the LED driver (e.g., LED driver 100), lamp load (e.g., LED light source 102), and/or a lighting control (e.g., dimmer switch 106); or in the field, i.e., at the lighting system installation location to optimize the lighting system driver to the installed lighting system. The system utilizes software (e.g., a configuration program) that can be downloaded from a server connected to the Internet 1410. Alternatively, the software could be provided on a storage medium such as a disc or CD. The configuration program, which allows the user to program the operating characteristics of the lamp driver, such as the LED driver 100, is loaded into a personal computer (PC) 1420, and will be described in further detail below. According to an embodiment of the present invention, the user interacts with the configuration program using a graphical user interface (GUI) software to select the operating mode and voltage and/or current at which the configurable LED driver 100 will operate the LED light source 102.

The configuration program that is loaded into the computer 1420 allows the user to select the operational mode (current load control mode or voltage load control mode) as well as the dimming technique (e.g., constant current reduction, constant current PWM, or constant voltage PWM) and incrementally change the magnitude of the current or voltage at which the LED driver 100 will operate the LED light source 102. The software operating on the computer 1420 will provide instructions to a programming device 1450 via, for example, a universal serial bus (USB) port 1422 and a USB jack 1424. The programming device 1450 is provided with power from the AC power source 102 via a standard line cord 1460, or could alternatively be provided with power from a DC supply, a battery supply, or from the USB jack 1424. The programming device 1450 converts the instructions received from the computer 1420 on the USB port 1422 to data that is provided via a terminal block 1426 to the LED driver 100 (i.e., to the communication circuit 180) via a communication bus 1430.

In order to provide feedback to the computer 1420 during the configuration process, an optional sensor 1470 can be provided to measure different characteristics of the LED driver 100 and/or the LED light source 102. For example, the sensor 1470 may comprise a photosensor that measures the light output of the LED light source 102 and provides a signal back to the computer 1420, and the measured light output may be displayed on the computer such that the user can determine if a desired light level has been reached. Alternatively, the sensor 1470 may further comprise a power meter along with the photosensor which could be operable to provide "lumen per watt" feedback to the user. The sensor 1470 could alternatively comprise a temperature sensor that measures the temperature of the LED driver 100 and/or the LED light source 102, and sends that information to the computer 1420 such that the user can be advised of the operating temperature(s). The sensor 1470 could further be operable to measure the color temperature and/or the color rendering index of the LED light source 102 and provide that information to the user on the computer 1420 such that the user can configure the LED driver to achieve a desired color characteristic. The process for measuring different characteristics of the LED driver 100 with the sensor 1470 could be automated (e.g., provided as a "wizard") to assist the user in optimizing a certain characteristic of the LED driver. Alternatively, feedback can be dispensed with, in which case the user can manually adjust the operating characteristics of the LED driver 100 such that the desired performance is achieved visually.

Figure 19:
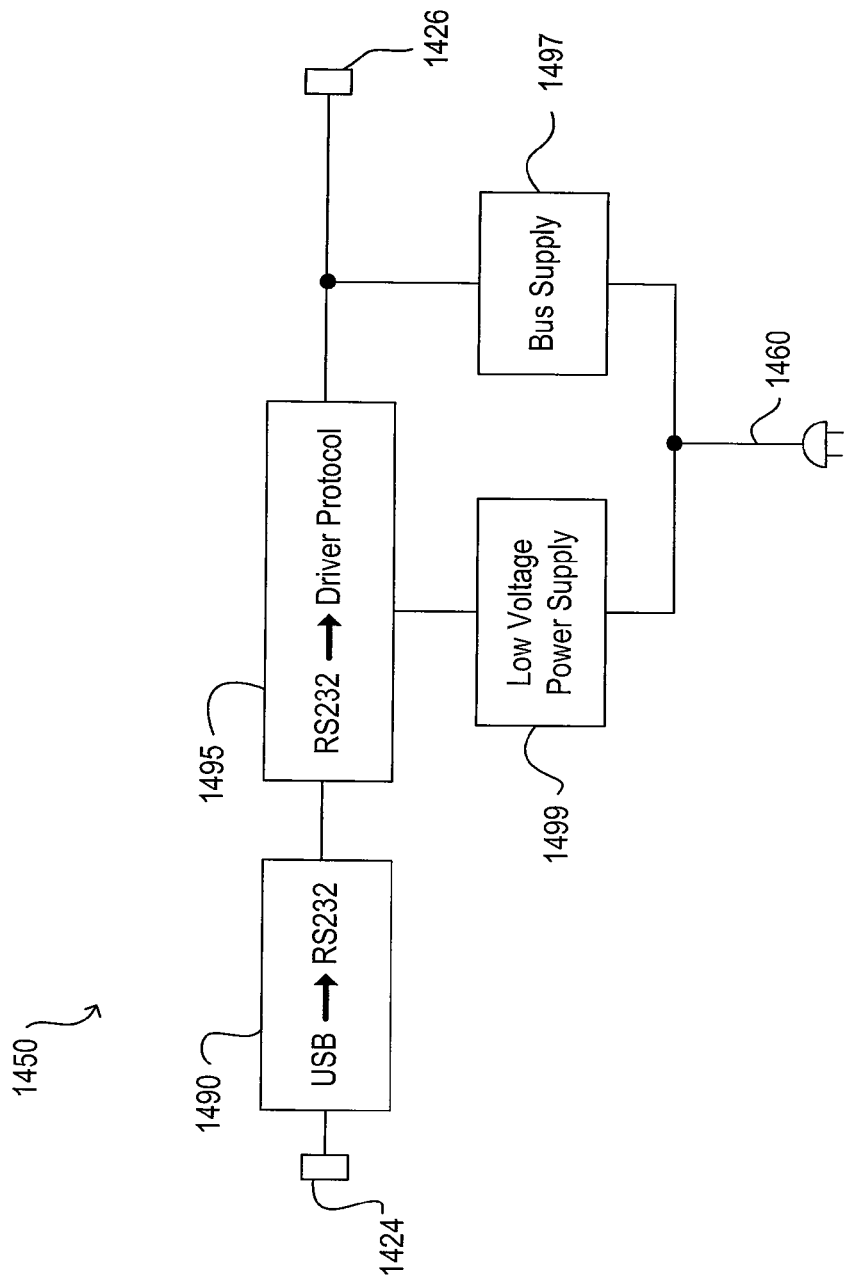
FIG. 19 is a simplified block diagram of a portion of the system of FIG. 18.

FIG. 19 is a simplified block diagram of the programming device 1450. The programming data from the computer 1420 that is used to program the LED driver 100 according to the desired operation mode and dimming technique and to the target voltage or current, is transmitted via the USB jack 1424 to a USB-to-RS232 interface 1490. The USB-to-RS232 interface 1490 translates the USB serial data into RS232 serial format, and is powered by the USB connection from the computer 1420. The output of the USB-to-RS232 interface 1490 is provided to a further interface 1495 that translates the RS232 data into the LED driver 100 protocol utilized on the communication bus 1430 to which the LED driver 100 is connected, for example, the Lutron ECOSYSTEM communication protocol which allows a plurality of drivers (or fluorescent lamp ballasts and other devices such as sensors) to communicate with each other on the communication bus 1430. The programming device 1450 comprises a bus power supply 1497 for powering the communication bus 1430. The bus power supply 1497 is powered from the AC power source 104 via the line cord 1460. A low voltage supply 1499 provides power for the interface 1495 from the AC power source 104 via the line cord 1460. Alternatively, the low voltage supply 1499 could receive power via the USB jack 1424. The programming device 1450 can be used in the factory, at a fixture OEM site, or in the field to program the LED driver 100. Although the embodiment described utilizes the USB, RS232, and driver protocols, these are merely illustrative. Any other communication protocols, standards, or specifications can be used, as desired, such as, but not limited to, wireless communication.

Figure 20:
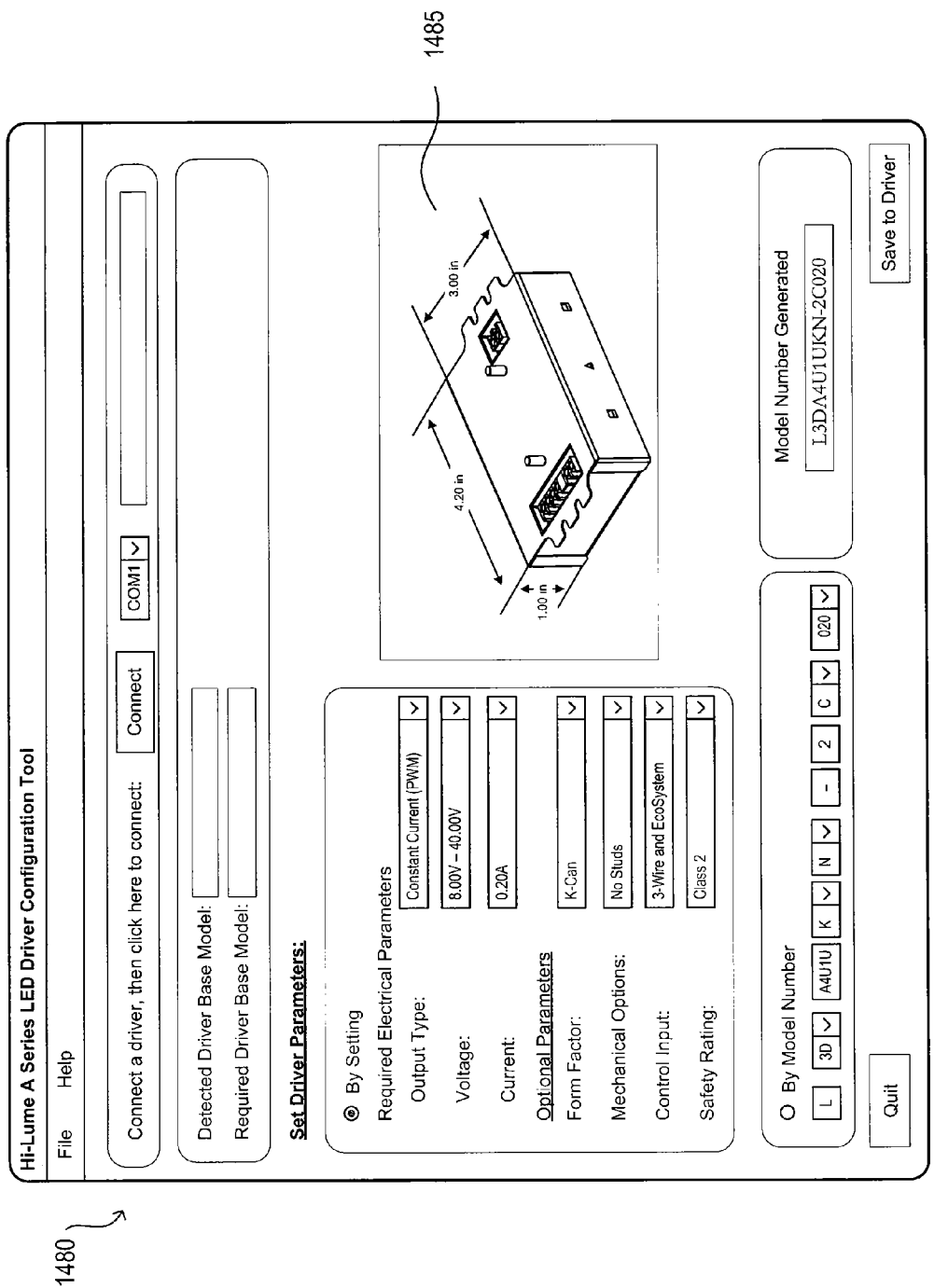
FIG. 20 is an example of a display screen presented by software that operates on a computer in the system of FIG. 18.
Figure 21:
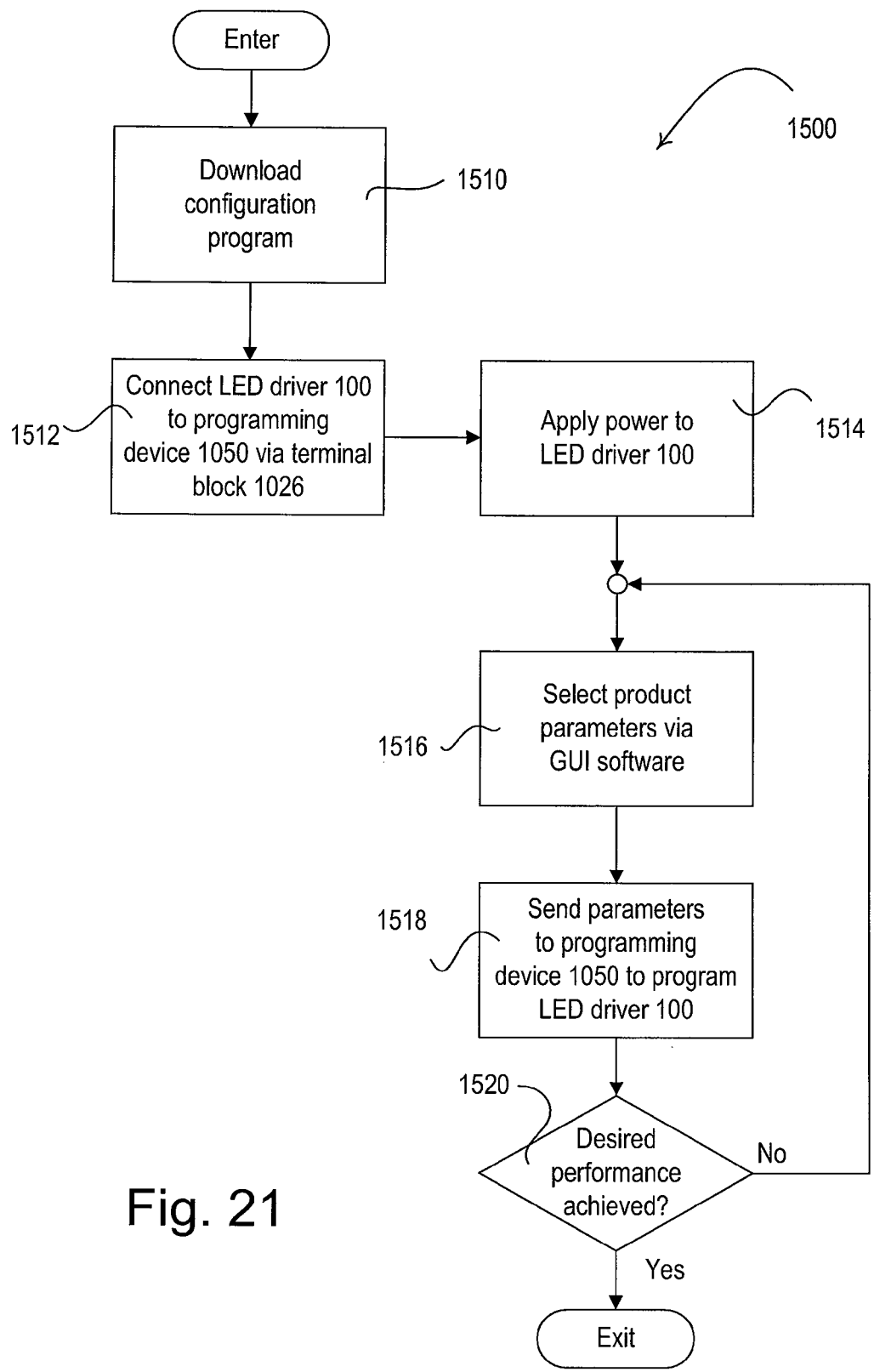
FIG. 21 is a general flowchart of the operation of the system of FIG. 18.

FIG. 20 shows an example GUI screen display 1480 on the computer 1420, and FIG. 21 is a general flowchart 1500 of the operation of the lamp driver configuration system 1400. To use the lamp driver configuration system 1400, the user first downloads the configuration program from the Internet by connecting the computer 1420 to the manufacturer's website at step 1510. Alternatively, the configuration program could be otherwise obtained (e.g., on a storage medium, such as a compact disc) and then loaded into the computer 1420. Next, the communication bus 1430 is connected to the LED driver 100 and to the terminal block 1426 of the programming device 1450 at step 1512 to allow the LED driver to be programmed with the settings provided by the computer 1420. After the LED driver 100 is connected to the terminal block 1426 of the programming device 1450, power is applied to the LED driver by turning on the AC power source 104 at step 1514 (e.g., by closing a circuit breaker or operating a switch or dimmer switch connected to the AC power source). Next, the user uses the GUI software of the configuration program running on the computer 1420 to set the parameters (i.e., control mode and desired current and/or voltage) for the LED driver 100 at step 1516. The parameters are then sent to the programming device 1450 and thus to the LED driver 100 to program the LED driver with these parameters at step 1518 (i.e., the parameter are saved in memory 170 of the LED driver). The GUI software of the configuration program can be used to incrementally select the driver parameters until the desired performance is attained. If the desired performance is not achieved at step 1520, the user may adjust the parameters of the LED driver 100 at step 1516, and reprogram the LED driver at step 1518.

The configuration program loaded into the computer 1420 allows the user to select the operation mode and dimming technique. As previously discussed, the LED driver 100 can operate in a voltage load control mode using a PWM dimming technique, a current load control mode using a PWM dimming technique, or a current load control mode using constant current reduction. The "output type" selection on the GUI screen display 1480 allows the user to select both the operation mode and dimming technique together (i.e., constant voltage PWM, constant current PWM or constant current reduction). In addition, the user can dial in the desired (target) corresponding voltage or current. According to an embodiment of the present invention, the LED driver 100 may be provided in several basic models. For example, the LED driver may, in order to cover the entire output range necessary, be provided in three basic power ranges, a high range, a medium range and a low range in order to cover the required output operational range. The base model of the LED driver 100 that is used will be automatically determined during the configuration program. In addition to the power ranges of the LED driver 100, for which there may be multiple, as explained, there may also be different physical "form factors" for the LED driver. For example, the LED driver 100 may take the form of three physically different devices, a K can, a K can with studs, and an M can device. These different form factors provide for different installation and mounting techniques.

As shown on the example GUI screen display 1480 of FIG. 20, the GUI software allows the user to configure the LED driver 100 in one of two ways, by parameter ("by setting") or by model number. In each case, the LED driver 100 that is connected to the programming device 1450 is identified by the configuration software (i.e., the driver sends back its model number which includes at least a base model number).

If the user chooses to configure by setting, the user clicks on "by setting". The user selects the output type (constant voltage PWM, constant current PWM, or constant current reduction), sets the target voltage or current (depending on output type) and also selects the other parameters (form factor, input signal, etc.). The model number is determined and displayed by the software in response to the entered parameters. If the user selects a parameter not within the specification range of the connected driver (i.e., the base model is different than the connected driver base model), the base model will be highlighted on the screen to alert the user that a different driver must be connected or different parameters consistent with the connected driver must be connected. So long as the selected parameters are within the specifications of the connected driver, the software will determine the model number which will be identified on the screen for ordering by the user, for example, over the Internet. If the settings are inconsistent with the connected driver, an error message will be generated and the parameters will not be saved to the LED driver 100. Assuming the connected driver is compatible with the selected parameters, the driver can then be programmed and/or the model number of the configured driver can be ordered. Alternatively, even if the LED driver 100 is not connected to the programming device 1450, the GUI software can still allow the user to 'build' a model number by selecting the desired settings such that the appropriate LED driver may be ordered. If the model number of the configured driver is ordered, the parameters can be programmed into the appropriate base model driver at the factory and shipped to the customer either for installation or for use as a sample. The programmed LED driver 100 can also be labeled with the programmed parameters. For example, a label machine may be coupled to the computer 1420 and may be operable to print a label with the proper model number and/or programmed parameters upon successfully programming an LED driver 100.

If the user chooses "by model number", a model number may be entered or modified by the user in the "by model number" window. If the model number entered is within the specification of the currently connected LED driver 100, the currently connected driver can then be reconfigured per the specifications of the selected model number. If the selected model number is outside the specification of the currently connected driver, the base model number field will be highlighted, alerting the user that the selected model number is outside the specifications of the currently connected driver. The user can then select a different model number or restart by connecting a different base model driver.

The GUI screen display 1480 also allows the user to specify the form factor, i.e., the particular physical form of the LED driver 100 and any other mechanical options as well as the control input, which may be a communication bus input (received by the communication circuit 180 of the LED driver) or a phase control input (received by the phase control input circuit 160 of the LED driver). Specifically, the phase control input may be either a two-wire electronic-low voltage (ELV) phase-control input or a three-wire phase-control input. In addition, the LED driver 100 may be operable to be responsive to a combination of control inputs. For example, one LED driver 100 may be configured to be operable to receive control inputs from both the communication bus via the communication circuit 180 and three-wire phase control dimming signals via the phase control input circuit 160. A safety rating may be displayed in response to the selections made. According to an alternative embodiment, the desired safety rating may be entered by the user. In addition, the screen will show an image of the selected mechanical form factor of the driver at 1485.

Figure 22:
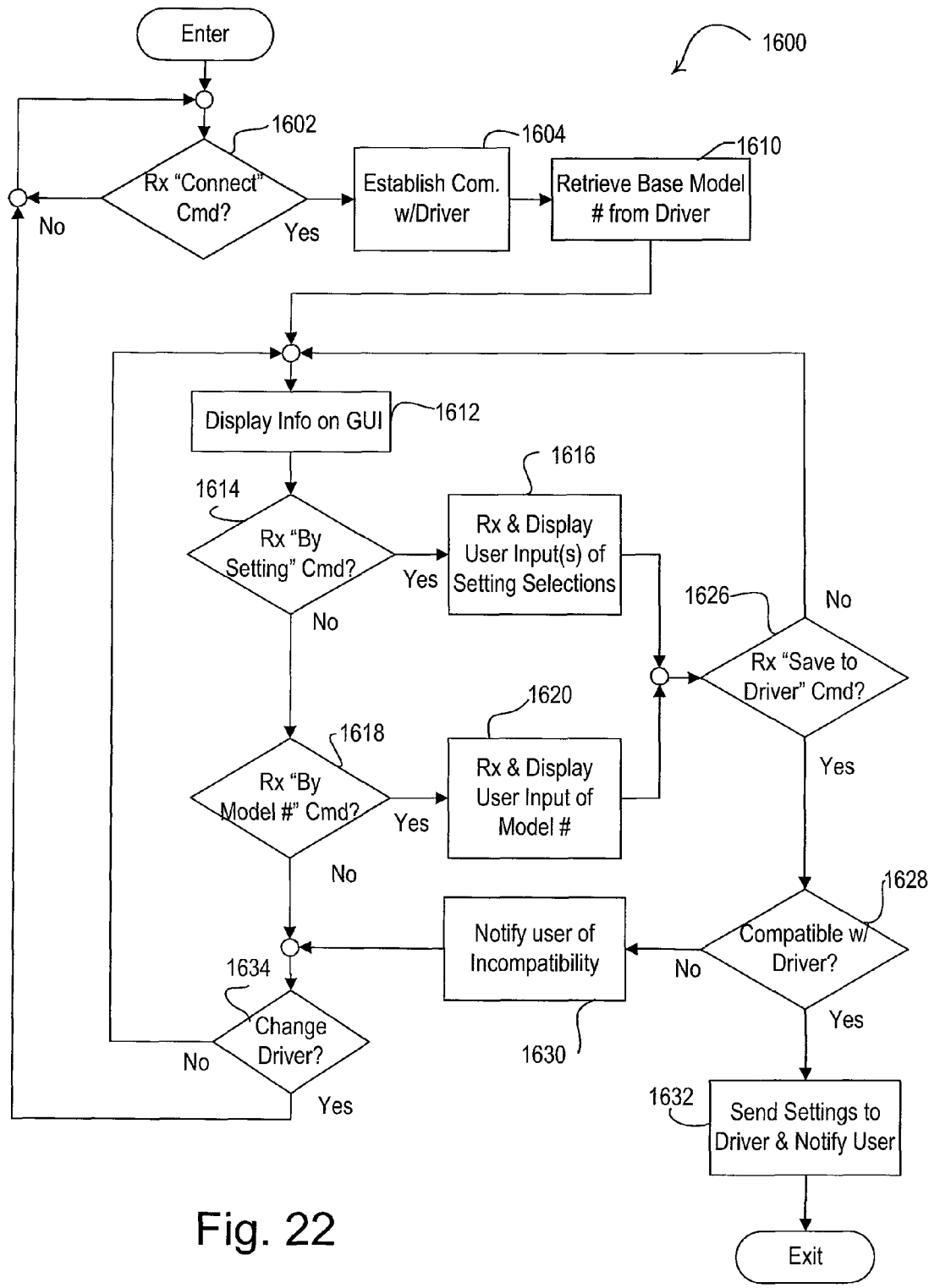
FIG. 22 is a simplified software flowchart of a configuration process executed by the computer of the system of FIG. 18.

FIG. 22 is a simplified software flowchart of a configuration process 1600 executed by the computer 1420 (i.e., the GUI software) of the lamp driver configuration system 1400. The configuration process 1600 is typically started after the user has downloaded the configuration program, connected the LED driver 100 to the programming device 1450, and applied power to the LED driver (per steps 1510, 1512, 1514 of FIG. 21). At step 1602, the configuration program waits to receive a "Connect" command in response to the user clicking the "Connect" button on the GUI display screen 1480 of the computer 1420. Once the user has clicked the "Connect" button, the computer 1420 attempts to establish communication with the LED driver 100 via the programming device 1450 at step 1604.

Then at step 1610, the programming device 1450 retrieves the base model number from the LED driver 100. Additionally, at step 1610, the programming device 1450 may be operable to retrieve other parameters from the LED driver 100 such as output type, control input type, or mechanical form factor in the event that the LED driver had already been programmed or manufactured with some parameters. At step 1612, the base model and/or full model number and any other parameter information retrieved from the LED driver 100 are then displayed on the GUI display.

Next, the system waits to receive a "by setting" command at step 1614 or a "by model number" command at step 1618 in response to the user's selection of the associated radio button on the GUI display. If the user has selected the "by setting" radio button at step 1614, then at step 1616, the user can select the desired electrical and optional parameters for the LED driver 100 using the dropdown menus on the GUI display screen 1480. As the user makes various parameter selections at step 1616, the model number displayed on the GUI display screen 1480 may also update in response to those parameter selections. If the user has selected the "by model number" radio button at step 1618, then at step 1620, the user can enter the complete desired model number by using the dropdown model number entry screen on the GUI display. As the user enters portions of the model number on the GUI display at step 1620, the parameter information corresponding to the entered model number are also displayed on the GUI screen display 1480, and further settings may be eliminated depending on the portion of the model number entered into the GUI software.

Once the user has provided all of the necessary user input, the configuration program waits for a "Save to Driver" command at step 1626 in response to the user clicking the "Save to Driver" button on the GUI display screen 1480. If the configuration program does not receive the "Save to Driver" command at step 1626, then the process loops back to step 1612 such that the user may make any additional changes to the selected parameters and/or model number.

If the system receives the "Save to Driver" command at step 1626, then at step 1628, the system verifies that the selected parameters and/or model number are compatible with the base model number that was detected at step 1610. If the selected parameters and/or model number are not compatible with the detected base model, then at step 1630, the user is notified of the incompatibility between the selected parameters and the base model. The user may decide at step 1634 to change the LED driver 100 and then to click the "Connect" button at step 1602 (i.e., to reconnect a different LED driver having the compatible base model number to the programming device 1450). Alternatively, if the user decides not to change the connected LED driver 100 at step 1634, then the user may change any of the incompatible selections via steps 1612-1620.

If at step 1628, the selected parameters and/or model number is compatible with the detected base model, then at step 1632, the settings are sent to the LED driver 100 via the programming device 1450, the LED driver verifies the received settings, and the user is notified that the LED driver has been programmed with the new settings. At this point, the process 1600 ends. However, in the event that the user evaluates the recently programmed LED driver 100 and determines that the driver is not operating as expected, the user may easily repeat the process 1600 in order to make any additional modifications to the LED driver 100.

Figure 23:
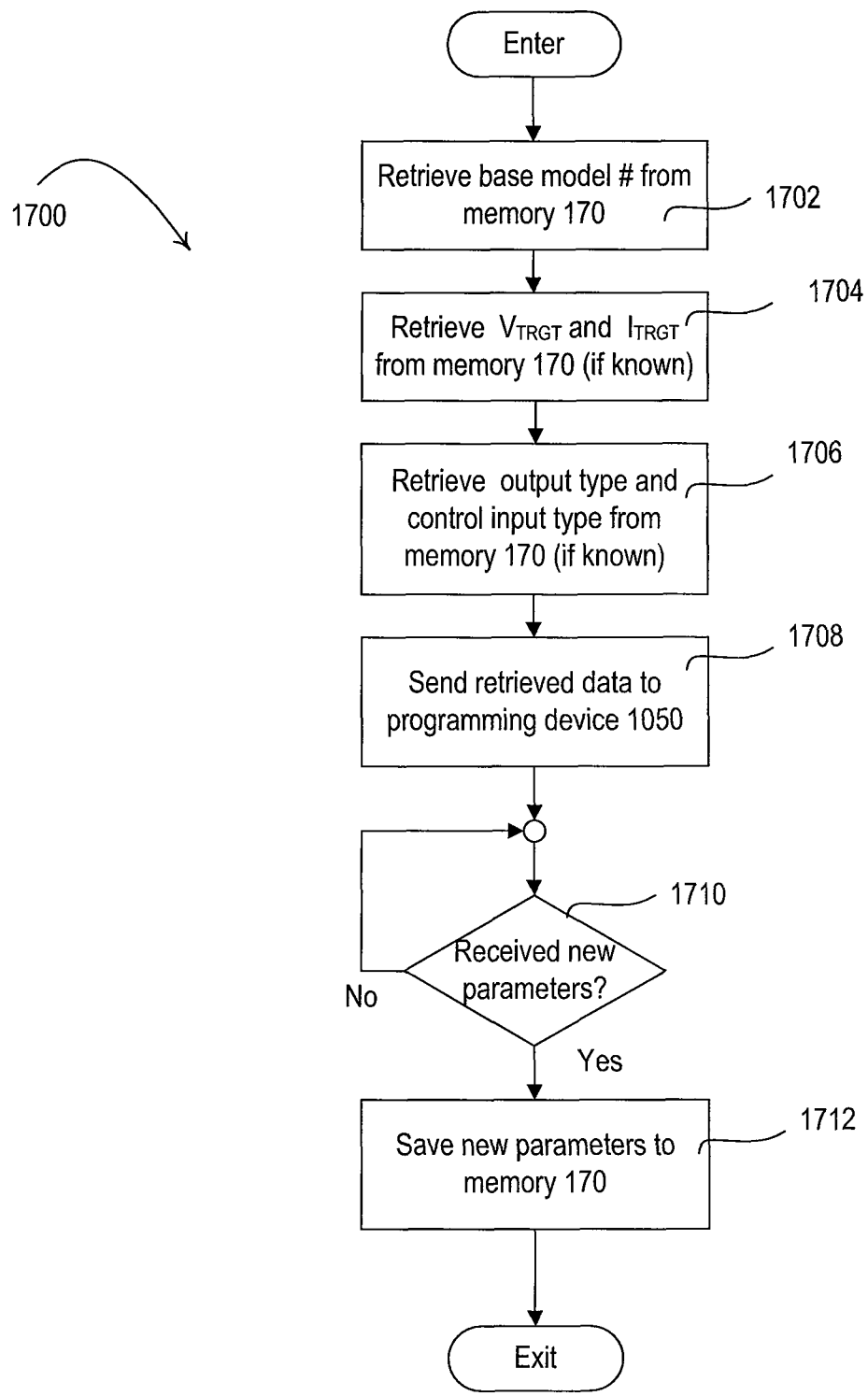
FIG. 23 is a simplified software flowchart of the configuration process executed by the LED driver while being configured in the system of FIG. 18.

FIG. 23 shows a simplified software flowchart of the configuration process 1700 executed by the LED driver 100. The process is executed by the control circuit 140 of the LED driver 100 once communication has been established between the programming device 1450 and the LED driver (i.e., after step 1604 of process 1600). At step 1702, the control circuit 140 retrieves the base model number from the memory 170. The base model number may be saved to the memory 170 during the initial manufacturing process of the LED driver 100. Then, at step 1704, the control circuit 140 retrieves the target voltage $V_{TRGT}$ and/or current $I_{TRGT}$ from the memory 170 if known or saved. At step 1706, the output type (i.e., the load control mode and the dimming method) are retrieved from the memory 170 if known or saved. Next at step 1708, all of the data that was retrieved from the memory 170 is sent to the programming device 1450 such that it can be displayed on the GUI display screen 1480 (i.e., at step 1612 of process 1600). The control circuit 140 then waits at step 1710 to receive new parameters from the programming device 1450, and once the new parameters are received, they are stored in the memory 170 at step 1712 before the process 1700 ends.

Thus, the configuration program allows the user to program the LED driver 100 to a desired current for a constant current driver or desired voltage for a constant voltage driver and change the current or voltage as desired, until the desired parameters, such as desired light output, are achieved either by visual observation or by feedback from the sensor 1470 that may be connected to the user's computer. Once the desired parameters of the LED driver 100 are achieved, the LED driver can be ordered from the factory by the model number identified on the GUI display (as shown on the example GUI screen display 1480 in FIG. 20) associated with the selected specification. According to an alternate embodiment, the GUI display may include an "Order Now" button which allows the user to order the model number identified on the screen via the Internet 1410 (i.e., on-line). In response to clicking the "Order Now" button, the user may be presented with (on the computer 1420) an additional order screen via the Internet 1410 where the user may provide additional billing and shipping information such that the on-line order can be properly processed. In the factory, one of the basic model drivers can then be programmed to the selected specifications and the memory contents locked to those settings by preventing further changes to the target voltage or current stored in the microprocessor's memory. In the factory, the driver can be labeled with the selected specifications, i.e., operating voltage, current or power, for example, according to necessary code requirements or safety approval agencies, e.g. Underwriters Laboratory (UL).

Thus, an optimized LED driver 100 can be configured. This configuration can be achieved to optimize the lighting system driven by the driver. In addition, a single LED driver 100 can be easily and quickly reconfigured multiple times to evaluate the overall performance of the lighting system. Furthermore, the computer 1420 can identify the particular model number of the LED driver associated with the configured parameters. This model number driver can then be either ordered by the user for installation or a sample can be ordered for testing at the installation location.

Accordingly, the development tool according to the present invention allows the user to configure an LED driver to the optimized configuration necessary for a particular application. This also minimizes the number of LED drivers that the factory needs to stock. According to the present invention, the factory needs only stock a limited number of basic LED drivers in different power ranges, for example, three, each in a different power range, plus a limited number of different physical form factor variations, e.g. three, as well as a limited range of control inputs, e.g., two different control input variations, i.e., ELV phase control input or communication bus input plus three wire phase control input. The factory accordingly need stock only eighteen base models of driver that is three output ranges times three form factors times two control inputs for a total of eighteen base models. Then, using the tool according to the present invention, the appropriate base model can be programmed with the desired voltage and current specifications, as selected in the field. Those voltage and current specifications can then be locked in so that they cannot be altered and the driver can be labeled with the final model according to the programmed settings. These specifications can also be used for UL approval.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An LED driver for controlling the intensity of an LED light source, the LED driver comprising:
   a power converter circuit operable to receive a rectified AC voltage and to generate a DC bus voltage;
   a LED drive circuit operable to receive the bus voltage and to control the magnitude of a load current conducted through the LED light source, so as to control the intensity of the LED light source, the LED drive circuit comprising a controllable-impedance circuit adapted to be coupled in series with the LED light source, the controllable-impedance circuit comprising a linear regulator including a regulation transistor adapted to be coupled in series with the LED light source; and
   a control circuit operatively coupled to the power converter circuit for adjusting the magnitude of the bus voltage, and to the LED drive circuit for controlling the controllable-impedance circuit to thus adjust the magnitude of the load current through the LED light source;
   wherein the control circuit determines the magnitude of a voltage generated across the controllable-impedance circuit and adjusts the magnitude of the bus voltage in response to the magnitude of the voltage generated across the controllable-impedance circuit to reduce the total power dissipation in the power converter circuit and the LED drive circuit, the control circuit operable to control the regulation transistor to operate in the linear region to control the magnitude of the load current conducted through the LED light source, the control circuit operable to control the LED drive circuit to adjust the DC magnitude of a control voltage at a control electrode of the regulation transistor to control the regulation transistor in the linear region; and
   wherein the LED drive circuit further comprises a feedback circuit coupled in series with the regulation transistor and operable to generate a load current feedback signal representative of the magnitude of the load current, the control circuit operable to control the regulation transistor to operate in the linear region in response to the magnitude of the load current.

2. The LED driver of claim 1, wherein the control circuit increases the DC magnitude of the gate voltage at the gate of the regulation transistor to increase the magnitude of the load current, and decreases the DC magnitude of the gate voltage to decrease the magnitude of the load current.

3. The LED driver of claim 1, wherein the regulation transistor comprises a FET.

4. The LED driver of claim 1, wherein the control circuit adjusts the magnitude of the bus voltage to thus control the magnitude of the voltage generated across the linear regulator to a target regulator voltage.

5. The LED driver of claim 4, wherein the control circuit decreases the magnitude of the bus voltage if the voltage generated across the linear regulator is greater than the target regulator voltage, and increases the magnitude of the bus voltage if the voltage generated across the linear regulator is less than the target regulator voltage.

6. The LED driver of claim 1, wherein the control circuit is operable to measure the magnitude of the voltage generated across the linear regulator.

7. An LED driver for controlling the intensity of an LED light source, the LED driver comprising:
- a power converter circuit operable to receive a rectified AC voltage and to generate a DC bus voltage;
- a LED drive circuit operable to receive the bus voltage and to control the magnitude of a load current conducted through the LED light source, so as to control the intensity of the LED light source, the LED drive circuit comprising a controllable-impedance circuit adapted to be coupled in series with the LED light source; and
- a control circuit operatively coupled to the power converter circuit for adjusting the magnitude of the bus voltage, and to the LED drive circuit for controlling the controllable-impedance circuit to thus adjust the magnitude of the load current through the LED light source;
- wherein the control circuit adjusts the magnitude of the bus voltage in response to the magnitude of a voltage generated across the controllable-impedance circuit to reduce the total power dissipation in the power converter circuit and the LED drive circuit;
- wherein the controllable-impedance circuit comprises a linear regulator; and
- wherein the control circuit is operable to measure the magnitude of the bus voltage and the magnitude of a load voltage generated across the LED light source, the control circuit further operable to calculate the magnitude of the voltage generated across the linear regulator by subtracting the magnitude of the load voltage generated across the LED light source from the magnitude of the bus voltage.

8. An LED driver for controlling the intensity of an LED light source, the LED driver comprising:
- a power converter circuit operable to receive a rectified AC voltage and to generate a DC bus voltage;
- a LED drive circuit operable to receive the bus voltage and to control the magnitude of a load current conducted through the LED light source, so as to control the intensity of the LED light source, the LED drive circuit comprising a controllable-impedance circuit adapted to be coupled in series with the LED light source, the controllable-impedance circuit comprising a regulation transistor adapted to be coupled in series with the LED light source; and
- a control circuit operatively coupled to the power converter circuit for adjusting the magnitude of the bus voltage, and to the LED drive circuit for controlling the controllable-impedance circuit to thus adjust the magnitude of the load current through the LED light source;
- wherein the control circuit determines the magnitude of a voltage generated across the controllable-impedance circuit and adjusts the magnitude of the bus voltage in response to the magnitude of the voltage generated across the controllable-impedance circuit to control the magnitude of the voltage generated across the controllable-impedance circuit to a target voltage, the control circuit operable to control the regulation transistor to operate in the linear region to control the magnitude of the load current conducted through the LED light source, the control circuit operable to control the LED drive circuit to adjust the DC magnitude of a control voltage at a control electrode of the regulation transistor to control the regulation transistor in the linear region; and
- wherein the LED drive circuit further comprises a feedback circuit coupled in series with the regulation transistor and operable to generate a load current feedback signal representative of the magnitude of the load current, the control circuit operable to control the regulation transistor to operate in the linear region in response to the magnitude of the load current.

9. The LED driver of claim 8, wherein the control circuit increases the DC magnitude of the gate voltage at the gate of the regulation transistor to increase the magnitude of the load current, and decreases the DC magnitude of the gate voltage to decrease the magnitude of the load current.

10. The LED driver of claim 8, wherein the regulation transistor comprises a FET.

11. The LED driver of claim 8, wherein the control circuit decreases the magnitude of the bus voltage if the voltage generated across the regulation transistor is greater than the target voltage, and increases the magnitude of the bus voltage if the voltage generated across the regulation transistor is less than the target voltage.

12. The LED driver of claim 8, wherein the control circuit is operable to measure the magnitude of the voltage generated across the regulation transistor.

13. The LED driver of claim 8, wherein the control circuit adjusts the magnitude of the bus voltage in response to the magnitude of the voltage generated across the controllable-impedance circuit to reduce the total power dissipation in the power converter circuit and the LED drive circuit.

14. An LED driver for controlling the intensity of an LED light source, the LED driver comprising:
- a power converter circuit operable to receive a rectified AC voltage and to generate a DC bus voltage;
- a LED drive circuit operable to receive the bus voltage and to control the magnitude of a load current conducted through the LED light source, so as to control the intensity of the LED light source, the LED drive circuit comprising a controllable-impedance circuit adapted to be coupled in series with the LED light source; and
- a control circuit operatively coupled to the power converter circuit for adjusting the magnitude of the bus voltage, and to the LED drive circuit for controlling the controllable-impedance circuit to thus adjust the magnitude of the load current through the LED light source;
- wherein the control circuit adjusts the magnitude of the bus voltage in response to the magnitude of the voltage generated across the controllable-impedance circuit to control the magnitude of the voltage generated across the controllable-impedance circuit to a target voltage; and
- wherein the controllable-impedance circuit comprises a linear regulator;
- wherein the control circuit is operable to measure the magnitude of the bus voltage and the magnitude of a load voltage generated across the LED light source, the control circuit further operable to calculate the magnitude of the voltage generated across the linear regulator by subtracting the magnitude of the load voltage generated across the LED light source from the magnitude of the bus voltage.

15. An LED driver for driving an LED light source including at least one LED, the LED driver comprising:
- a first circuit receiving a rectified AC voltage and providing a DC bus voltage;
- a second circuit receiving said DC bus voltage and producing one of a load current through said LED light source or a load voltage across said LED light source;
- a control circuit having a first control input from said first circuit and a second control input from said second circuit and further having a first control output provided to said first circuit and a second control output provided to said second circuit;

said first control input comprising a signal related to said DC bus voltage;

said first control output comprising a control signal for controlling said first circuit to deliver a desired DC bus voltage;

said second control input comprising a signal related to the load current provided by said second circuit through said LED light source;

said second control output comprising a control signal to regulate either or both said load current to said LED light source and said load voltage provided to said LED light source;

wherein said second circuit comprises a linear regulator circuit having a power semiconductor device adapted to be coupled in series with said LED light source to regulate said load current to a desired load current, such that a load voltage is generated across said LED light source, said control circuit operable to determine the magnitude of a regulator voltage generated across said linear regulator and to control said first circuit in response to the magnitude of the regulator voltage to adjust the magnitude of the DC bus voltage to a magnitude that is above said load voltage by at least a minimum regulator voltage to enable said linear regulator to regulate said load current to said desired load current;

wherein said second circuit is operated as a current control mode driver, such that said power semiconductor device is operated in a linear region by said control circuit providing said second control output to control said power semiconductor device into said linear region; and wherein said second circuit further comprises a feedback circuit coupled in series with the power semiconductor device and operable to generate a load current feedback signal representative of the magnitude of the load current, the control circuit operable to control the power semiconductor device to operate in the linear region in response to the magnitude of the load current.

16. The LED driver of claim 15, wherein said second control output comprises a PWM signal, said second circuit further comprising a filter circuit receiving said second control output from said control circuit, said filter circuit providing a filtered signal to said power semiconductor device to control said power semiconductor device in said linear region to regulate said load current to said desired load current.

17. The LED driver of claim 15, wherein said power semiconductor device comprises a FET.

18. A method for controlling the intensity of an LED light source, the method comprising:

generating a DC bus voltage with a power converter circuit;

controlling the magnitude of a load current conducted through the LED light source from the DC bus voltage by controlling a controllable-impedance circuit that is coupled to conduct the load current through the LED light source;

determining the magnitude of a voltage generated across the controllable-impedance circuit;

adjusting the magnitude of the DC bus voltage in response to the magnitude of the voltage generated across the controllable-impedance circuit to reduce the total power dissipation in the power converter circuit and the controllable-impedance circuit;

further wherein the step of controlling a controllable-impedance circuit comprises controlling a linear regulator having a regulation transistor; and further comprising a providing feedback circuit coupled in series with the regulation transistor of the controllable-impedance circuit and operable to generate a load current feedback signal representative of the magnitude of the load current, further comprising controlling the regulation transistor to operate in the linear region in response to the magnitude of the load current.

19. The method of claim 18, wherein adjusting the magnitude of the bus voltage further comprises controlling the magnitude of the voltage generated across the controllable-impedance circuit to a target regulator voltage.

20. The method of claim 19, wherein controlling the magnitude of the voltage generated across the controllable-impedance circuit further comprises decreasing the magnitude of the bus voltage if the voltage generated across the controllable-impedance circuit is greater than the target regulator voltage, and increasing the magnitude of the bus voltage if the voltage generated across the controllable-impedance circuit is less than the target regulator voltage.

21. The method of claim 18, wherein determining the magnitude of a voltage generated across the controllable-impedance circuit further comprises measuring the magnitude of the voltage generated across the controllable-impedance circuit.

22. A method for controlling the intensity of an LED light source, the method comprising:

generating a DC bus voltage;

controlling the magnitude of a load current conducted through the LED light source by controlling a controllable-impedance circuit that is coupled to conduct the load current through the LED light source;

determining the magnitude of a voltage generated across the controllable-impedance circuit; and adjusting the magnitude of the bus voltage in response to the magnitude of the voltage generated across the controllable-impedance circuit to reduce the total power dissipation in the power converter circuit and the LED drive circuit;

wherein determining the magnitude of a voltage generated across the controllable-impedance circuit further comprises:

measuring the magnitude of the bus voltage;

measuring the magnitude of a load voltage generated across the light source; and calculating the magnitude of the voltage generated across the controllable-impedance circuit by subtracting the magnitude of the load voltage generated across the light source from the magnitude of the bus voltage.

* * * * *